US012647562B2

(12) United States Patent
Koo et al.

(10) Patent No.: US 12,647,562 B2
(45) Date of Patent: *Jun. 2, 2026

(54) TRANSFORM-BASED IMAGE CODING METHOD AND DEVICE THEREFOR

(71) Applicant: LG ELECTRONICS INC., Seoul (KR)

(72) Inventors: Moonmo Koo, Seoul (KR); Seunghwan Kim, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/805,322

(22) Filed: Aug. 14, 2024

(65) Prior Publication Data

US 2024/0406393 A1    Dec. 5, 2024

Related U.S. Application Data

(63) Continuation of application No. 17/775,818, filed as application No. PCT/KR2020/016004 on Nov. 13, 2020, now Pat. No. 12,316,841.

(60) Provisional application No. 62/935,068, filed on Nov. 13, 2019, provisional application No. 62/935,062, filed on Nov. 13, 2019.

(51) Int. Cl.
H04N 19/12        (2014.01)
H04N 19/167      (2014.01)
H04N 19/176      (2014.01)
H04N 19/186      (2014.01)
H04N 19/61        (2014.01)
H04N 19/70        (2014.01)
H04N 19/96        (2014.01)

(52) U.S. Cl.
CPC ........... H04N 19/12 (2014.11); H04N 19/167 (2014.11); H04N 19/176 (2014.11); H04N 19/186 (2014.11); H04N 19/61 (2014.11); H04N 19/70 (2014.11); H04N 19/96 (2014.11)

(58) Field of Classification Search
CPC .... H04N 19/12; H04N 19/167; H04N 19/176; H04N 19/186; H04N 19/61; H04N 19/70; H04N 19/96
See application file for complete search history.

(56) References Cited

U.S. PATENT DOCUMENTS

2014/0146894 A1*   5/2014   Yu ........................ H04N 19/625
                                                                        375/240.18
2015/0030067 A1*   1/2015   Zhao .................... H04N 19/186
                                                                        375/240.02

(Continued)

*Primary Examiner* — Jonathan R Messmore
(74) *Attorney, Agent, or Firm* — Bryan Cave Leighton Paisner LLP

(57) ABSTRACT

An image decoding method according to the present document comprises the step of deriving modified transform coefficients by applying LFNST to transform coefficients, wherein the step of deriving the modified transform coefficients comprises the steps of: deriving a variable indicating whether an effective coefficient is present in a DC component of a current block; and parsing an LFNST index on the basis of whether the variable indicates that the effective coefficient is present in a position other than the DC component, wherein the variable may be derived on the basis of an individual transform skip flag value for a color component of the current block.

9 Claims, 16 Drawing Sheets

RECEIVE BITSTREAM INCLUDING RESIDUAL INFORMATION ~S1510

DERIVE TRANSFORM COEFFICIENT FOR CURRENT BLOCK BASED ON RESIDUAL INFORMATION ~S1520

DERIVE VARIABLE INDICATING WHETHER SIGNIFICANT EFFICIENT EXISTS IN DC COMPONENT OF CURRENT BLOCK AND DERIVE VARIABLE BASED ON INDIVIDUAL TRANSFORM SKIP FLAG VALUE FOR COLOR COMPONENT OF CURRENT BLOCK ~S1530

PARSE LFNST INDEX BASED ON VARIABLE INDICATING THAT SIGNIFICANT COEFFICIENT EXISTS AT POSITION OTHER THAN DC COMPONENT ~S1540

DERIVE MODIFIED TRANSFORM COEFFICIENT BASED ON LFNST INDEX AND LFNST MATRIX ~S1550

DERIVE RESIDUAL SAMPLES FOR CURRENT BLOCK BASED ON INVERSE PRIMARY TRANSFORM FOR MODIFIED TRANSFORM COEFFICIENTS ~S1560

(56) References Cited

U.S. PATENT DOCUMENTS

2019/0349587 A1 *  11/2019  Jang ..................... H04N 19/463
2022/0394300 A1 *  12/2022  Koo ....................... H04N 19/12

* cited by examiner

FIG. 4

Reduced
Transform

Residual ——→ T x [ ] ——→ Coefficient (a)

Reduced Inv.
Transform

Coefficient ——→ T$^t$x [ ] ——→ Residual (b)

FIG. 8

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | | | | |
| 37 | 38 | 39 | 40 | | | | |
| 41 | 42 | 43 | 44 | | | | |
| 45 | 46 | 47 | 48 | | | | |

| 1 | 2 | 3 | 4 |
|---|---|---|---|
| 5 | 6 | 7 | 8 |
| 9 | 10 | 11 | 12 |
| 13 | 14 | 15 | 16 |

(a)

| 1 | 9 | 17 | 25 | 33 | 37 | 41 | 45 |
|---|---|---|---|---|---|---|---|
| 2 | 10 | 18 | 26 | 34 | 38 | 42 | 46 |
| 3 | 11 | 19 | 27 | 35 | 39 | 43 | 47 |
| 4 | 12 | 20 | 28 | 36 | 40 | 44 | 48 |
| 5 | 13 | 21 | 29 | | | | |
| 6 | 14 | 22 | 30 | | | | |
| 7 | 15 | 23 | 31 | | | | |
| 8 | 16 | 24 | 32 | | | | |

| 1 | 5 | 9 | 13 |
|---|---|---|---|
| 2 | 6 | 10 | 14 |
| 3 | 7 | 11 | 15 |
| 4 | 8 | 12 | 16 |

(b)

(a)

(b)

(a) 4x4          (b) 8x4 / 4x8

(c) 4xN / Nx4, when N≥16          (d) 8x8

(e) MxN(M≥8, N≥8, M>8 or N>8)

(a) 4x4                    (b) 8x4 / 4x8

(c) 4xN / Nx4, when N≥16                    (d) 8x8

(e) MxN(M≥8, N≥8, M>8 or N>8)

(a) 4x4                    (b) 8x4 / 4x8

(c) 4xN / Nx4, when N≥16

(d) 4xN / Nx4, when N≥16

(a) 8x8

(b) MxN(M≥8, N≥8, M>8 or N>8)

FIG. 15

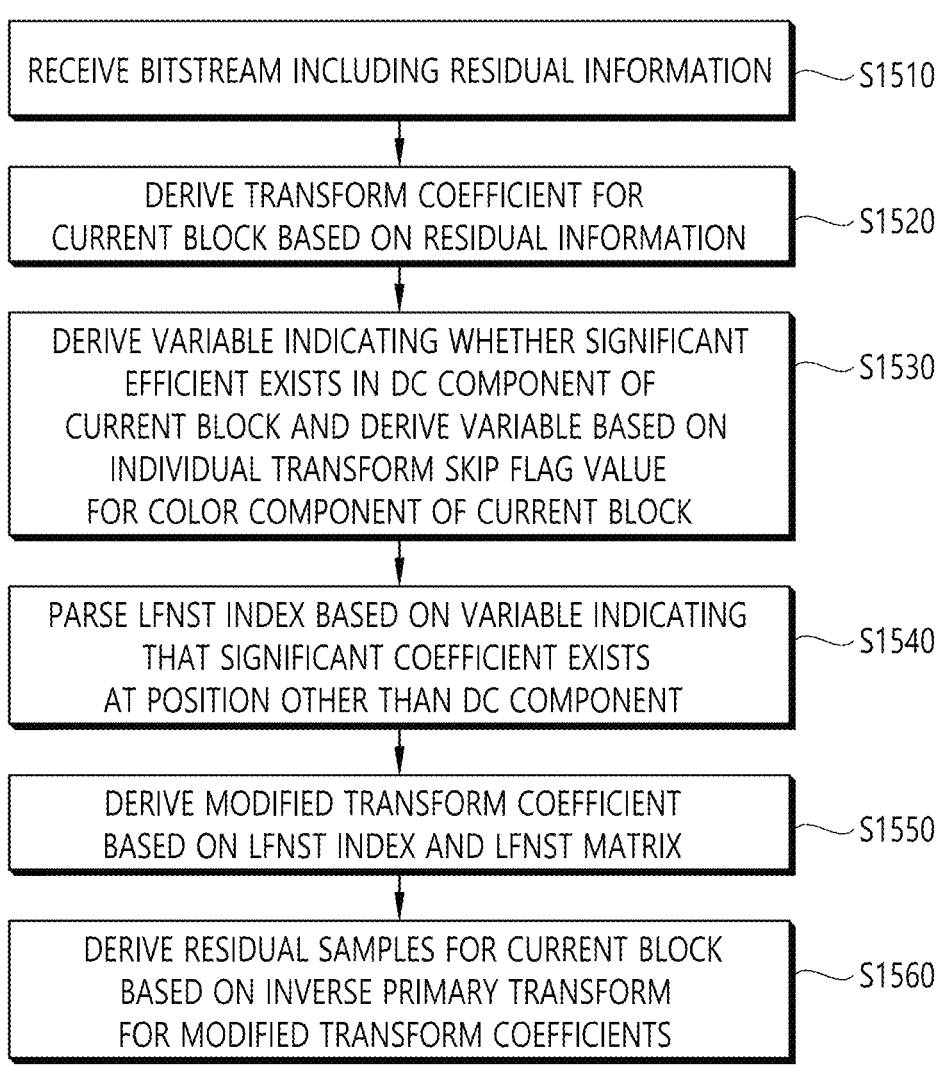

RECEIVE BITSTREAM INCLUDING RESIDUAL INFORMATION ~S1510

DERIVE TRANSFORM COEFFICIENT FOR
CURRENT BLOCK BASED ON RESIDUAL INFORMATION ~S1520

DERIVE VARIABLE INDICATING WHETHER SIGNIFICANT
EFFICIENT EXISTS IN DC COMPONENT OF
CURRENT BLOCK AND DERIVE VARIABLE BASED ON
INDIVIDUAL TRANSFORM SKIP FLAG VALUE
FOR COLOR COMPONENT OF CURRENT BLOCK ~S1530

PARSE LFNST INDEX BASED ON VARIABLE INDICATING
THAT SIGNIFICANT COEFFICIENT EXISTS
AT POSITION OTHER THAN DC COMPONENT ~S1540

DERIVE MODIFIED TRANSFORM COEFFICIENT
BASED ON LFNST INDEX AND LFNST MATRIX ~S1550

DERIVE RESIDUAL SAMPLES FOR CURRENT BLOCK
BASED ON INVERSE PRIMARY TRANSFORM
FOR MODIFIED TRANSFORM COEFFICIENTS ~S1560

FIG. 16

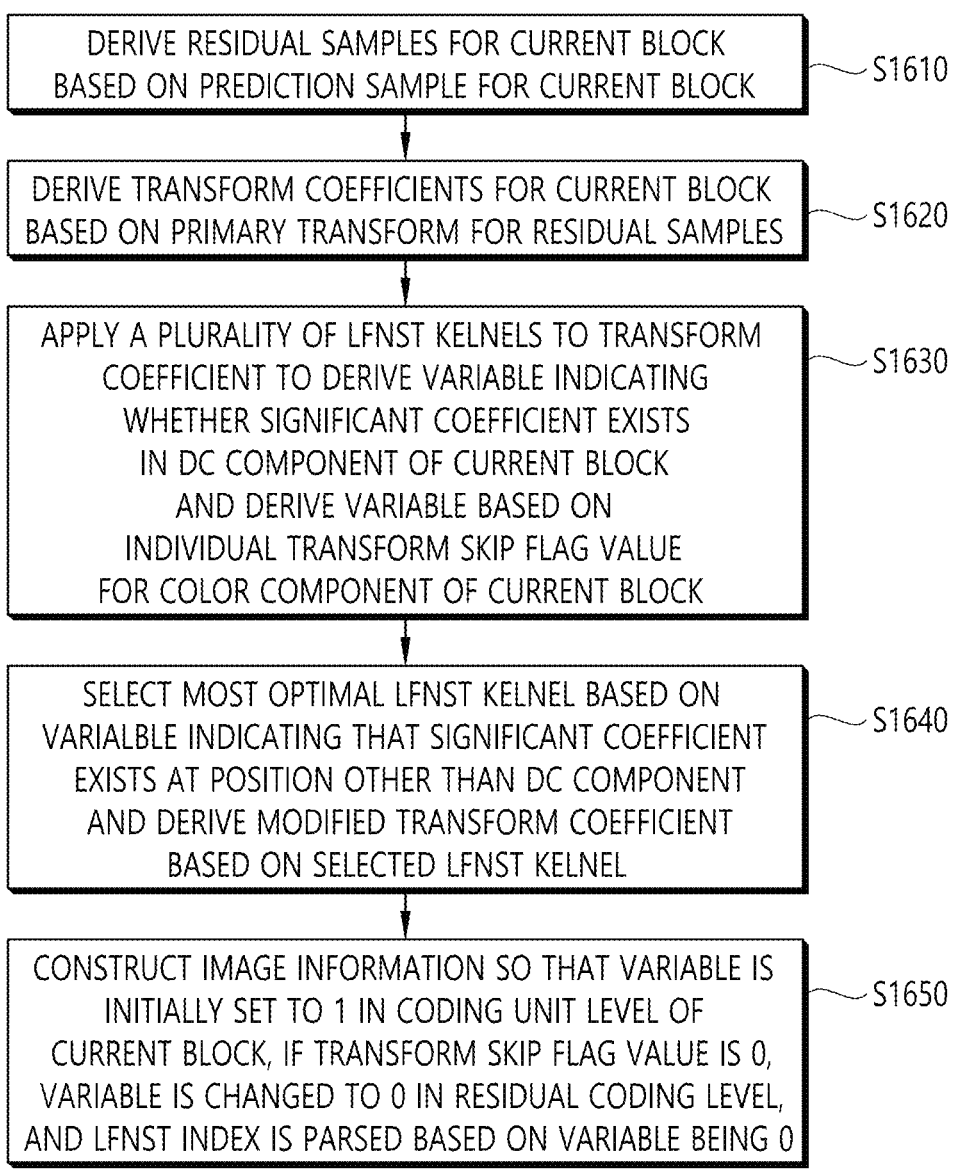

DERIVE RESIDUAL SAMPLES FOR CURRENT BLOCK
BASED ON PREDICTION SAMPLE FOR CURRENT BLOCK — S1610

DERIVE TRANSFORM COEFFICIENTS FOR CURRENT BLOCK
BASED ON PRIMARY TRANSFORM FOR RESIDUAL SAMPLES — S1620

APPLY A PLURALITY OF LFNST KELNELS TO TRANSFORM
COEFFICIENT TO DERIVE VARIABLE INDICATING
WHETHER SIGNIFICANT COEFFICIENT EXISTS
IN DC COMPONENT OF CURRENT BLOCK
AND DERIVE VARIABLE BASED ON
INDIVIDUAL TRANSFORM SKIP FLAG VALUE
FOR COLOR COMPONENT OF CURRENT BLOCK — S1630

SELECT MOST OPTIMAL LFNST KELNEL BASED ON
VARIALBLE INDICATING THAT SIGNIFICANT COEFFICIENT
EXISTS AT POSITION OTHER THAN DC COMPONENT
AND DERIVE MODIFIED TRANSFORM COEFFICIENT
BASED ON SELECTED LFNST KELNEL — S1640

CONSTRUCT IMAGE INFORMATION SO THAT VARIABLE IS
INITIALLY SET TO 1 IN CODING UNIT LEVEL OF
CURRENT BLOCK, IF TRANSFORM SKIP FLAG VALUE IS 0,
VARIABLE IS CHANGED TO 0 IN RESIDUAL CODING LEVEL,
AND LFNST INDEX IS PARSED BASED ON VARIABLE BEING 0 — S1650

TRANSFORM-BASED IMAGE CODING METHOD AND DEVICE THEREFOR

This application is a Continuation Application of U.S. patent application Ser. No. 17/775,818, filed on May 10, 2022, which is a National Stage of International Application No. PCT/KR2020/016004, filed on Nov. 13, 2020, which claims the benefit of U.S. Provisional Application No. 62/935,062, filed on Nov. 13, 2019, and U.S. Provisional Application No. 62/935,068, filed on Nov. 13, 2019 the contents of which are all hereby incorporated by reference herein in their entirety.

BACKGROUND OF THE DISCLOSURE

Field of the Disclosure

The present disclosure relates to an image coding technique and, more particularly, to a method and an apparatus for coding an image based on transform in an image coding system.

Related Art

Nowadays, the demand for high-resolution and high-quality images/videos such as 4K, 8K or more ultra high definition (UHD) images/videos has been increasing in various fields. As the image/video data becomes higher resolution and higher quality, the transmitted information amount or bit amount increases as compared to the conventional image data. Therefore, when image data is transmitted using a medium such as a conventional wired/wireless broadband line or image/video data is stored using an existing storage medium, the transmission cost and the storage cost thereof are increased.

Further, nowadays, the interest and demand for immersive media such as virtual reality (VR), artificial reality (AR) content or hologram, or the like is increasing, and broadcasting for images/videos having image features different from those of real images, such as a game image is increasing.

Accordingly, there is a need for a highly efficient image/video compression technique for effectively compressing and transmitting or storing, and reproducing information of high resolution and high quality images/videos having various features as described above.

SUMMARY

A technical aspect of the present disclosure is to provide a method and an apparatus for increasing image coding efficiency.

Another technical aspect of the present disclosure provides a method and an apparatus is to provide a method and apparatus for increasing efficiency of LFNST index coding.

Still another technical aspect of the present disclosure is to provide a method and an apparatus for increasing coding efficiency of an LFNST index based on a transform skip flag.

In an aspect, an image decoding method performed by a decoding apparatus is provided. The method includes: deriving modified transform coefficients by applying LFNST to transform coefficients, wherein the deriving the modified transform coefficients includes deriving a variable indicating whether a significant coefficient exists in a DC component of the current block and parsing an LFNST index based on the variable indicating that the significant coefficient exists at a position other than the DC component, and the variable may be derived based on an individual transform skip flag value for color components of the current block.

The variable may indicate that the significant coefficient exists at a position other than the DC component based on the transform skip flag value for the color component being 0.

The variable may be initially set to 1 in a coding unit level of the current block, if the transform skip flag value is 0, the variable may be changed to 0 in a residual coding level, and the LFNST index may be parsed based on the variable being 0.

The transform skip flag for the current block may be signaled for each color component.

The deriving the modified transform coefficient may further include setting a plurality of variables for the LFNST based on the LFNST index being not 0 and whether the individual transform skip flag value for the color component is 0.

If a tree type of the current block is a single tree, the variable may be derived based on a transform skip flag value for a luma component, a transform skip flag value for a chroma Cb component, and a transform skip flag value for a chroma Cr component.

If a tree type of the current block is dual tree luma, the variable may be derived based on a transform skip flag valued for a luma component.

If a tree type of the current block is dual tree chroma, the variable may be derived based on a transform skip flag value for a chroma Cb component and a transform skip flag value for a chroma Cr component.

According to one embodiment of the present disclosure, an image encoding method performed by an encoding apparatus is provided. The method includes: applying LFNST to derive modified transform coefficients from the transform coefficients, applying a plurality of LFNST matrices to the transform coefficient to derive a variable indicating whether a significant coefficient exists in a DC component of the current block, selecting the most optimal LFNST matrix among the LFNST kernels based on the variable indicating that the significant coefficient exist at a position other than the DC component, and deriving the modified transform coefficient based on the selected LFNST matrix, and the variable may be derived based on an individual transform skip flag value for the color component of the current block.

According to still another embodiment of the present disclosure, there may be provided a digital storage medium that stores image data including encoded image information and a bitstream generated according to an image encoding method performed by an encoding apparatus.

According to yet another embodiment of the present disclosure, there may be provided a digital storage medium that stores image data including encoded image information and a bitstream to cause a decoding apparatus to perform the image decoding method.

Advantageous Effects

According to the present disclosure, it is possible to increase overall image/video compression efficiency.

According to the present disclosure, it is possible to increase efficiency of LFNST index coding.

According to the present disclosure, it is possible to increase coding efficiency of an LFNST index based on a transform skip flag.

Effects that can be obtained through specific examples of the present specification are not limited to the effects listed above. For example, various technical effects that a person having ordinary skill in the related art can understand or derive from the present specification may exist. Accordingly, specific effects of the present specification are not limited to those explicitly described in the present specification, and can include various effects that can be understood or derived from the technical characteristics of the present specification.

BRIEF DESCRIPTION OF THE DRAWINGS

FIG. 4 is a diagram exemplarily illustrating a structure diagram of a content streaming system to which the present disclosure is applied.

FIG. 8 is a diagram illustrating a sequence of arranging output data of a forward primary transform into a one-dimensional vector according to an example.

FIG. 15 is a flowchart illustrating an operation of a video decoding apparatus according to an embodiment of the present disclosure.

FIG. 16 is a flowchart illustrating an operation of a video encoding apparatus according to an embodiment of the present disclosure.

Figure 1:
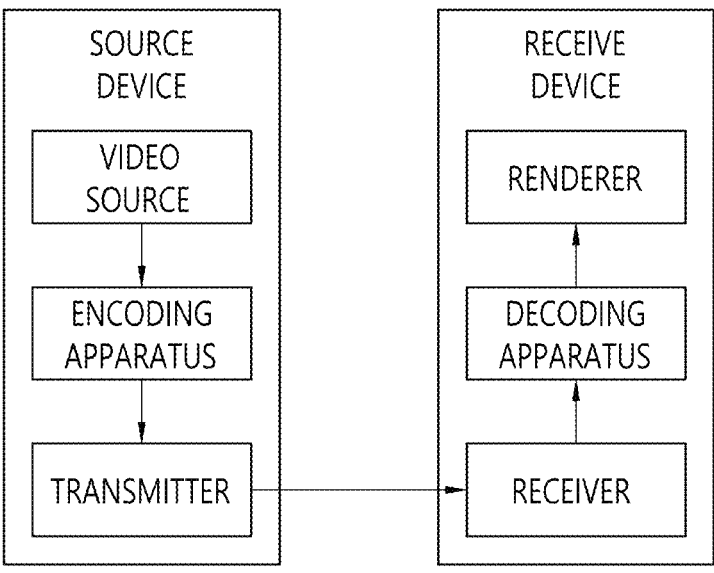
FIG. 1 schematically illustrates an example of a video/image coding system to which the present disclosure is applicable.

DESCRIPTION OF EXEMPLARY
EMBODIMENTS

While the present disclosure may be susceptible to various modifications and include various embodiments, specific embodiments thereof have been shown in the drawings by way of example and will now be described in detail. However, this is not intended to limit the present disclosure to the specific embodiments disclosed herein. The terminology used herein is for the purpose of describing specific embodiments only, and is not intended to limit technical idea of the present disclosure. The singular forms may include the plural forms unless the context clearly indicates otherwise. The terms such as "include" and "have" are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present disclosure as long as they do not depart from the essence of the present disclosure.

Hereinafter, preferred embodiments of the present disclosure will be explained in more detail while referring to the attached drawings. In addition, the same reference signs are used for the same components on the drawings, and repeated descriptions for the same components will be omitted.

This document relates to video/image coding. For example, the method/example disclosed in this document may relate to a VVC (Versatile Video Coding) standard (ITU-T Rec. H.266), a next-generation video/image coding standard after VVC, or other video coding related standards (e.g., HEVC (High Efficiency Video Coding) standard (ITU-T Rec. H.265), EVC (essential video coding) standard, AVS2 standard, etc.).

In this document, a variety of embodiments relating to video/image coding may be provided, and, unless specified to the contrary, the embodiments may be combined to each other and be performed.

In this document, a video may mean a set of a series of images over time. Generally a picture means a unit representing an image at a specific time zone, and a slice/tile is a unit constituting a part of the picture. The slice/tile may include one or more coding tree units (CTUs). One picture may be constituted by one or more slices/tiles. One picture may be constituted by one or more tile groups. One tile group may include one or more tiles.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, the sample may refer to a pixel value in the spatial domain, or when this pixel value is converted to the frequency domain, it may refer to a transform coefficient in the frequency domain.

A unit may represent the basic unit of image processing. The unit may include at least one of a specific region and information related to the region. One unit may include one luma block and two chroma (e.g., cb, cr) blocks. The unit and a term such as a block, an area, or the like may be used in place of each other according to circumstances. In a general case, an M×N block may include a set (or an array) of samples (or sample arrays) or transform coefficients consisting of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may include 1) only A, 2) only B, and/or 3) both A and B. In other words, the term "or" in this document should be interpreted to indicate "additionally or alternatively."

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "prediction (intra prediction)", it may mean that "intra prediction" is proposed as an example of "prediction". In other words, the "prediction" of the present disclosure is not limited to "intra prediction", and "intra prediction" may be proposed as an example of "prediction". In addition, when indicated as "prediction (i.e., intra prediction)", it may also mean that "intra prediction" is proposed as an example of "prediction".

Technical features individually described in one figure in the present disclosure may be individually implemented or may be simultaneously implemented.

FIG. 1 schematically illustrates an example of a video/image coding system to which the present disclosure is applicable.

Referring to FIG. 1, the video/image coding system may include a first device (source device) and a second device (receive device). The source device may deliver encoded video/image information or data in the form of a file or streaming to the receive device via a digital storage medium or network.

The source device may include a video source, an encoding apparatus, and a transmitter. The receive device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain a video/image through a process of capturing, synthesizing, or generating a video/image. The video source may include a video/image capture device and/or a video/image generating device. The video/image capture device may include, for example, one or more cameras, video/image archives including previously captured video/images, or the like. The video/image generating device may include, for example, a computer, a tablet and a smartphone, and may (electronically) generate a video/image. For example, a virtual video/image may be generated through a computer or the like. In this case, the video/image capturing process may be replaced by a process of generating related data.

The encoding apparatus may encode an input video/image. The encoding apparatus may perform a series of procedures such as prediction, transform, and quantization for compression and coding efficiency. The encoded data (encoded video/image information) may be output in the form of a bitstream.

The transmitter may transmit the encoded video/image information or data output in the form of a bitstream to the receiver of the receive device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format, and may include an element for transmission through a broadcast/communication network. The receiver may receive/extract the bitstream and transmit the received/extracted bitstream to the decoding apparatus.

The decoding apparatus may decode a video/image by performing a series of procedures such as dequantization, inverse transform, prediction, and the like corresponding to the operation of the encoding apparatus.

The renderer may render the decoded video/image. The rendered video/image may be displayed through the display.

Figure 2:
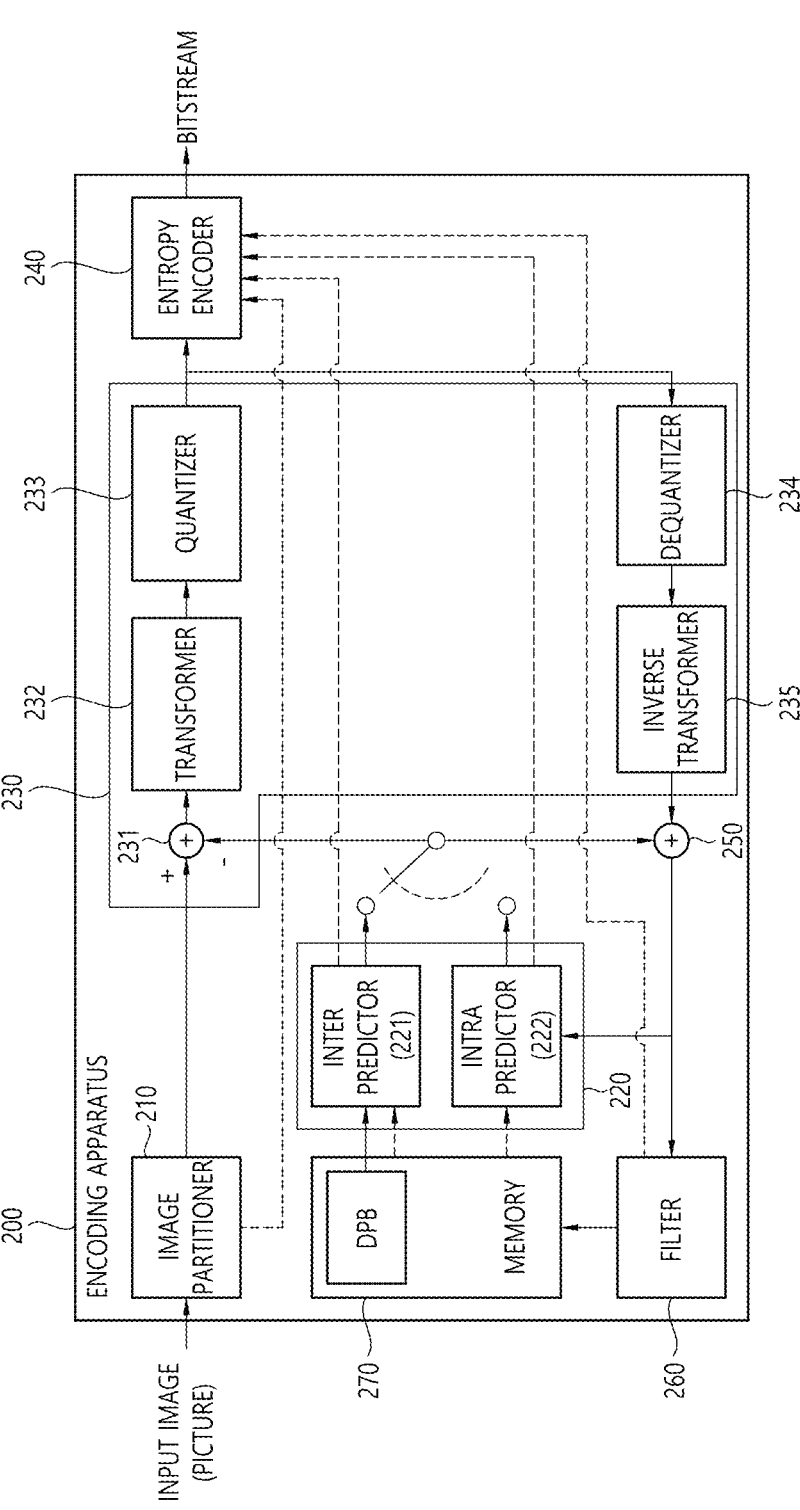
FIG. 2 is a diagram schematically illustrating a configuration of a video/image encoding apparatus to which the present disclosure is applicable.

FIG. 2 is a diagram schematically illustrating a configuration of a video/image encoding apparatus to which the present disclosure is applicable. Hereinafter, what is referred to as the video encoding apparatus may include an image encoding apparatus.

Referring to FIG. 2, the encoding apparatus 200 may include an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be constituted by one or more hardware components (e.g., encoder chipsets or processors) according to an embodiment. Further, the memory 270 may include a decoded picture buffer (DPB), and may be constituted by a digital storage medium. The hardware component may further include the memory 270 as an internal/external component.

The image partitioner 210 may partition an input image (or a picture or a frame) input to the encoding apparatus 200 into one or more processing units. As one example, the processing unit may be called a coding unit (CU). In this case, starting with a coding tree unit (CTU) or the largest coding unit (LCU), the coding unit may be recursively partitioned according to the Quad-tree binary-tree ternary-tree (QTBTTT) structure. For example, one coding unit may be divided into a plurality of coding units of a deeper depth based on the quad-tree structure, the binary-tree structure, and/or the ternary structure. In this case, for example, the quad-tree structure may be applied first and the binary-tree structure and/or the ternary structure may be applied later. Alternatively, the binary-tree structure may be applied first. The coding procedure according to the present disclosure may be performed based on the final coding unit which is not further partitioned. In this case, the maximum coding unit may be used directly as a final coding unit based on coding efficiency according to the image characteristic. Alternatively, the coding unit may be recursively partitioned into coding units of a further deeper depth as needed, so that the coding unit of an optimal size may be used as a final coding unit. Here, the coding procedure may include procedures such as prediction, transform, and reconstruction, which will be described later. As another example, the processing unit may further include a prediction unit (PU) or a transform unit (TU). In this case, the prediction unit and the transform unit may be split or partitioned from the above-described final coding unit. The prediction unit may be a unit of sample prediction, and the transform unit may be a unit for deriving a transform coefficient and/or a unit for deriving a residual signal from a transform coefficient.

The unit and a term such as a block, an area, or the like may be used in place of each other according to circumstances. In a general case, an M×N block may represent a set of samples or transform coefficients consisting of M columns and N rows. The sample may generally represent a pixel or a value of a pixel, and may represent only a pixel/pixel value of a luma component, or only a pixel/pixel value of a chroma component. The sample may be used as a term corresponding to a pixel or a pel of one picture (or image).

The subtractor 231 subtracts a prediction signal (predicted block, prediction sample array) output from the predictor 220 from an input image signal (original block, original sample array) to generate a residual signal (residual block, residual sample array), and the generated residual signal is transmitted to the transformer 232. The predictor 220 may perform prediction on a processing target block (hereinafter, referred to as 'current block'), and may generate a predicted block including prediction samples for the current block. The predictor 220 may determine whether intra prediction or inter prediction is applied on a current block or CU basis. As discussed later in the description of each prediction mode, the predictor may generate various information relating to prediction, such as prediction mode information, and transmit the generated information to the entropy encoder 240. The information on the prediction may be encoded in the entropy encoder 240 and output in the form of a bitstream.

The intra predictor 222 may predict the current block by referring to samples in the current picture. The referred samples may be located in the neighbor of or apart from the current block according to the prediction mode. In the intra prediction, prediction modes may include a plurality of non-directional modes and a plurality of directional modes. The non-directional modes may include, for example, a DC mode and a planar mode. The directional mode may include, for example, 33 directional prediction modes or 65 directional prediction modes according to the degree of detail of the prediction direction. However, this is merely an example, and more or less directional prediction modes may be used depending on a setting. The intra predictor 222 may determine the prediction mode applied to the current block by using the prediction mode applied to the neighboring block.

The inter predictor 221 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. The reference picture including the reference block and the reference picture including the temporal neighboring block may be same to each other or different from each other. The temporal neighboring block may be called a collocated reference block, a collocated CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion information prediction (motion vector prediction, MVP) mode, the motion vector of the neighboring block may be used as a motion vector predictor and the motion vector of the current block may be indicated by signaling a motion vector difference.

The predictor 220 may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The prediction signal generated through the inter predictor 221 and/or the intra predictor 222 may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than the square one.

The quantizer 233 may quantize the transform coefficients and transmit them to the entropy encoder 240, and the entropy encoder 240 may encode the quantized signal (information on the quantized transform coefficients) and output the encoded signal in a bitstream. The information on the quantized transform coefficients may be referred to as residual information. The quantizer 233 may rearrange block type quantized transform coefficients into a one-dimensional vector form based on a coefficient scan order, and generate information on the quantized transform coefficients based on the quantized transform coefficients of the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g. values of syntax elements, etc.) together or separately. Encoded information (e.g., encoded video/image information) may be transmitted or stored on a unit basis of a network abstraction layer (NAL) in the form of a bitstream. The video/image information may further include information on various parameter sets such as an adaptation parameter set (APS), a picture parameter set (PPS), a sequence parameter set (SPS), a video parameter set (VPS) or the like. Further, the video/image information may further include general constraint information. In the present disclosure, information and/or syntax elements which are transmitted/signaled to the decoding apparatus from the encoding apparatus may be included in video/image information. The video/image information may be encoded through the above-described encoding procedure and included in the bitstream. The bitstream may be transmitted through a network, or stored in a digital storage medium. Here, the network may include a broadcast network, a communication network and/or the like, and the digital storage medium may include various storage media such as USB, SD, CD, DVD, Blu-ray, HDD, SSD, and the like. A transmitter (not shown) which transmits a signal output from the entropy encoder 240 and/or a storage (not shown) which stores it may be configured as an internal/external element of the encoding apparatus 200, or the transmitter may be included in the entropy encoder 240.

Quantized transform coefficients output from the quantizer 233 may be used to generate a prediction signal. For example, by applying dequantization and inverse transform to quantized transform coefficients through the dequantizer 234 and the inverse transformer 235, the residual signal (residual block or residual samples) may be reconstructed. The adder 155 adds the reconstructed residual signal to a prediction signal output from the inter predictor 221 or the intra predictor 222, so that a reconstructed signal (reconstructed picture, reconstructed block, reconstructed sample array) may be generated. When there is no residual for a processing target block as in a case where the skip mode is applied, the predicted block may be used as a reconstructed block. The adder 250 may be called a reconstructor or a reconstructed block generator. The generated reconstructed signal may be used for intra prediction of a next processing target block in the current block, and as described later, may be used for inter prediction of a next picture through filtering.

Meanwhile, in the picture encoding and/or reconstructing process, luma mapping with chroma scaling (LMCS) may be applied.

The filter 260 may improve subjective/objective video quality by applying the filtering to the reconstructed signal. For example, the filter 260 may generate a modified reconstructed picture by applying various filtering methods to the reconstructed picture, and may store the modified reconstructed picture in the memory 270, specifically in the DPB of the memory 270. The various filtering methods may include, for example, deblocking filtering, sample adaptive offset, an adaptive loop filter, a bilateral filter or the like. As discussed later in the description of each filtering method, the filter 260 may generate various information relating to filtering, and transmit the generated information to the entropy encoder 240. The information on the filtering may be encoded in the entropy encoder 240 and output in the form of a bitstream.

The modified reconstructed picture which has been transmitted to the memory 270 may be used as a reference picture in the inter predictor 221. Through this, the encoding apparatus can avoid prediction mismatch in the encoding apparatus 100 and a decoding apparatus when the inter prediction is applied, and can also improve coding efficiency.

The memory 270 DPB may store the modified reconstructed picture in order to use it as a reference picture in the inter predictor 221. The memory 270 may store motion information of a block in the current picture, from which motion information has been derived (or encoded) and/or motion information of blocks in an already reconstructed picture. The stored motion information may be transmitted to the inter predictor 221 to be utilized as motion information of a neighboring block or motion information of a temporal neighboring block. The memory 270 may store reconstructed samples of reconstructed blocks in the current picture, and transmit them to the intra predictor 222.

Figure 3:
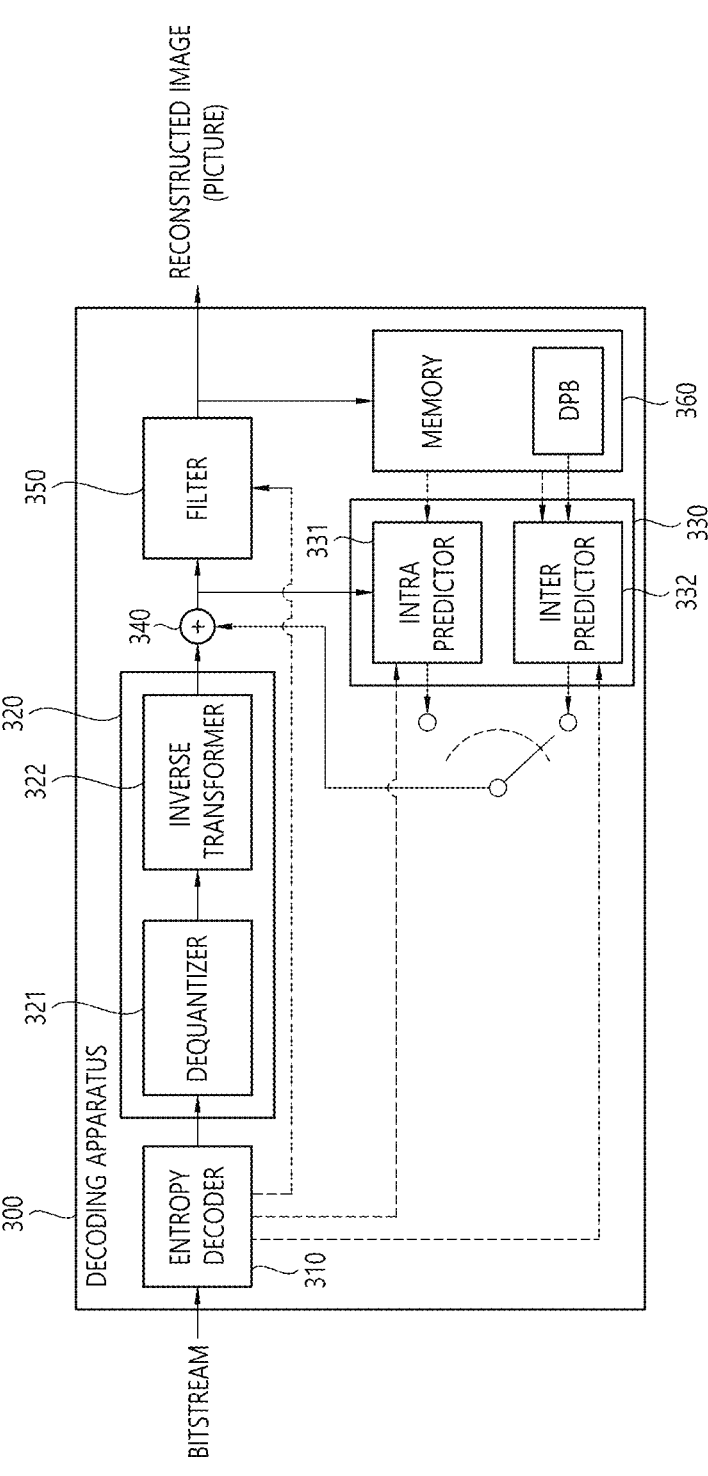
FIG. 3 is a diagram schematically illustrating a configuration of a video/image decoding apparatus to which the present disclosure is applicable.

FIG. 3 is a diagram schematically illustrating a configuration of a video/image decoding apparatus to which the present disclosure is applicable.

Referring to FIG. 3, the video decoding apparatus 300 may include an entropy decoder 310, a residual processor 320, a predictor 330, an adder 340, a filter 350 and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350, which have been described above, may be constituted by one or more hardware components (e.g., decoder chipsets or processors) according to an embodiment. Further, the memory 360 may include a decoded picture buffer (DPB), and may be constituted by a digital storage medium. The hardware component may further include the memory 360 as an internal/external component.

When a bitstream including video/image information is input, the decoding apparatus 300 may reconstruct an image correspondingly to a process by which video/image information has been processed in the encoding apparatus of FIG. 2. For example, the decoding apparatus 300 may derive units/blocks based on information relating to block partition obtained from the bitstream. The decoding apparatus 300 may perform decoding by using a processing unit applied in the encoding apparatus. Therefore, the processing unit of decoding may be, for example, a coding unit, which may be partitioned along the quad-tree structure, the binary-tree structure, and/or the ternary-tree structure from a coding tree unit or a largest coding unit. One or more transform units may be derived from the coding unit. And, the reconstructed image signal decoded and output through the decoding apparatus 300 may be reproduced through a reproducer.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) required for image reconstruction (or picture reconstruction). The video/image information may further include information on various parameter sets such as an adaptation parameter set (APS), a picture parameter set (PPS), a sequence parameter set (SPS), a video parameter set (VPS) or the like. Further, the video/image information may further include general constraint information. The decoding apparatus may decode a picture further based on information on the parameter set and/or the general constraint information. In the present disclosure, signaled/received information and/or syntax elements, which will be described later, may be decoded through the decoding procedure and be obtained from the bitstream. For example, the entropy decoder 310 may decode information in the bitstream based on a coding method such as exponential Golomb encoding, CAVLC, CABAC, or the like, and may output a value of a syntax element necessary for image reconstruction and quantized values of a transform coefficient regarding a residual. More specifically, a CABAC entropy decoding method may receive a bin corresponding to each syntax element in a bitstream, determine a context model using decoding target syntax element information and decoding information of neighboring and decoding target blocks, or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model. Information on prediction among information decoded in the entropy decoder 310 may be provided to the predictor (inter predictor 332 and intra predictor 331), and residual values, that is, quantized transform coefficients, on which entropy decoding has been performed in the entropy decoder 310, and associated parameter information may be input to the residual processor 320. The residual processor 320 may derive a residual signal (residual block, residual samples, residual sample array). Further, information on filtering among information decoded in the entropy decoder 310 may be provided to the filter 350. Meanwhile, a receiver (not shown) which receives a signal output from the encoding apparatus may further constitute the decoding apparatus 300 as an internal/external element, and the receiver may be a component of the entropy decoder 310. Meanwhile, the decoding apparatus according to the present disclosure may be called a video/image/picture coding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may output transform coefficients by dequantizing the quantized transform coefficients. The dequantizer 321 may rearrange the quantized transform coefficients in the form of a two-dimensional block. In this case, the rearrangement may perform rearrangement based on an order of coefficient scanning which has been performed in the encoding apparatus. The dequantizer 321 may perform dequantization on the quantized transform coefficients using quantization parameter (e.g., quantization step size information), and obtain transform coefficients.

The dequantizer 322 obtains a residual signal (residual block, residual sample array) by inverse transforming transform coefficients.

The predictor may perform prediction on the current block, and generate a predicted block including prediction samples for the current block. The predictor may determine whether intra prediction or inter prediction is applied to the current block based on the information on prediction output from the entropy decoder 310, and specifically may determine an intra/inter prediction mode.

The predictor may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). In addition, the predictor may perform intra block copy (IBC) for prediction on a block. The intra block copy may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The intra predictor 331 may predict the current block by referring to the samples in the current picture. The referred samples may be located in the neighbor of or apart from the current block according to the prediction mode. In the intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. For example, the inter predictor 332 may configure a motion information candidate list based on neighboring blocks, and derive a motion vector and/or a reference picture index of the current block based on received candidate selection information. Inter prediction may be performed based on various prediction modes, and the information on prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor 330. When there is no residual for a processing target block as in a case where the skip mode is applied, the predicted block may be used as a reconstructed block.

The adder 340 may be called a reconstructor or a reconstructed block generator. The generated reconstructed signal may be used for intra prediction of a next processing target block in the current block, and as described later, may be output through filtering or be used for inter prediction of a next picture.

Meanwhile, in the picture decoding process, luma mapping with chroma scaling (LMCS) may be applied.

The filter 350 may improve subjective/objective video quality by applying the filtering to the reconstructed signal. For example, the filter 350 may generate a modified reconstructed picture by applying various filtering methods to the reconstructed picture, and may transmit the modified reconstructed picture in the memory 360, specifically in the DPB of the memory 360. The various filtering methods may include, for example, deblocking filtering, sample adaptive offset, an adaptive loop filter, a bilateral filter or the like.

The (modified) reconstructed picture which has been stored in the DPB of the memory 360 may be used as a reference picture in the inter predictor 332. The memory 360 may store motion information of a block in the current picture, from which motion information has been derived (or decoded) and/or motion information of blocks in an already reconstructed picture. The stored motion information may be transmitted to the inter predictor 260 to be utilized as motion information of a neighboring block or motion information of a temporal neighboring block. The memory 360 may store reconstructed samples of reconstructed blocks in the current picture, and transmit them to the intra predictor 331.

In this specification, the examples described in the predictor 330, the dequantizer 321, the inverse transformer 322, and the filter 350 of the decoding apparatus 300 may be similarly or correspondingly applied to the predictor 220, the dequantizer 234, the inverse transformer 235, and the filter 260 of the encoding apparatus 200, respectively.

As described above, prediction is performed in order to increase compression efficiency in performing video coding. Through this, a predicted block including prediction samples for a current block, which is a coding target block, may be generated. Here, the predicted block includes prediction samples in a space domain (or pixel domain). The predicted block may be identically derived in the encoding apparatus and the decoding apparatus, and the encoding apparatus may increase image coding efficiency by signaling to the decoding apparatus not original sample value of an original block itself but information on residual (residual information) between the original block and the predicted block. The decoding apparatus may derive a residual block including residual samples based on the residual information, generate a reconstructed block including reconstructed samples by adding the residual block to the predicted block, and generate a reconstructed picture including reconstructed blocks.

The residual information may be generated through transform and quantization procedures. For example, the encoding apparatus may derive a residual block between the original block and the predicted block, derive transform coefficients by performing a transform procedure on residual samples (residual sample array) included in the residual block, and derive quantized transform coefficients by performing a quantization procedure on the transform coefficients, so that it may signal associated residual information to the decoding apparatus (through a bitstream). Here, the residual information may include value information, position information, a transform technique, transform kernel, a quantization parameter or the like of the quantized transform coefficients. The decoding apparatus may perform a quantization/dequantization procedure and derive the residual samples (or residual sample block), based on residual information. The decoding apparatus may generate a reconstructed block based on a predicted block and the residual block. The encoding apparatus may derive a residual block by dequantizing/inverse transforming quantized transform coefficients for reference for inter prediction of a next picture, and may generate a reconstructed picture based on this.

Figure 4:
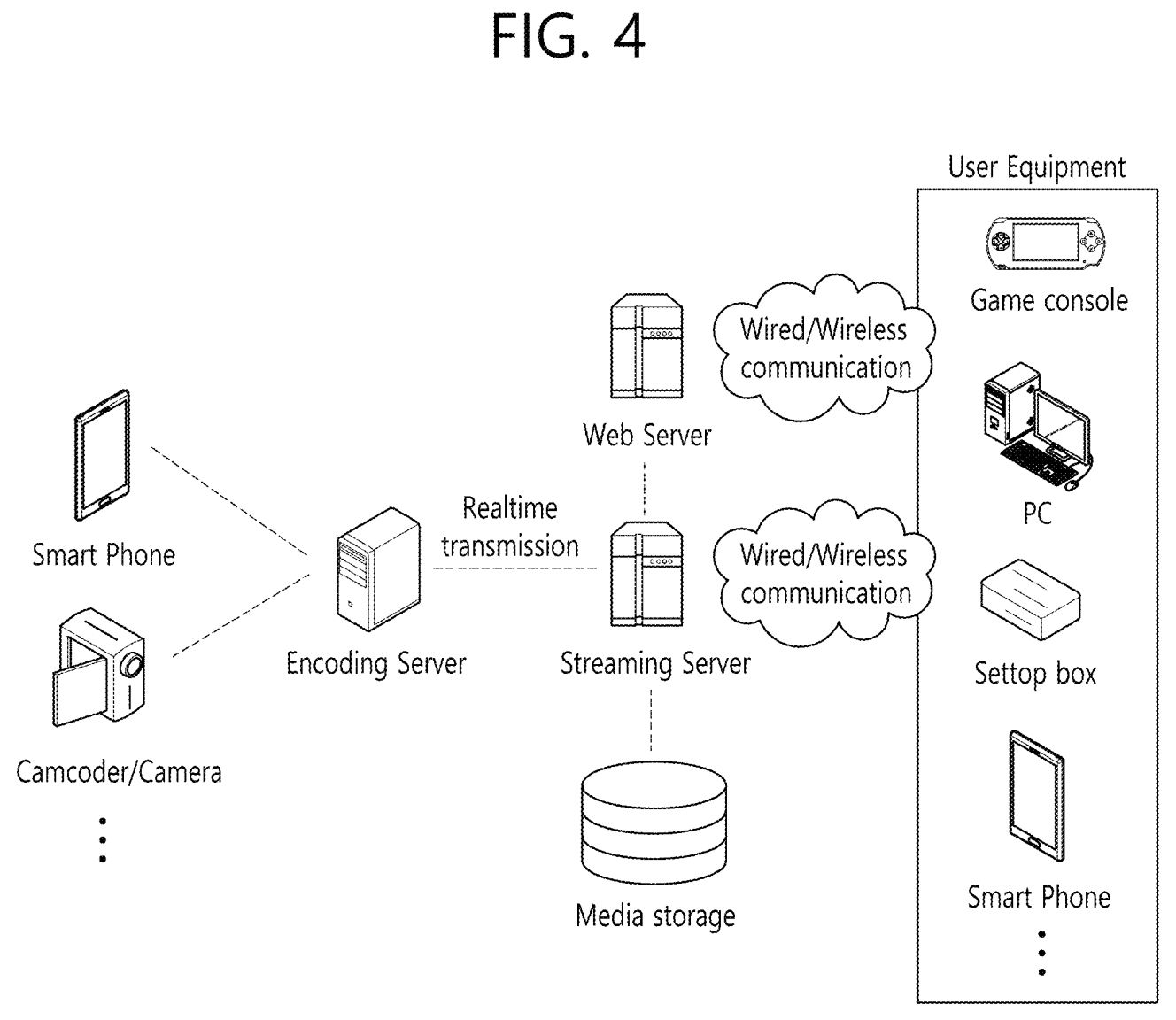

FIG. 4 illustrates the structure of a content streaming system to which the present disclosure is applied.

Further, the contents streaming system to which present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the multimedia input device, such as, the smart phone, the camera, the camcoder or the like, directly generates a bitstream, the encoding server may be omitted. The bitstream may be generated by an encoding method or a bitstream generation method to which the present disclosure is applied. And the streaming server may store the bitstream temporarily during a process to transmit or receive the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like. Each of servers in the contents streaming system may be operated as a distributed server, and in this case, data received by each server may be processed in distributed manner.

Figure 5:
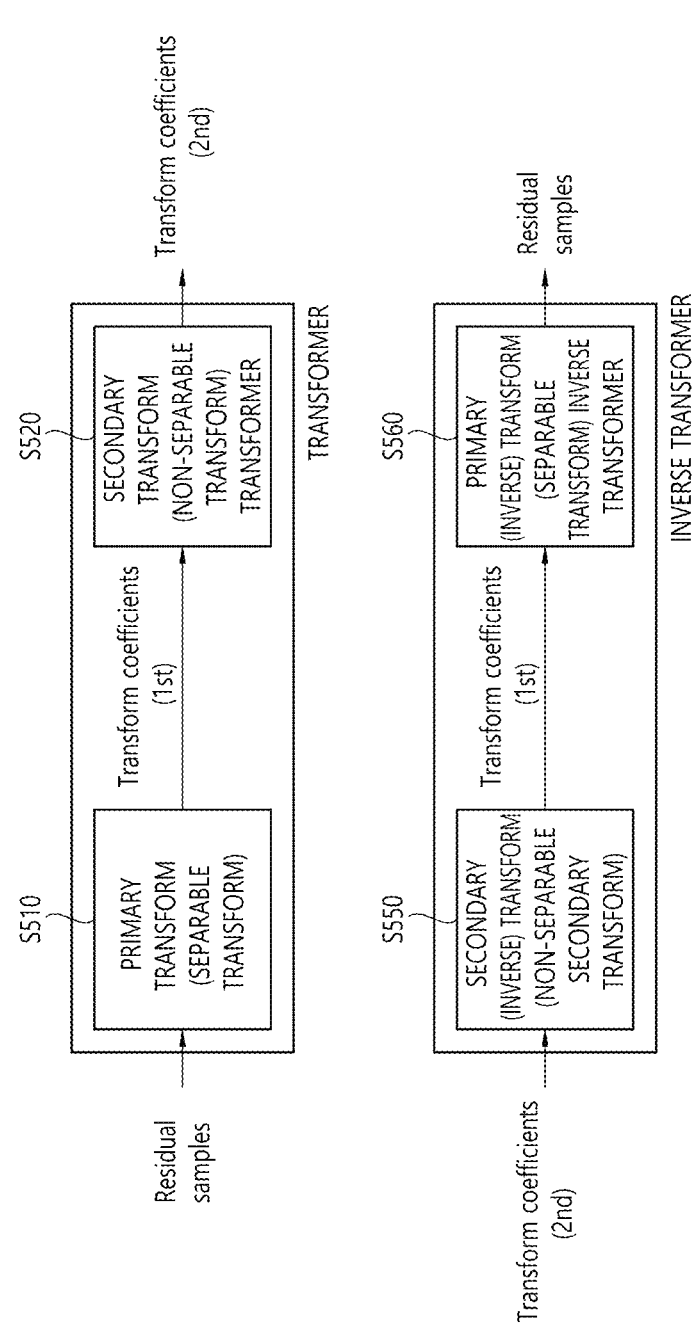
FIG. 5 is a diagram schematically illustrating a multiple transform technique according to an embodiment of the present disclosure.

FIG. 5 schematically illustrates a multiple transform technique according to an embodiment of the present disclosure.

Referring to FIG. 5, a transformer may correspond to the transformer in the encoding apparatus of foregoing FIG. 2, and an inverse transformer may correspond to the inverse transformer in the encoding apparatus of foregoing FIG. 2, or to the inverse transformer in the decoding apparatus of FIG. 3.

The transformer may derive (primary) transform coefficients by performing a primary transform based on residual samples (residual sample array) in a residual block (S510). This primary transform may be referred to as a core transform. Herein, the primary transform may be based on multiple transform selection (MTS), and when a multiple transform is applied as the primary transform, it may be referred to as a multiple core transform.

The multiple core transform may represent a method of transforming additionally using discrete cosine transform (DCT) type 2 and discrete sine transform (DST) type 7, DCT type 8, and/or DST type 1. That is, the multiple core transform may represent a transform method of transforming a residual signal (or residual block) of a space domain into transform coefficients (or primary transform coefficients) of a frequency domain based on a plurality of transform kernels selected from among the DCT type 2, the DST type 7, the DCT type 8 and the DST type 1. Herein, the primary transform coefficients may be called temporary transform coefficients from the viewpoint of the transformer.

In other words, when the conventional transform method is applied, transform coefficients might be generated by applying transform from a space domain to a frequency domain for a residual signal (or residual block) based on the DCT type 2. Unlike to this, when the multiple core transform is applied, transform coefficients (or primary transform coefficients) may be generated by applying transform from a space domain to a frequency domain for a residual signal (or residual block) based on the DCT type 2, the DST type 7, the DCT type 8, and/or DST type 1. Herein, the DCT type 2, the DST type 7, the DCT type 8, and the DST type 1 may be called a transform type, transform kernel or transform core. These DCT/DST transform types can be defined based on basis functions.

When the multiple core transform is performed, a vertical transform kernel and a horizontal transform kernel for a target block may be selected from among the transform kernels, a vertical transform may be performed on the target block based on the vertical transform kernel, and a horizontal transform may be performed on the target block based on the horizontal transform kernel. Here, the horizontal transform may indicate a transform on horizontal components of the target block, and the vertical transform may indicate a transform on vertical components of the target block. The vertical transform kernel/horizontal transform kernel may be adaptively determined based on a prediction mode and/or a transform index for the target block (CU or subblock) including a residual block.

Further, according to an example, if the primary transform is performed by applying the MTS, a mapping relationship for transform kernels may be set by setting specific basis functions to predetermined values and combining basis functions to be applied in the vertical transform or the horizontal transform. For example, when the horizontal transform kernel is expressed as trTypeHor and the vertical direction transform kernel is expressed as trTypeVer, a trTypeHor or trType Ver value of 0 may be set to DCT2, a trTypeHor or trType Ver value of 1 may be set to DST7, and a trTypeHor or trType Ver value of 2 may be set to DCT8.

In this case, MTS index information may be encoded and signaled to the decoding apparatus to indicate any one of a plurality of transform kernel sets. For example, an MTS index of 0 may indicate that both trTypeHor and trType Ver values are 0, an MTS index of 1 may indicate that both trTypeHor and trTypeVer values are 1, an MTS index of 2 may indicate that the trTypeHor value is 2 and the trTypeVer value. Is 1, an MTS index of 3 may indicate that the trTypeHor value is 1 and the trType Ver value is 2, and an MTS index of 4 may indicate that both trTypeHor and trType Ver values are 2.

In one example, transform kernel sets according to MTS index information are illustrated in the following table.

TABLE 1

| tu_mts_idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

The transformer may perform a secondary transform based on the (primary) transform coefficients to derive modified (secondary) transform coefficients (S520). The primary transform is a transform from a spatial domain to a frequency domain, and the secondary transform refers to transforming into a more compact expression using a correlation existing between (primary) transform coefficients. The secondary transform may include a non-separable transform. In this case, the secondary transform may be referred to as a non-separable secondary transform (NSST) or a mode-dependent non-separable secondary transform (MDNSST). The NSST may represent a transform that secondarily transforms (primary) transform coefficients derived through the primary transform based on a non-separable transform matrix to generate modified transform coefficients (or secondary transform coefficients) for a residual signal. Here, the transform may be applied at once without separating (or independently applying a horizontal/vertical transform) a vertical transform and a horizontal transform to the (primary) transform coefficients based on the non-separable transform matrix. In other words, the NSST is not separately applied to the (primary) transform coefficients in a vertical direction and a horizontal direction, and may represent, for example, a transform method of rearranging two-dimensional signals (transform coefficients) into a one-dimensional signal through a specific predetermined direction (e.g., row-first direction or column-first direction) and then generating modified transform coefficients (or secondary transform coefficients) based on the non-separable transform matrix. For example, a row-first order is to dispose in a line in order of a 1st row, a 2nd row, . . . , an Nth row for M×N blocks, and a column-first order is to dispose in a line in order of a 1st column, a 2nd column, . . . , an Mth column for M×N blocks. The NSST may be applied to a top-left region of a block (hereinafter, referred to as a transform coefficient block) configured with (primary) transform coefficients. For example, when both a width W and height H of the transform coefficient block are 8 or more, an 8×8 NSST may be applied to the top-left 8×8 region of the transform coefficient block. Further, while both the width (W) and height (H) of the transform coefficient block are 4 or more, when the width (W) or height (H) of the transform coefficient block is smaller than 8, 4×4 NSST may be applied to the top-left min (8, W)×min (8,H) region of the transform coefficient block. However, the embodiment is not limited thereto, and for example, even if only the condition that the width W or the height H of the transform coefficient block is 4 or greater is satisfied, the 4×4 NSST may be applied to the top-left end min (8, W)×min(8,H) region of the transform coefficient block.

Specifically, for example, if a 4×4 input block is used, the non-separable secondary transform may be performed as follows.

The 4×4 input block X may be represented as follows.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \qquad \text{[Equation 1]}$$

If the X is represented in the form of a vector, the vector $\vec{X}$ may be represented as below.

$$\vec{X} = [X_{00}\ X_{01}\ X_{02}\ X_{03}\ X_{10}\ X_{11}\ X_{12}\ X_{13}\ X_{20}\ X_{21}\ X_{22}\ X_{23}\ X_{30}\ X_{31}\ X_{32}\ X_{33}]^T \qquad \text{[Equation 2]}$$

In Equation 2, the vector $\vec{X}$ is a one-dimensional vector obtained by rearranging the two-dimensional block X of Equation 1 according to the row-first order.

In this case, the secondary non-separable transform may be calculated as below.

$$\vec{F} = T \cdot \vec{X} \qquad \text{[Equation 3]}$$

In this equation, $\vec{F}$ represents a transform coefficient vector, and T represents a 16×16 (non-separable) transform matrix.

Through foregoing Equation 3, a 16×1 transform coefficient vector $\vec{F}$ may be derived, and the $\vec{F}$ may be reorganized into a 4×4 block through a scan order (horizontal, vertical, diagonal and the like). However, the above-described calculation is an example, and hypercube-Givens transform (HyGT) or the like may be used for the calculation of the non-separable secondary transform in order to reduce the computational complexity of the non-separable secondary transform.

Meanwhile, in the non-separable secondary transform, a transform kernel (or transform core, transform type) may be selected to be mode dependent. In this case, the mode may include the intra prediction mode and/or the inter prediction mode.

As described above, the non-separable secondary transform may be performed based on an 8×8 transform or a 4×4 transform determined based on the width (W) and the height (H) of the transform coefficient block. The 8×8 transform refers to a transform that is applicable to an 8×8 region included in the transform coefficient block when both W and H are equal to or greater than 8, and the 8×8 region may be a top-left 8×8 region in the transform coefficient block. Similarly, the 4×4 transform refers to a transform that is applicable to a 4×4 region included in the transform coefficient block when both W and H are equal to or greater than 4, and the 4×4 region may be a top-left 4×4 region in the transform coefficient block. For example, an 8×8 transform kernel matrix may be a 64×64/16×64 matrix, and a 4×4 transform kernel matrix may be a 16×16/8×16 matrix.

Here, to select a mode-dependent transform kernel, two non-separable secondary transform kernels per transform set for a non-separable secondary transform may be configured for both the 8×8 transform and the 4×4 transform, and there may be four transform sets. That is, four transform sets may be configured for the 8×8 transform, and four transform sets may be configured for the 4×4 transform. In this case, each of the four transform sets for the 8×8 transform may include two 8×8 transform kernels, and each of the four transform sets for the 4×4 transform may include two 4×4 transform kernels.

However, as the size of the transform, that is, the size of a region to which the transform is applied, may be, for example, a size other than 8×8 or 4×4, the number of sets may be n, and the number of transform kernels in each set may be k.

The transform set may be referred to as an NSST set or an LFNST set. A specific set among the transform sets may be selected, for example, based on the intra prediction mode of the current block (CU or subblock). A low-frequency non-separable transform (LFNST) may be an example of a reduced non-separable transform, which will be described later, and represents a non-separable transform for a low frequency component.

For reference, for example, the intra prediction mode may include two non-directional (or non-angular) intra prediction modes and 65 directional (or angular) intra prediction modes. The non-directional intra prediction modes may include a planar intra prediction mode of No. 0 and a DC intra prediction mode of No. 1, and the directional intra prediction modes may include 65 intra prediction modes of Nos. 2 to 66. However, this is an example, and this document may be applied even when the number of intra prediction modes is different. Meanwhile, in some cases, intra prediction mode No. 67 may be further used, and the intra prediction mode No. 67 may represent a linear model (LM) mode.

Figure 6:
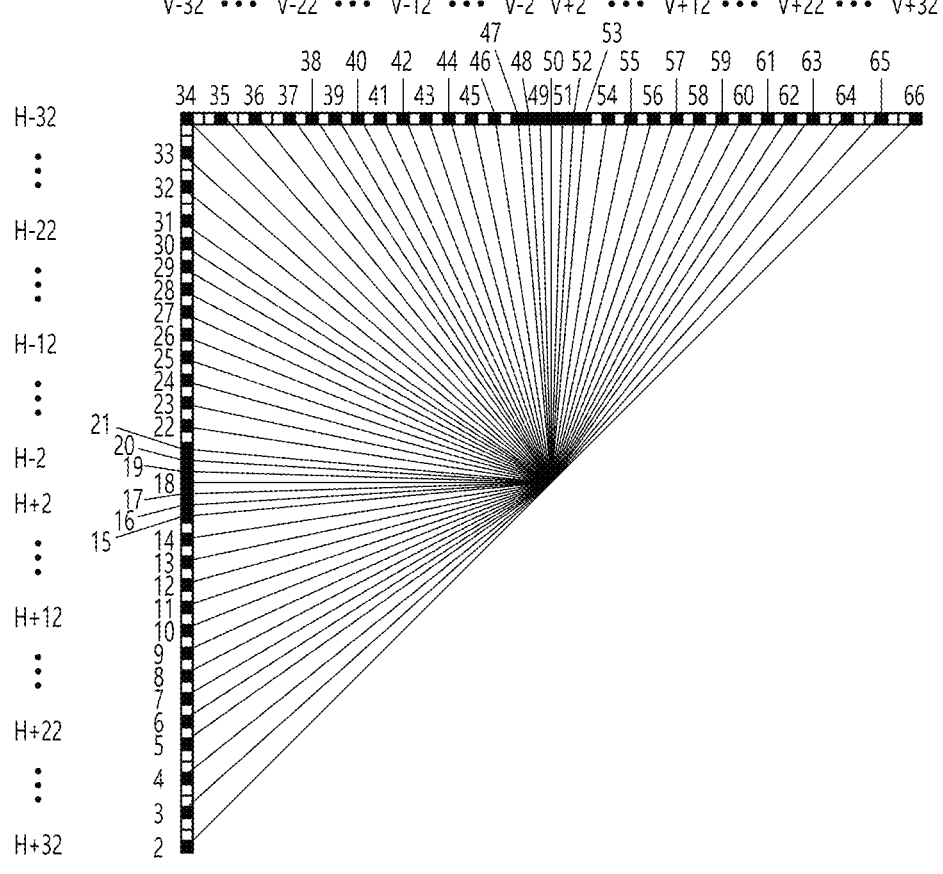
FIG. 6 is a diagram exemplarily illustrating intra-directional modes of 65 prediction directions.

FIG. 6 exemplarily shows intra directional modes of 65 prediction directions.

Referring to FIG. 6, on the basis of intra prediction mode 34 having a left upward diagonal prediction direction, the intra prediction modes may be divided into intra prediction modes having horizontal directionality and intra prediction modes having vertical directionality. In FIG. 6, H and V denote horizontal directionality and vertical directionality, respectively, and numerals −32 to 32 indicate displacements in ¹⁄₃₂ units on a sample grid position. These numerals may represent an offset for a mode index value. Intra prediction modes 2 to 33 have the horizontal directionality, and intra prediction modes 34 to 66 have the vertical directionality. Strictly speaking, intra prediction mode 34 may be considered as being neither horizontal nor vertical, but may be classified as belonging to the horizontal directionality in determining a transform set of a secondary transform. This is because input data is transposed to be used for a vertical direction mode symmetrical on the basis of intra prediction mode 34, and an input data alignment method for a horizontal mode is used for intra prediction mode 34. Transposing input data means that rows and columns of two-dimensional M×N block data are switched into N×M data. Intra prediction mode 18 and intra prediction mode 50 may represent a horizontal intra prediction mode and a vertical intra prediction mode, respectively, and intra prediction mode 2 may be referred to as a right upward diagonal intra prediction mode because intra prediction mode 2 has a left reference pixel and performs prediction in a right upward direction. Likewise, intra prediction mode 34 may be referred to as a right downward diagonal intra prediction mode, and intra prediction mode 66 may be referred to as a left downward diagonal intra prediction mode.

According to an example, the four transform sets according to the intra prediction mode may be mapped, for example, as shown in the following table.

TABLE 2

| predModeIntra | lfnstTrSetIdx |
|---|---|
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |

As shown in Table 2, any one of the four transform sets, that is, lfnstTrSetIdx, may be mapped to any one of four indexes, that is, 0 to 3, according to the intra prediction mode.

When it is determined that a specific set is used for the non-separable transform, one of k transform kernels in the specific set may be selected through a non-separable secondary transform index. An encoding apparatus may derive a non-separable secondary transform index indicating a specific transform kernel based on a rate-distortion (RD) check and may signal the non-separable secondary transform index to a decoding apparatus. The decoding apparatus may select one of the k transform kernels in the specific set based on the non-separable secondary transform index. For example, lfnst index value 0 may refer to a first non-separable secondary transform kernel, lfnst index value 1 may refer to a second non-separable secondary transform kernel, and lfnst index value 2 may refer to a third non-separable secondary transform kernel. Alternatively, lfnst index value 0 may indicate that the first non-separable secondary transform is not applied to the target block, and lfnst index values 1 to 3 may indicate the three transform kernels.

The transformer may perform the non-separable secondary transform based on the selected transform kernels, and may obtain modified (secondary) transform coefficients. As described above, the modified transform coefficients may be derived as transform coefficients quantized through the quantizer, and may be encoded and signaled to the decoding apparatus and transferred to the dequantizer/inverse transformer in the encoding apparatus.

Meanwhile, as described above, if the secondary transform is omitted, (primary) transform coefficients, which are an output of the primary (separable) transform, may be derived as transform coefficients quantized through the quantizer as described above, and may be encoded and signaled to the decoding apparatus and transferred to the dequantizer/inverse transformer in the encoding apparatus.

The inverse transformer may perform a series of procedures in the inverse order to that in which they have been performed in the above-described transformer. The inverse transformer may receive (dequantized) transformer coefficients, and derive (primary) transform coefficients by performing a secondary (inverse) transform (S550), and may obtain a residual block (residual samples) by performing a primary (inverse) transform on the (primary) transform coefficients (S560). In this connection, the primary transform coefficients may be called modified transform coefficients from the viewpoint of the inverse transformer. As described above, the encoding apparatus and the decoding apparatus may generate the reconstructed block based on the residual block and the predicted block, and may generate the reconstructed picture based on the reconstructed block.

The decoding apparatus may further include a secondary inverse transform application determinator (or an element to determine whether to apply a secondary inverse transform) and a secondary inverse transform determinator (or an element to determine a secondary inverse transform). The secondary inverse transform application determinator may determine whether to apply a secondary inverse transform. For example, the secondary inverse transform may be an NSST, an RST, or an LFNST and the secondary inverse transform application determinator may determine whether to apply the secondary inverse transform based on a secondary transform flag obtained by parsing the bitstream. In another example, the secondary inverse transform application determinator may determine whether to apply the secondary inverse transform based on a transform coefficient of a residual block.

The secondary inverse transform determinator may determine a secondary inverse transform. In this case, the secondary inverse transform determinator may determine the secondary inverse transform applied to the current block based on an LFNST (NSST or RST) transform set specified according to an intra prediction mode. In an embodiment, a secondary transform determination method may be determined depending on a primary transform determination method. Various combinations of primary transforms and secondary transforms may be determined according to the intra prediction mode. Further, in an example, the secondary inverse transform determinator may determine a region to which a secondary inverse transform is applied based on the size of the current block.

Meanwhile, as described above, if the secondary (inverse) transform is omitted, (dequantized) transform coefficients may be received, the primary (separable) inverse transform may be performed, and the residual block (residual samples) may be obtained. As described above, the encoding apparatus and the decoding apparatus may generate the reconstructed block based on the residual block and the predicted block, and may generate the reconstructed picture based on the reconstructed block.

Meanwhile, in the present disclosure, a reduced secondary transform (RST) in which the size of a transform matrix (kernel) is reduced may be applied in the concept of NSST in order to reduce the amount of computation and memory required for the non-separable secondary transform.

Meanwhile, the transform kernel, the transform matrix, and the coefficient constituting the transform kernel matrix, that is, the kernel coefficient or the matrix coefficient, described in the present disclosure may be expressed in 8 bits. This may be a condition for implementation in the decoding apparatus and the encoding apparatus, and may reduce the amount of memory required to store the transform kernel with a performance degradation that can be reasonably accommodated compared to the existing 9 bits or 10 bits. In addition, the expressing of the kernel matrix in 8 bits may allow a small multiplier to be used, and may be more suitable for single instruction multiple data (SIMD) instructions used for optimal software implementation.

In the present specification, the term "RST" may mean a transform which is performed on residual samples for a target block based on a transform matrix whose size is reduced according to a reduced factor. In the case of performing the reduced transform, the amount of computation required for transform may be reduced due to a reduction in the size of the transform matrix. That is, the RST may be used to address the computational complexity issue occurring at the non-separable transform or the transform of a block of a great size.

RST may be referred to as various terms, such as reduced transform, reduced secondary transform, reduction transform, simplified transform, simple transform, and the like, and the name which RST may be referred to as is not limited to the listed examples. Alternatively, since the RST is mainly performed in a low frequency region including a non-zero coefficient in a transform block, it may be referred to as a Low-Frequency Non-Separable Transform (LFNST). The transform index may be referred to as an LFNST index.

Meanwhile, when the secondary inverse transform is performed based on RST, the inverse transformer 235 of the encoding apparatus 200 and the inverse transformer 322 of the decoding apparatus 300 may include an inverse reduced secondary transformer which derives modified transform coefficients based on the inverse RST of the transform coefficients, and an inverse primary transformer which derives residual samples for the target block based on the inverse primary transform of the modified transform coefficients. The inverse primary transform refers to the inverse transform of the primary transform applied to the residual.

In the present disclosure, deriving a transform coefficient based on a transform may refer to deriving a transform coefficient by applying the transform.

Figure 7:
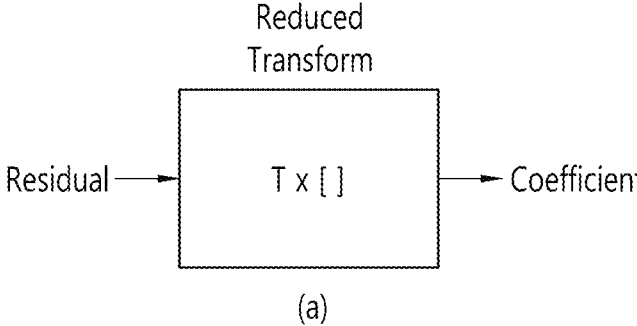
FIG. 7 is a diagram for describing an RST according to an embodiment of the present disclosure.
Figure 7:
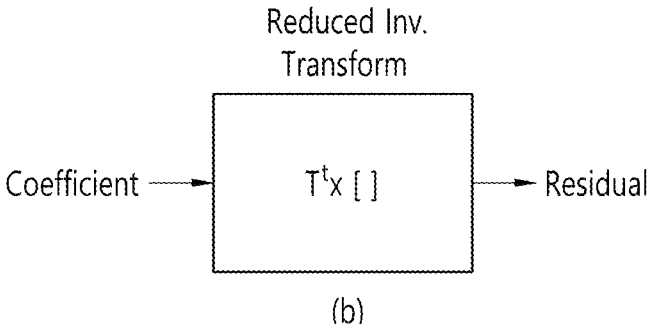

FIG. 7 is a diagram illustrating an RST according to an embodiment of the present disclosure.

In the present disclosure, a "target block" may refer to a current block to be coded, a residual block, or a transform block.

In the RST according to an example, an N-dimensional vector may be mapped to an R-dimensional vector located in another space, so that the reduced transform matrix may be determined, where R is less than N. N may mean the square of the length of a side of a block to which the transform is applied, or the total number of transform coefficients corresponding to a block to which the transform is applied, and the reduced factor may mean an R/N value. The reduced factor may be referred to as a reduced factor, reduction factor, simplified factor, simple factor or other various terms. Meanwhile, R may be referred to as a reduced coefficient, but according to circumstances, the reduced factor may mean R. Further, according to circumstances, the reduced factor may mean the N/R value.

In an example, the reduced factor or the reduced coefficient may be signaled through a bitstream, but the example is not limited to this. For example, a predefined value for the reduced factor or the reduced coefficient may be stored in each of the encoding apparatus 200 and the decoding apparatus 300, and in this case, the reduced factor or the reduced coefficient may not be signaled separately.

The size of the reduced transform matrix according to an example may be R×N less than N×N, the size of a conventional transform matrix, and may be defined as in Equation 4 below.

$$T_{R \times N} = \begin{bmatrix} t_{11} & t_{12} & t_{13} & \cdots & t_{1N} \\ t_{21} & t_{22} & t_{23} & & t_{2N} \\ & \vdots & & \ddots & \vdots \\ t_{R1} & t_{R2} & t_{R3} & \cdots & t_{RN} \end{bmatrix} \quad \text{[Equation 4]}$$

The matrix T in the Reduced Transform block shown in (a) of FIG. 7 may mean the matrix $T_{R \times N}$ of Equation 4. As shown in (a) of FIG. 7, when the reduced transform matrix $T_{R \times N}$ is multiplied to residual samples for the target block, transform coefficients for the target block may be derived.

In an example, if the size of the block to which the transform is applied is 8×8 and R=16 (i.e., R/N=16/64=¼), then the RST according to (a) of FIG. 7 may be expressed as a matrix operation as shown in Equation 5 below. In this case, memory and multiplication calculation can be reduced to approximately ¼ by the reduced factor.

In the present disclosure, a matrix operation may be understood as an operation of multiplying a column vector by a matrix, disposed on the left of the column vector, to obtain a column vector.

$$\begin{bmatrix} t_{1,1} & t_{1,2} & t_{1,3} & \cdots & t_{1,64} \\ t_{2,1} & t_{2,2} & t_{2,3} & & t_{2,64} \\ & \vdots & & \ddots & \vdots \\ t_{16,1} & t_{16,2} & t_{16,3} & \cdots & t_{16,64} \end{bmatrix} \times \begin{bmatrix} r_1 \\ r_2 \\ \vdots \\ r_{64} \end{bmatrix} \quad \text{[Equation 5]}$$

In Equation 5, r1 to r64 may represent residual samples for the target block and may be specifically transform coefficients generated by applying a primary transform. As a result of the calculation of Equation 5 transform coefficients ci for the target block may be derived, and a process of deriving ci may be as in Equation 6.

$$\begin{aligned} &\text{for } i \text{ from to } R: \\ &\quad ci = 0 \\ &\text{for } j \text{ from 1 to } N \\ &\quad ci += tij * rj \end{aligned} \quad \text{[Equation 6]}$$

As a result of the calculation of Equation 6, transform coefficients ci to CR for the target block may be derived. That is, when R=16, transform coefficients $c_1$ to $c_{16}$ for the target block may be derived. If, instead of RST, a regular transform is applied and a transform matrix of 64×64 (N×N) size is multiplied to residual samples of 64×1 (N×1) size, then only 16 (R) transform coefficients are derived for the target block because RST was applied, although 64 (N) transform coefficients are derived for the target block. Since the total number of transform coefficients for the target block is reduced from N to R, the amount of data transmitted by the encoding apparatus 200 to the decoding apparatus 300 decreases, so efficiency of transmission between the encoding apparatus 200 and the decoding apparatus 300 can be improved.

When considered from the viewpoint of the size of the transform matrix, the size of the regular transform matrix is 64×64 (N×N), but the size of the reduced transform matrix is reduced to 16×64 (R×N), so memory usage in a case of performing the RST can be reduced by an R/N ratio when compared with a case of performing the regular transform. In addition, when compared to the number of multiplication calculations N×N in a case of using the regular transform matrix, the use of the reduced transform matrix can reduce the number of multiplication calculations by the R/N ratio (R×N).

In an example, the transformer 232 of the encoding apparatus 200 may derive transform coefficients for the target block by performing the primary transform and the RST-based secondary transform on residual samples for the target block. These transform coefficients may be transferred to the inverse transformer of the decoding apparatus 300, and the inverse transformer 322 of the decoding apparatus 300 may derive the modified transform coefficients based on the inverse reduced secondary transform (RST) for the transform coefficients, and may derive residual samples for the target block based on the inverse primary transform for the modified transform coefficients.

The size of the inverse RST matrix TN×R according to an example is N×R less than the size N×N of the regular inverse transform matrix, and is in a transpose relationship with the reduced transform matrix $T_{R \times N}$ shown in Equation 4.

The matrix Tt in the Reduced Inv. Transform block shown in (b) of FIG. 7 may mean the inverse RST matrix $T_{R \times N}{}^T$ (the superscript T means transpose). When the inverse RST matrix $T_{R \times N}{}^T$ is multiplied to the transform coefficients for the target block as shown in (b) of FIG. 7, the modified transform coefficients for the target block or the residual samples for the current block may be derived. The inverse RST matrix $T_{R \times N}{}^T$ may be expressed as $(T_{R \times N})^T{}_{N \times R}$.

More specifically, when the inverse RST is applied as the secondary inverse transform, the modified transform coefficients for the target block may be derived when the inverse RST matrix $T_{R \times N}{}^T$ is multiplied to the transform coefficients for the target block. Meanwhile, the inverse RST may be applied as the inverse primary transform, and in this case, the residual samples for the target block may be derived when the inverse RST matrix $T_{R \times N}^{T}$ is multiplied to the transform coefficients for the target block.

In an example, if the size of the block to which the inverse transform is applied is 8×8 and R=16 (i.e., R/N=16/64=¼), then the RST according to (b) of FIG. 7 may be expressed as a matrix operation as shown in Equation 7 below.

$$
\begin{bmatrix}
t_{1,1} & t_{2,1} & & t_{16,1} \\
t_{1,2} & t_{2,2} & \cdots & t_{16,2} \\
t_{1,3} & t_{2,3} & & t_{16,3} \\
\vdots & \vdots & & \vdots \\
& & \ddots & \vdots \\
t_{1,64} & t_{2,64} & \cdots & t_{16,64}
\end{bmatrix}
\times
\begin{bmatrix}
c_1 \\
c_2 \\
\vdots \\
c_{16}
\end{bmatrix}
\qquad \text{[Equation 7]}
$$

In Equation 7, $c_1$ to $c_{16}$ may represent the transform coefficients for the target block. As a result of the calculation of Equation 7, $r_i$ representing the modified transform coefficients for the target block or the residual samples for the target block may be derived, and the process of deriving $r_i$ may be as in Equation 8.

$$
\begin{aligned}
&\text{For } i \text{ from to } N: \\
&\quad r_i = 0 \\
&\text{for } j \text{ from 1 to } R \\
&\quad r_i \mathrel{+}= t_{ji} * c_j
\end{aligned}
\qquad \text{[Equation 8]}
$$

As a result of the calculation of Equation 8, $r_1$ to $r_N$ representing the modified transform coefficients for the target block or the residual samples for the target block may be derived. When considered from the viewpoint of the size of the inverse transform matrix, the size of the regular inverse transform matrix is 64×64 (N×N), but the size of the reduced inverse transform matrix is reduced to 64×16 (R×N), so memory usage in a case of performing the inverse RST can be reduced by an R/N ratio when compared with a case of performing the regular inverse transform. In addition, when compared to the number of multiplication calculations N×N in a case of using the regular inverse transform matrix, the use of the reduced inverse transform matrix can reduce the number of multiplication calculations by the R/N ratio (N×R).

A transform set configuration shown in Table 2 may also be applied to an 8×8 RST. That is, the 8×8 RST may be applied according to a transform set in Table 2. Since one transform set includes two or three transforms (kernels) according to an intra prediction mode, it may be configured to select one of up to four transforms including that in a case where no secondary transform is applied. In a transform where no secondary transform is applied, it may be considered to apply an identity matrix. Assuming that indexes 0, 1, 2, and 3 are respectively assigned to the four transforms (e.g., index 0 may be allocated to a case where an identity matrix is applied, that is, a case where no secondary transform is applied), a transform index or an lfnst index as a syntax element may be signaled for each transform coefficient block, thereby designating a transform to be applied. That is, for a top-left 8×8 block, through the transform index, it is possible to designate an 8×8 RST in an RST configuration, or to designate an 8×8 lfnst when the LFNST is applied. The 8×8 lfnst and the 8×8 RST refer to transforms applicable to an 8×8 region included in the transform coefficient block when both W and H of the target block to be transformed are equal to or greater than 8, and the 8×8 region may be a top-left 8×8 region in the transform coefficient block. Similarly, a 4×4 lfnst and a 4×4 RST refer to transforms applicable to a 4×4 region included in the transform coefficient block when both W and H of the target block to are equal to or greater than 4, and the 4×4 region may be a top-left 4×4 region in the transform coefficient block.

According to an embodiment of the present disclosure, for a transform in an encoding process, only 48 pieces of data may be selected and a maximum 16×48 transform kernel matrix may be applied thereto, rather than applying a 16×64 transform kernel matrix to 64 pieces of data forming an 8×8 region. Here, "maximum" means that m has a maximum value of 16 in an m×48 transform kernel matrix for generating m coefficients. That is, when an RST is performed by applying an m×48 transform kernel matrix (m≤16) to an 8×8 region, 48 pieces of data are input and m coefficients are generated. When m is 16, 48 pieces of data are input and 16 coefficients are generated. That is, assuming that 48 pieces of data form a 48×1 vector, a 16×48 matrix and a 48×1 vector are sequentially multiplied, thereby generating a 16×1 vector. Here, the 48 pieces of data forming the 8×8 region may be properly arranged, thereby forming the 48×1 vector. For example, a 48×1 vector may be constructed based on 48 pieces of data constituting a region excluding the bottom right 4×4 region among the 8×8 regions. Here, when a matrix operation is performed by applying a maximum 16×48 transform kernel matrix, 16 modified transform coefficients are generated, and the 16 modified transform coefficients may be arranged in a top-left 4×4 region according to a scanning order, and a top-right 4×4 region and a bottom-left 4×4 region may be filled with zeros.

For an inverse transform in a decoding process, the transposed matrix of the foregoing transform kernel matrix may be used. That is, when an inverse RST or LFNST is performed in the inverse transform process performed by the decoding apparatus, input coefficient data to which the inverse RST is applied is configured in a one-dimensional vector according to a predetermined arrangement order, and a modified coefficient vector obtained by multiplying the one-dimensional vector and a corresponding inverse RST matrix on the left of the one-dimensional vector may be arranged in a two-dimensional block according to a predetermined arrangement order.

In summary, in the transform process, when an RST or LFNST is applied to an 8×8 region, a matrix operation of 48 transform coefficients in top-left, top-right, and bottom-left regions of the 8×8 region excluding the bottom-right region among transform coefficients in the 8×8 region and a 16×48 transform kernel matrix. For the matrix operation, the 48 transform coefficients are input in a one-dimensional array. When the matrix operation is performed, 16 modified transform coefficients are derived, and the modified transform coefficients may be arranged in the top-left region of the 8×8 region.

On the contrary, in the inverse transform process, when an inverse RST or LFNST is applied to an 8×8 region, 16 transform coefficients corresponding to a top-left region of the 8×8 region among transform coefficients in the 8×8 region may be input in a one-dimensional array according to a scanning order and may be subjected to a matrix operation with a 48×16 transform kernel matrix. That is, the matrix operation may be expressed as (48×16 matrix)*(16×1 transform coefficient vector)=(48×1 modified transform coefficient vector). Here, an n×1 vector may be interpreted to have the same meaning as an n×1 matrix and may thus be expressed as an n×1 column vector. Further, * denotes matrix multiplication. When the matrix operation is performed, 48 modified transform coefficients may be derived, and the 48 modified transform coefficients may be arranged in top-left, top-right, and bottom-left regions of the 8×8 region excluding a bottom-right region.

When a secondary inverse transform is based on an RST, the inverse transformer 235 of the encoding apparatus 200 and the inverse transformer 322 of the decoding apparatus 300 may include an inverse reduced secondary transformer to derive modified transform coefficients based on an inverse RST on transform coefficients and an inverse primary transformer to derive residual samples for the target block based on an inverse primary transform for the modified transform coefficients. The inverse primary transform refers to the inverse transform of a primary transform applied to a residual. In the present disclosure, deriving a transform coefficient based on a transform may refer to deriving the transform coefficient by applying the transform.

The above-described non-separated transform, the LFNST, will be described in detail as follows. The LFNST may include a forward transform by the encoding apparatus and an inverse transform by the decoding apparatus.

The encoding apparatus receives a result (or a part of a result) derived after applying a primary (core) transform as an input, and applies a forward secondary transform (secondary transform).

$$y = G^T x \qquad \text{[Equation 9]}$$

In Equation 9, x and y are inputs and outputs of the secondary transform, respectively, and G is a matrix representing the secondary transform, and transform basis vectors are composed of column vectors. In the case of an inverse LFNST, when the dimension of the transformation matrix G is expressed as [number of rows x number of columns], in the case of an forward LFNST, the transposition of matrix G becomes the dimension of GT.

For the inverse LFNST, the dimensions of matrix G are [48×16], [48×8], [16×16], [16×8], and the [48×8] matrix and the [16×8] matrix are partial matrices that sampled 8 transform basis vectors from the left of the [48×16] matrix and the [16×16] matrix, respectively.

On the other hand, for the forward LFNST, the dimensions of matrix GT are [16×16], [8×48], [16×16], [8×16], and the [8×48] matrix and the [8×16] matrix are partial matrices obtained by sampling 8 transform basis vectors from the top of the [16×48] matrix and the [16×16] matrix, respectively.

Therefore, in the case of the forward LFNST, a [48×1] vector or [16×1] vector is possible as an input x, and a [16×1] vector or a [8×1] vector is possible as an output y. In video coding and decoding, the output of the forward primary transform is two-dimensional (2D) data, so to construct the [48×1] vector or the [16×1] vector as the input x, a one-dimensional vector must be constructed by properly arranging the 2D data that is the output of the forward transformation.

FIG. 8 is a diagram illustrating a sequence of arranging output data of a forward primary transformation into a one-dimensional vector according to an example. The left diagrams of (a) and (b) of FIG. 8 show the sequence for constructing a [48×1] vector, and the right diagrams of (a) and (b) of FIG. 8 shows the sequence for constructing a [16×1] vector. In the case of the LFNST, a one-dimensional vector x can be obtained by sequentially arranging 2D data in the same order as in (a) and (b) of FIG. 8.

The arrangement direction of the output data of the forward primary transform may be determined according to an intra prediction mode of the current block. For example, when the intra prediction mode of the current block is in the horizontal direction with respect to the diagonal direction, the output data of the forward primary transform may be arranged in the order of (a) of FIG. 8, and when the intra prediction mode of the current block is in the vertical direction with respect to the diagonal direction, the output data of the forward primary transform may be arranged in the order of (b) of FIG. 8.

According to an example, an arrangement order different from the arrangement orders of (a) and (b) FIG. 8 may be applied, and in order to derive the same result (y vector) as when the arrangement orders of (a) and (b) FIG. 8 is applied, the column vectors of the matrix G may be rearranged according to the arrangement order. That is, it is possible to rearrange the column vectors of G so that each element constituting the x vector is always multiplied by the same transform basis vector.

Since the output y derived through Equation 9 is a one-dimensional vector, when two-dimensional data is required as input data in the process of using the result of the forward secondary transformation as an input, for example, in the process of performing quantization or residual coding, the output y vector of Equation 9 must be properly arranged as 2D data again.

Figure 9:
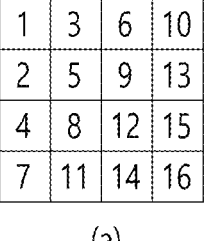
FIG. 9 is a diagram illustrating a sequence of arranging output data of a forward secondary transform into a one-dimensional vector according to an example.
Figure 9:
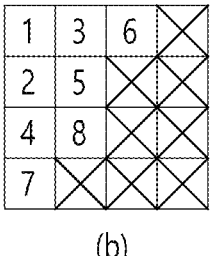

FIG. 9 is a diagram illustrating a sequence of arranging output data of a forward secondary transform into a two-dimensional block according to an example.

In the case of the LFNST, output values may be arranged in a 2D block according to a predetermined scan order. (a) of FIG. 8 shows that when the output y is a [16×1] vector, the output values are arranged at 16 positions of the 2D block according to a diagonal scan order. (b) of FIG. 8 shows that when the output y is a [8×1] vector, the output values are arranged at 8 positions of the 2D block according to the diagonal scan order, and the remaining 8 positions are filled with zeros. X in (b) of FIG. 8 indicates that it is filled with zero.

According to another example, since the order in which the output vector y is processed in performing quantization or residual coding may be preset, the output vector y may not be arranged in the 2D block as shown in FIG. 9. However, in the case of the residual coding, data coding may be performed in 2D block (eg, 4×4) units such as CG (Coefficient Group), and in this case, the data are arranged according to a specific order as in the diagonal scan order of FIG. 9.

Meanwhile, the decoding apparatus may configure the one-dimensional input vector y by arranging two-dimensional data output through a dequantization process or the like according to a preset scan order for the inverse transformation. The input vector y may be output as the output vector x by the following equation.

$$x = Gy \qquad \text{[Equation 10]}$$

In the case of the inverse LFNST, an output vector x can be derived by multiplying an input vector y, which is a [16×1] vector or a [8×1] vector, by a G matrix. For the inverse LFNST, the output vector x can be either a [48×1] vector or a [16×1] vector.

The output vector x is arranged in a two-dimensional block according to the order shown in FIG. 8 and is arranged as two-dimensional data, and this two-dimensional data becomes input data (or a part of input data) of the inverse primary transformation.

Accordingly, the inverse secondary transformation is the opposite of the forward secondary transformation process as a whole, and in the case of the inverse transformation, unlike in the forward direction, the inverse secondary transformation is first applied, and then the inverse primary transformation is applied.

In the inverse LFNST, one of 8 [48×16] matrices and 8 [16×16] matrices may be selected as the transformation matrix G. Whether to apply the [48×16] matrix or the [16×16] matrix depends on the size and shape of the block.

In addition, 8 matrices may be derived from four transform sets as shown in Table 2 above, and each transform set may consist of two matrices. Which transform set to use among the 4 transform sets is determined according to the intra prediction mode, and more specifically, the transform set is determined based on the value of the intra prediction mode extended by considering the Wide Angle Intra Prefore, it may be more accurate to predict in the bottom-left direction than in the top-right direction. Conversely, when the height of the block is greater than the width, the left reference pixels are generally close to positions inside the block to be predicted. Therefore, it may be more accurate to predict in the top-right direction than in the bottom-left direction. Therefore, it may be advantageous to apply remapping, ie, mode index modification, to the index of the wide-angle intra prediction mode.

When the wide-angle intra prediction is applied, information on the existing intra prediction may be signaled, and after the information is parsed, the information may be remapped to the index of the wide-angle intra prediction mode. Therefore, the total number of the intra prediction modes for a specific block (eg, a non-square block of a specific size) may not change, and that is, the total number of the intra prediction modes is 67, and intra prediction mode coding for the specific block may not be changed.

Table 3 below shows a process of deriving a modified intra mode by remapping the intra prediction mode to the wide-angle intra prediction mode.

TABLE 3

Inputs to this process are:
- a variable predModeIntra specifying the intra prediction mode,
- a variable nTbW specifying the transform block width,
- a variable nTbH specifying the transform block height,
- a variable cIdx specifying the colour component of the current block.
Output of this process is the modified intra prediction mode predModeIntra.
The variables nW and nH are derived as follows:
- If IntraSubPartitionsSplitType is equal to ISP_NO_SPLIT or cIdx is not equal to 0, the following applies:
    nW = nTbW            (8-97)
    nH = nTbH            (8-98)
- Otherwise ( IntraSubPartitionsSplitType is not equal to ISP_NO_SPLIT and cIdx is equal to 0 ), the following applies:
    nW = nCbW           (8-99)
    nH = nCbH           (8-100)
The variable whRatio is set equal to Abs( Log2( nW / nH ) ).
For non-square blocks (nW is not equal to nH), the intra prediction mode predModeIntra is modified as follows:
- If all of the following conditions are true, predModeIntra is set equal to ( predModeIntra + 65 ).
  - nW is greater than nH
  - predModeIntra is greater than or equal to 2
  - predModeIntra is less than ( whRatio > 1 ) ? ( 8 + 2 * whRatio ) : 8
- Otherwise, if all of the following conditions are true, predModeIntra is set equal to ( predModeIntra − 67 ).
  - nH is greater than nW
  - predModeIntra is less than or equal to 66
  - predModeIntra is greater than ( whRatio > 1 ) ? ( 60 − 2 * whRatio ) : 60 diction (WAIP). Which matrix to select from among the two matrices constituting the selected transform set is derived through index signaling. More specifically, 0, 1, and 2 are possible as the transmitted index value, 0 may indicate that the LFNST is not applied, and 1 and 2 may indicate any one of two transform matrices constituting a transform set selected based on the intra prediction mode value.

Figure 10:
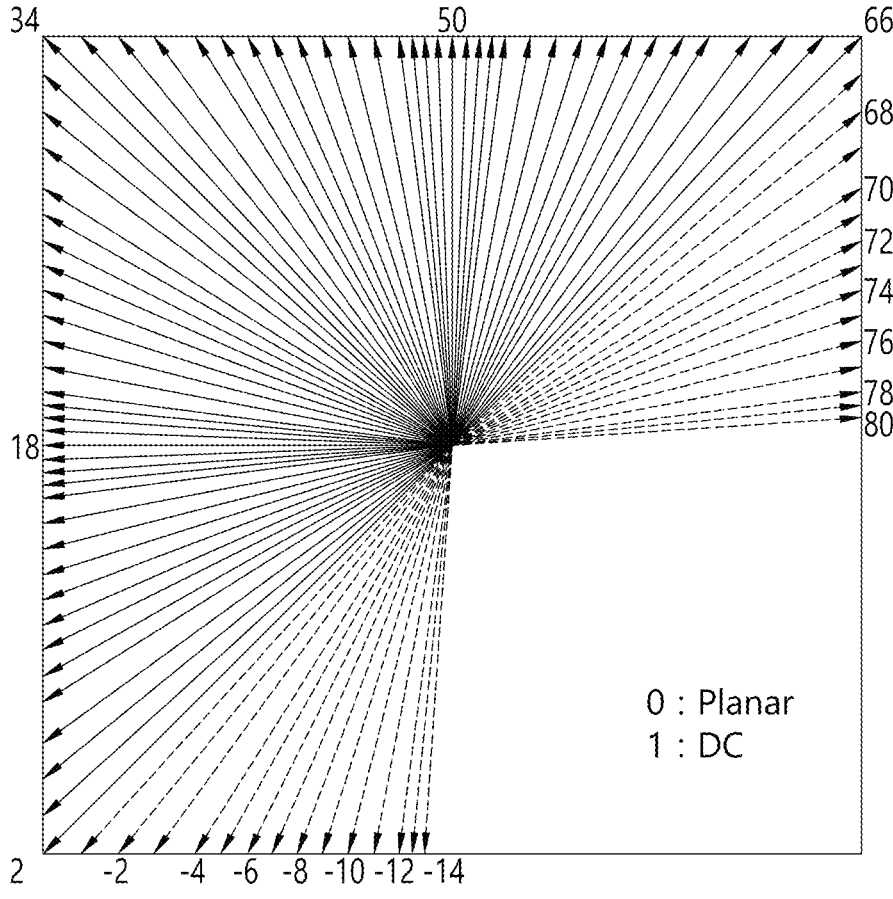
FIG. 10 is a diagram illustrating wide-angle intra prediction modes according to an embodiment of the present disclosure.

FIG. 10 is a diagram illustrating wide-angle intra prediction modes according to an embodiment of the present document.

The general intra prediction mode value may have values from 0 to 66 and 81 to 83, and the intra prediction mode value extended due to WAIP may have a value from −14 to 83 as shown. Values from 81 to 83 indicate the CCLM (Cross Component Linear Model) mode, and values from −14 to −1 and values from 67 to 80 indicate the intra prediction mode extended due to the WAIP application.

When the width of the prediction current block is greater than the height, the upper reference pixels are generally closer to positions inside the block to be predicted. There- In Table 3, the extended intra prediction mode value is finally stored in the predModeIntra variable, and ISP_NO_SPLIT indicates that the CU block is not divided into sub-partitions by the Intra Sub Partitions (ISP) technique currently adopted in the VVC standard, and the cIdx variable Values of 0, 1, and 2 indicate the case of luma, Cb, and Cr components, respectively. Log 2 function shown in Table 3 returns a log value with a base of 2, and the Abs function returns an absolute value.

Variable predModeIntra indicating the intra prediction mode and the height and width of the transform block, etc. are used as input values of the wide angle intra prediction mode mapping process, and the output value is the modified intra prediction mode predModeIntra. The height and width of the transform block or the coding block may be the height and width of the current block for remapping of the intra prediction mode. At this time, the variable whRatio reflecting the ratio of the width to the width may be set to Abs(Log 2 (nW/nH)).

For a non-square block, the intra prediction mode may be divided into two cases and modified.

First, if all conditions (1)~(3) are satisfied, (1) the width of the current block is greater than the height, (2) the intra prediction mode before modifying is equal to or greater than 2, (3) the intra prediction mode is less than the value derived from (8+2*whRatio) when the variable whRatio is greater than 1, and is less than 8 when the variable whRatio is less than or equal to 1 [predModeIntra is less than (whRatio>1)? (8+2*whRatio):8], the intra prediction mode is set to a value 65 greater than the intra prediction mode [predModeIntra is set equal to (predModeIntra+65)].

If different from the above, that is, follow conditions (1)~(3) are satisfied, (1) the height of the current block is greater than the width, (2) the intra prediction mode before modifying is less than or equal to 66, (3) the intra prediction mode is greater than the value derived from (60−2*whRatio) when the variable whRatio is greater than 1, and is greater than 60 when the variable whRatio is less than or equal to 1 [predModeIntra is greater than (whRatio>1)? (60−2*whRatio):60], the intra prediction mode is set to a value 67 smaller than the intra prediction mode [predModeIntra is set equal to (predModeIntra−67)].

Table 2 above shows how a transform set is selected based on the intra prediction mode value extended by the WAIP in the LFNST. As shown in FIG. 10, modes 14 to 33 and modes 35 to 80 are symmetric with respect to the prediction direction around mode 34. For example, mode 14 and mode 54 are symmetric with respect to the direction corresponding to mode 34. Therefore, the same transform set is applied to modes located in mutually symmetrical directions, and this symmetry is also reflected in Table 2.

Meanwhile, it is assumed that forward LFNST input data for mode 54 is symmetrical with the forward LFNST input data for mode 14. For example, for mode 14 and mode 54, the two-dimensional data is rearranged into one-dimensional data according to the arrangement order shown in (a) of FIG. 8 and (b) of FIG. 8, respectively. In addition, it can be seen that the patterns in the order shown in (a) of FIG. 8 and (b) of FIG. 8 are symmetrical with respect to the direction (diagonal direction) indicated by Mode 34.

Meanwhile, as described above, which transform matrix of the [48×16] matrix and the [16×16] matrix is applied to the LFNST is determined by the size and shape of the transform target block.

Figure 11:
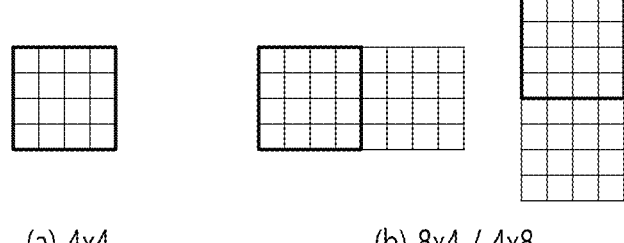
FIG. 11 is a diagram illustrating a block shape to which LFNST is applied.
Figure 11:
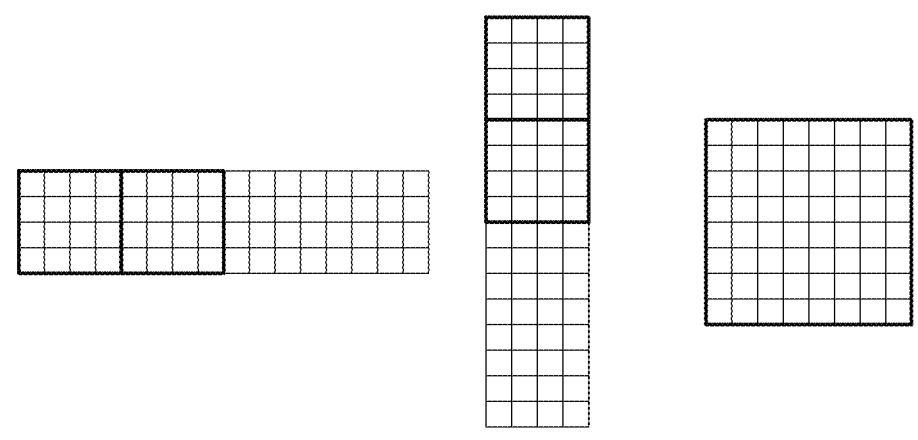
Figure 11:
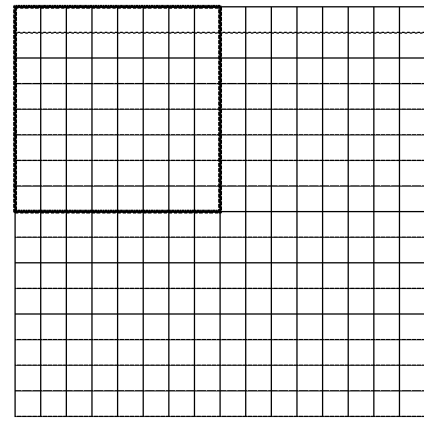

FIG. 11 is a diagram illustrating a block shape to which the LFNST is applied. (a) of FIG. 11 shows 4×4 blocks, (b) shows 4×8 and 8×4 blocks, (c) shows 4×N or N×4 blocks in which N is 16 or more, (d) shows 8×8 blocks, (e) shows M×N blocks where M≥8, N≥8, and N>8 or M>8.

In FIG. 11, blocks with thick borders indicate regions to which the LFNST is applied. For the blocks of (a) and (b) of FIG. 11, the LFNST is applied to the top-left 4×4 region, and for the block of (c) of FIG. 11, the LFNST is applied individually the two top-left 4×4 regions are continuously arranged. In (a), (b), and (c) of FIG. 11, since the LFNST is applied in units of 4×4 regions, this LFNST will be here-inafter referred to as "4×4 LFNST". Based on the matrix dimension for G, a [16×16] or [16×8] matrix may be applied.

More specifically, the [16×8] matrix is applied to the 4×4 block (4×4 TU or 4×4 CU) of (a) of FIG. 11 and the [16×16] matrix is applied to the blocks in (b) and (c) of FIG. 11. This is to adjust the computational complexity for the worst case to 8 multiplications per sample.

With respect to (d) and (e) of FIG. 11, the LFNST is applied to the top-left 8×8 region, and this LFNST is hereinafter referred to as "8×8 LFNST". As a corresponding transformation matrix, a [48×16] matrix or [48×8] matrix may be applied. In the case of the forward LFNST, since the

[48×1] vector (x vector in Equation 9) is input as input data, all sample values of the top-left 8×8 region are not used as input values of the forward LFNST. That is, as can be seen in the left order of (a) of FIG. 8 or the left order of (b) of FIG. 8, the [48×1] vector may be constructed based on samples belonging to the remaining 3 4×4 blocks while leaving the bottom-right 4×4 block as it is.

The [48×8] matrix may be applied to an 8×8 block (8×8 TU or 8×8 CU) in (d) of FIG. 11, and the [48×16] matrix may be applied to the 8×8 block in (e) of FIG. 11. This is also to adjust the computational complexity for the worst case to 8 multiplications per sample.

Depending on the block shape, when the corresponding forward LFNST (4×4 LFNST or 8×8 LFNST) is applied, 8 or 16 output data (y vector in Equation 9, [8×1] or [16×1] vector) is generated. In the forward LFNST, the number of output data is equal to or less than the number of input data due to the characteristics of the matrix GT.

Figure 12:
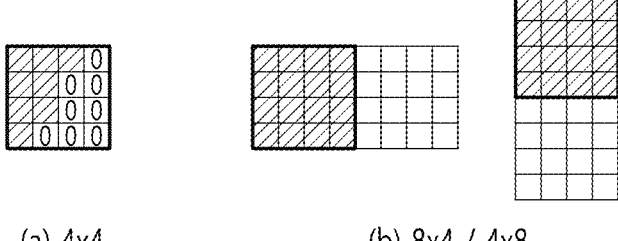
FIG. 12 is a diagram illustrating an arrangement of output data of a forward LFNST according to an example.
Figure 12:
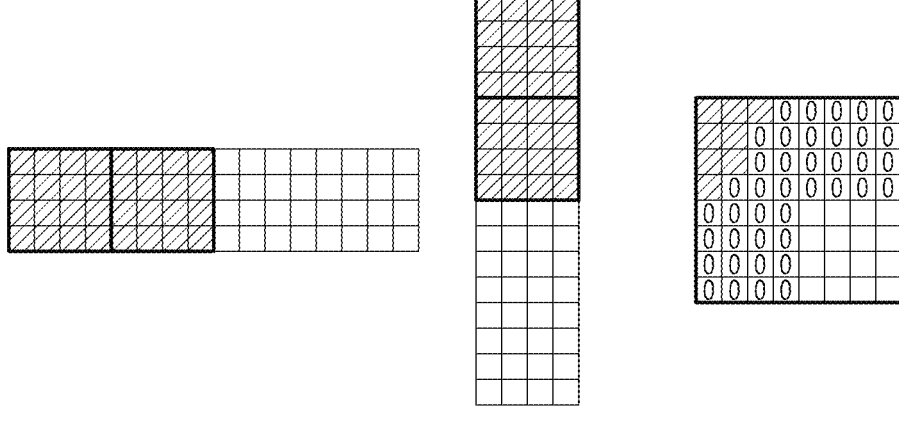
Figure 12:
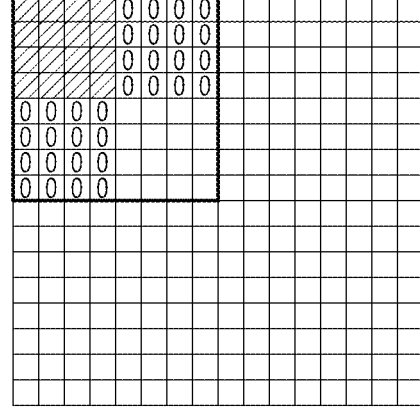

FIG. 12 is a diagram illustrating an arrangement of output data of a forward LFNST according to an example, and shows a block in which output data of the forward LFNST is arranged according to a block shape.

The shaded area at the top-left of the block shown in FIG. 12 corresponds to the area where the output data of the forward LFNST is located, the positions marked with 0 indicate samples filled with a value of 0, and the remaining area represents regions that are not changed by the forward LFNST. In the area not changed by the LFNST, the output data of the forward primary transform remains unchanged.

As described above, since the dimension of the transform matrix applied varies according to the shape of the block, the number of output data also varies. As FIG. 12, the output data of the forward LFNST may not completely fill the top-left 4×4 block. In the case of (a) and (d) of FIG. 12, a [16×8] matrix and a [48×8] matrix are applied to the block indicated by a thick line or a partial region inside the block, respectively, and a [8×1] vector as the output of the forward LFNST is generated. That is, according to the scan order shown in (b) of FIG. 9, only 8 output data may be filled as shown in (a) and (d) of FIG. 12, and 0 may be filled in the remaining 8 positions. In the case of the LFNST applied block of (d) of FIG. 11, as shown in (d) of FIG. 12, two 4×4 blocks in the top-right and bottom-left adjacent to the top-left 4×4 block are also filled with a value of 0.

As described above, basically, by signaling the LFNST index, whether to apply the LFNST and the transform matrix to be applied are specified. As shown FIG. 12, when the LFNST is applied, since the number of output data of the forward LFNST may be equal to or less than the number of input data, a region filled with a zero value occurs as follows.

1) As shown in (a) of FIG. 12, samples from the 8th and later positions in the scan order in the top-left 4×4 block, that is, samples from the 9th to the 16th.

2) As shown in (d) and (e) of FIG. 12, when the [48×16] matrix or the [48×8] matrix is applied, two 4×4 blocks adjacent to the top-left 4×4 block or the second and third 4×4 blocks in the scan order.

Therefore, if non-zero data exists by checking the areas 1) and 2), it is certain that the LFNST is not applied, so that the signaling of the corresponding LFNST index can be omitted.

According to an example, for example, in the case of LFNST adopted in the VVC standard, since signaling of the LFNST index is performed after the residual coding, the encoding apparatus may know whether there is the non-zero data (significant coefficients) for all positions within the TU or CU block through the residual coding. Accordingly, the encoding apparatus may determine whether to perform signaling on the LFNST index based on the existence of the non-zero data, and the decoding apparatus may determine whether the LFNST index is parsed. When the non-zero data does not exist in the area designated in 1) and 2) above, signaling of the LFNST index is performed.

Meanwhile, for the adopted LFNST, the following simplification methods may be applied.

(i) According to an example, the number of output data for the forward LFNST may be limited to a maximum of 16.

In the case of (c) of FIG. 11, the 4×4 LFNST may be applied to two 4×4 regions adjacent to the top-left, respectively, and in this case, a maximum of 32 LFNST output data may be generated. when the number of output data for forward LFNST is limited to a maximum of 16, in the case of 4×N/N×4 (N≥16) blocks (TU or CU), the 4×4 LFNST is only applied to one 4×4 region in the top-left, the LFNST may be applied only once to all blocks of FIG. 11. Through this, the implementation of image coding may be simplified.

(ii) According to an example, zero-out may be additionally applied to a region to which the LFNST is not applied. In this document, the zero-out may mean filling values of all positions belonging to a specific region with a value of 0. That is, the zero-out can be applied to a region that is not changed due to the LFNST and maintains the result of the forward primary transformation. As described above, since the LFNST is divided into the 4×4 LFNST and the 8×8 LFNST, the zero-out can be divided into two types ((ii)-(A) and (ii)-(B)) as follows.

Figure 13:
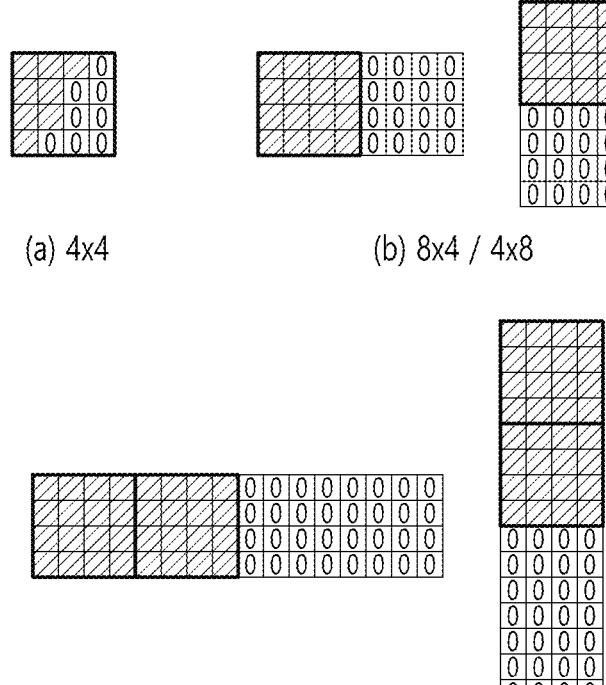
FIG. 13 is a diagram illustrating zero-out in a block to which 4×4 LFNST is applied according to an example.
Figure 13:
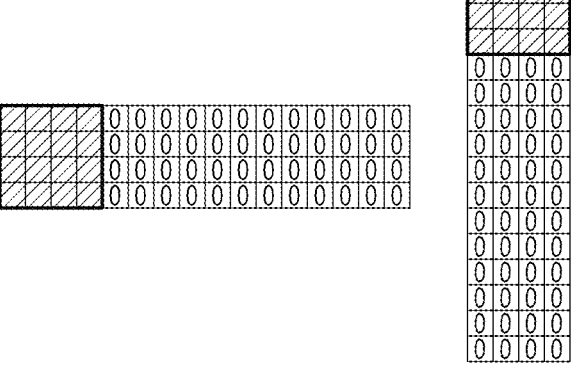

(ii)-(A) When the 4×4 LFNST is applied, a region to which the 4×4 LFNST is not applied may be zeroed out. FIG. 13 is a diagram illustrating the zero-out in a block to which the 4×4 LFNST is applied according to an example.

As shown in FIG. 13, with respect to a block to which the 4×4 LFNST is applied, that is, for all of the blocks in (a), (b) and (c) of FIG. 11, the whole region to which the LFNST is not applied may be filled with zeros.

On the other hand, (d) of FIG. 13 shows that when the maximum value of the number of the output data of the forward LFNST is limited to 16 according to an example, the zero-out is performed on the remaining blocks to which the 4×4 LFNST is not applied.

Figure 14:
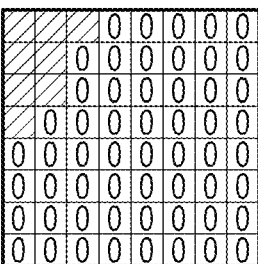
FIG. 14 is a diagram illustrating zero-out in a block to which 8×8 LFNST is applied according to an example.
Figure 14:
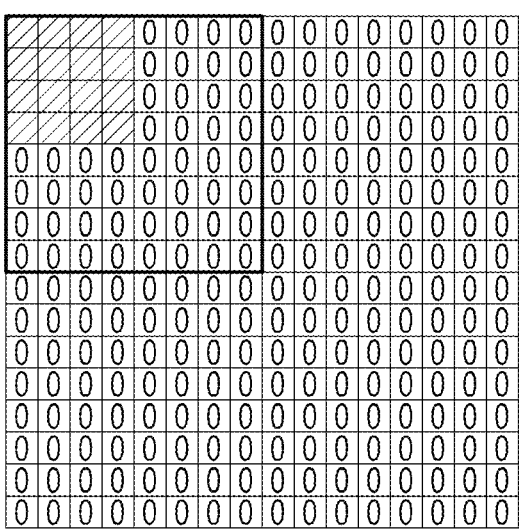

(ii)-(B) When the 8×8 LFNST is applied, a region to which the 8×8 LFNST is not applied may be zeroed out. FIG. 14 is a diagram illustrating the zero-out in a block to which the 8×8 LFNST is applied according to an example.

As shown in FIG. 14, with respect to a block to which the 8×8 LFNST is applied, that is, for all of the blocks in (d) and (e) of FIG. 12, the whole region to which the LFNST is not applied may be filled with zeros.

(iii) Due to the zero-out presented in (ii) above, the area filled with zeros may be not same when the LFNST is applied. Accordingly, it is possible to check whether the non-zero data exists according to the zero-out proposed in (ii) over a wider area than the case of the LFNST of FIG. 12.

For example, when (ii)-(B) is applied, after checking whether the non-zero data exists where the area filled with zero values in (d) and (e) of FIG. 12 in addition to the area filled with 0 additionally in FIG. 14, signaling for the LFNST index can be performed only when the non-zero data does not exist.

Of course, even if the zero-out proposed in (ii) is applied, it is possible to check whether the non-zero data exists in the same way as the existing LFNST index signaling. That is, after checking whether the non-zero data exists in the block filled with zeros in FIG. 12, the LFNST index signaling may be applied. In this case, the encoding apparatus only performs the zero out and the decoding apparatus does not assume the zero out, that is, checking only whether the non-zero data exists only in the area explicitly marked as 0 in FIG. 12, may perform the LFNST index parsing.

Various embodiments in which combinations of the simplification methods ((i), (ii)-(A), (ii)-(B), (iii)) for the LFNST are applied may be derived. Of course, the combinations of the above simplification methods are not limited to the following an embodiment, and any combination may be applied to the LFNST.

EMBODIMENT

Limit the number of output data for forward LFNST to a maximum of 16→(i)

When the 4×4 LFNST is applied, all areas to which the 4×4 LFNST is not applied are zero-out→(ii)-(A)

When the 8×8 LFNST is applied, all areas to which the 8×8 LFNST is not applied are zero-out→(ii)-(B)

After checking whether the non-zero data exists also the existing area filled with zero value and the area filled with zeros due to additional zero outs ((ii)-(A), (ii)-(B)), the LFNST index is signaled only when the non-zero data does not exist→(iii)

In the case of the Embodiment, when the LFNST is applied, an area in which the non-zero output data can exist is limited to the inside of the top-left 4×4 area. In more detail, in the case of (a) of FIG. 13 and (a) of FIG. 14, the 8th position in the scan order is the last position where non-zero data can exist. In the case of (b) and (c) of FIG. 13 and (b) of FIG. 14, the 16th position in the scan order (ie, the position of the bottom-right edge of the top-left 4×4 block) is the last position where data other than 0 may exist.

Therefore, when the LFNST is applied, after checking whether the non-zero data exists in a position where the residual coding process is not allowed (at a position beyond the last position), it can be determined whether the LFNST index is signaled.

In the case of the zero-out method proposed in (ii), since the number of data finally generated when both the primary transform and the LFNST are applied, the amount of computation required to perform the entire transformation process can be reduced. That is, when the LFNST is applied, since zero-out is applied to the forward primary transform output data existing in a region to which the LFNST is not applied, there is no need to generate data for the region that become zero-out during performing the forward primary transform. Accordingly, it is possible to reduce the amount of computation required to generate the corresponding data. The additional effects of the zero-out method proposed in (ii) are summarized as follows.

First, as described above, the amount of computation required to perform the entire transform process is reduced.

In particular, when (ii)-(B) is applied, the amount of calculation for the worst case is reduced, so that the transform process can be lightened. In other words, in general, a large amount of computation is required to perform a large-size primary transformation. By applying (ii)-(B), the number of data derived as a result of performing the forward LFNST can be reduced to 16 or less. In addition, as the size of the entire block (TU or CU) increases, the effect of reducing the amount of transform operation is further increased.

Second, the amount of computation required for the entire transform process can be reduced, thereby reducing the power consumption required to perform the transform.

Third, the latency involved in the transform process is reduced.

The secondary transformation such as the LFNST adds a computational amount to the existing primary transformation, thus increasing the overall delay time involved in performing the transformation. In particular, in the case of intra prediction, since reconstructed data of neighboring blocks is used in the prediction process, during encoding, an increase in latency due to a secondary transformation leads to an increase in latency until reconstruction. This can lead to an increase in overall latency of intra prediction encoding.

However, if the zero-out suggested in (ii) is applied, the delay time of performing the primary transform can be greatly reduced when LFNST is applied, the delay time for the entire transform is maintained or reduced, so that the encoding apparatus can be implemented more simply.

In the conventional intra prediction, a block to be currently encoded is regarded as one encoding unit and encoding was performed without splitting. However, intra sub-partitions (ISP) coding means performing intra prediction encoding by dividing a block to be currently encoded in a horizontal direction or a vertical direction. In this case, a reconstructed block may be generated by performing encoding/decoding in units of divided blocks, and the reconstructed block may be used as a reference block of the next divided block. According to an embodiment, in ISP coding, one coding block may be divided into two or four sub-blocks and coded, and in ISP, in one sub-block, intra prediction is performed with reference to a reconstructed pixel value of a sub-block located at the adjacent left side or adjacent upper side. Hereinafter, "coding" may be used as a concept including both coding performed by an encoding apparatus and decoding performed by a decoding apparatus.

The ISP is to divide a block predicted as luma intra into two or four sub-partitions in a vertical direction or a horizontal direction according to the size of the block. For example, the minimum block size to which the ISP can be applied is 4×8 or 8×4. When the block size is greater than 4×8 or 8×4, the block is divided into 4 sub-partitions.

When ISP is applied, sub-blocks are sequentially coded, for example, horizontally or vertically, from left to right or from top to bottom according to a division type, and after a reconstruction process is performed via inverse transform and intra prediction for one sub-block, coding for the next sub-block may be performed. For the leftmost or uppermost subblock, a reconstructed pixel of the already coded coding block is referred to, as in a conventional intra prediction method. Further, when each side of a subsequent internal sub-block is not adjacent to a previous sub-block, in order to derive reference pixels adjacent to the corresponding side, reconstructed pixels of an already coded adjacent coding block are referred to, as in a conventional intra prediction method.

In the ISP coding mode, all sub-blocks may be coded with the same intra prediction mode, and a flag indicating whether to use ISP coding and a flag indicating whether to divide (horizontally or vertically) in which direction may be signaled. At this time, the number of sub-blocks may be adjusted to 2 or 4 according to a block shape, and when the size (width x height) of one sub-block is less than 16, it may be restricted so that division into the corresponding sub-block is not allowed or the ISP coding itself is not applied.

In the case of the ISP prediction mode, one coding unit is divided into two or four partition blocks, that is, sub-blocks and predicted, and the same intra prediction mode is applied to the divided two or four partition blocks.

As described above, in the division direction, the horizontal direction (when an M×N coding unit having horizontal and vertical lengths of M and N, respectively, is divided in the horizontal direction, if the M×N coding unit is divided into two, the M×N coding unit is divided into M×(N/2) blocks, and if the M×N coding unit is divided into four blocks, the M×N coding unit is divided into M×(N/4) blocks) and the vertical direction (when an M×N coding unit is divided in a vertical direction, if the M×N coding unit is divided into two, and the M×N coding unit is divided into (M/2)×N blocks, and if the M×N coding unit is divided into four, the M×N coding unit is divided into (M/4)×N blocks) are both possible. When the M×N coding unit is divided in the horizontal direction, partition blocks are coded in a top-down order, and when the M×N coding unit is divided in the vertical direction, partition blocks are coded in order from left to right. The currently coded partition block may be predicted with reference to the reconstructed pixel values of the upper (left) partition block in the case of horizontal (vertical) direction division.

A transform may be applied to a residual signal generated by the ISP prediction method in units of partition blocks. Multiple transform selection (MTS) technology based on a DST-7/DCT-8 combination as well as the existing DCT-2 may be applied to a primary transform (core transform) based on a forward direction, and a forward low frequency non-separable transform (LFNST) may be applied to transform coefficients generated according to the primary transform to generate a final modified transform coefficient.

That is, an LFNST may be applied to partition blocks divided by applying an ISP prediction mode, and the same intra prediction mode is applied to the divided partition blocks, as described above. Accordingly, when the LFNST set derived based on the intra prediction mode is selected, the derived LFNST set may be applied to all partition blocks. That is, because the same intra prediction mode is applied to all partition blocks, the same LFNST set may be applied to all partition blocks.

According to an embodiment, an LFNST may be applied only to transform blocks having both a horizontal length and a vertical length of 4 or more. Therefore, when the horizontal or vertical length of the divided partition block according to the ISP prediction method is less than 4, the LFNST is not applied and an LFNST index is not signaled. Further, when the LFNST is applied to each partition block, the corresponding partition block may be regarded as one transform block. When the ISP prediction method is not applied, the LFNST may be applied to the coding block.

A method of applying an LFNST to each partition block will be described in detail.

According to an embodiment, after a forward LFNST is applied to individual partition blocks, only maximum 16 (8 or 16) coefficients are left in the top-left 4×4 region in transform coefficient scanning order, and then zero out in which the remaining positions and regions are all filled with a value of 0 may be applied.

Alternatively, according to an embodiment, when a length of one side of the partition block is 4, the LFNST is applied only to the top-left 4×4 region, and when a length of all sides of the partition block, that is, the width and height is 8 or more, the LFNST may be applied to the remaining 48 coefficients, except for a bottom-right 4×4 region inside a top-left 8×8 region.

Alternatively, according to an embodiment, in order to adjust computational complexity of the worst case to 8 multiplications per sample, when each partition block is 4×4 or 8×8, only 8 transform coefficients may be output after applying the forward LFNST. That is, when the partition block is 4×4, an 8×16 matrix may be applied as a transform matrix, and when the partition block is 8×8, an 8×48 matrix may be applied as a transform matrix.

In the current VVC standard, LFNST index signaling is performed in units of coding units. Therefore, in the ISP prediction mode and when an LFNST is applied to all partition blocks, the same LFNST index value may be applied to the corresponding partition blocks. That is, when the LFNST index value is transmitted once at a coding unit level, the corresponding LFNST index may be applied to all partition blocks in the coding unit. As described above, the LFNST index value may have values of 0, 1, and 2, where 0 represents a case in which an LFNST is not applied, and 1 and 2 indicate two transform matrices existing in one LFNST set when an LFNST is applied.

As described above, the LFNST set is determined by the intra prediction mode, and in the case of the ISP prediction mode, because all partition blocks in the coding unit are predicted in the same intra prediction mode, the partition blocks may refer to the same LFNST set.

As another example, LFNST index signaling is still performed in units of a coding unit, but in the case of the ISP prediction mode, whether to uniformly apply an LFNST to all partition blocks is not determined, and for each partition block, whether to apply the LFNST index value signaled at a coding unit level or whether not to apply the LFNST may be determined through a separate condition. Here, a separate condition may be signaled in the form of a flag for each partition block through a bitstream, and when a flag value is 1, an LFNST index value signaled at the coding unit level is applied, and when a flag value is 0, the LFNST may not be applied.

Hereinafter, a method of maintaining the computational complexity for the worst case when LFNST is applied to the ISP mode will be described.

In the case of an ISP mode, when LFNST is applied, in order to maintain the number of multiplications per sample (or per coefficient, per position) to a certain value or less, the application of LFNST may be limited. According to the size of the partition block, the number of multiplications per sample (or per coefficient, per position) may be maintained to 8 or less by applying LFNST as follows.

When both a horizontal length and a vertical length of the partition block are 4 or more, the same method as a calculation complexity control method for the worst case for LFNST in the current VVC standard may be applied.

That is, when the partition block is a 4×4 block, instead of a 16×16 matrix, an 8×16 matrix obtained by sampling the top 8 rows from a 16×16 matrix may be applied in a forward direction, and a 16×8 matrix obtained by sampling the left 8 columns from a 16×16 matrix may be applied in a reverse direction. Further, when the partition block is 8×8 blocks, in the forward direction, instead of a 16×48 matrix, an 8×48 matrix obtained by sampling the top 8 rows from a 16×48 matrix is applied, and in the reverse direction, instead of a 48×16 matrix, a 48×8 matrix obtained by sampling the left 8 columns from a 48×16 matrix may be applied.

In the case of a 4×N or N×4 (N≥4) block, when a forward transform is performed, 16 coefficients generated after applying a 16×16 matrix to only the top-left 4×4 block may be disposed in the top-left 4×4 region, and other regions may be filled with a value of 0. Further, when performing an inverse transform, 16 coefficients located in the top-left 4×4 block are disposed in scanning order to form an input vector, and then 16 output data may be generated by multiplying the 16×16 matrix. The generated output data may be disposed in the top-left 4×4 region, and the remaining regions, except for the top-left 4×4 region, may be filled with a value of 0.

In the case of an 8×N or N×8 (N≥8) block, when the forward transform is performed, 16 coefficients generated after applying the 16×48 matrix to only an ROI region (the remaining regions excluding bottom-right 4×4 blocks from the top-left 8×8 blocks) inside the top-left 8×8 blocks may be disposed in the top-left 4×4 region, and all other regions may be filled with a value of 0. Further, when performing an inverse transform, 16 coefficients located in the top-left 4×4 block are disposed in scanning order to form an input vector, and then 48 output data may be generated by multiplying the input vector by a 48×16 matrix. The generated output data may be filled in the ROI region, and all other regions may be filled with a value of 0.

As another example, in order to maintain the number of multiplications per sample (or per coefficient, per position) to a certain value or less, the number of multiplications per sample (or per coefficient, per position) based on the ISP coding unit size rather than the size of the ISP partition block may be maintained to 8 or less. When there is only one block satisfying the condition to which LFNST is applied among the ISP partition blocks, the complexity calculation for the worst case of LFNST may be applied based on the corresponding coding unit size rather than the size of the partition block. For example, when a luma coding block for a certain coding unit is divided into 4 partition blocks of 4×4 size and coded by ISP, and non-zero transform coefficients do not exist for two partition blocks among them, the other two partitions blocks can be set to generate 16 transform coefficients instead of 8 each (based on the encoder).

Hereinafter, a method of signaling the LFNST index in the case of the ISP mode will be described.

As described above, the LFNST index may have values of 0, 1, and 2, where 0 indicates that LFNST is not applied, and 1 and 2 indicate either one of two LFNST kernel matrices included in the selected LFNST set. The LFNST is applied based on the LFNST kernel matrix selected by the LFNST index. A method of transmitting the LFNST index in the current VVC standard will be described as follows.

1. The LFNST index may be transmitted once for each coding unit (CU), and in the case of a dual-tree, an individual LFNST index may be signaled for a luma block and a chroma block, respectively.

2. When the LFNST index is not signaled, the LFNST index value is set (inferred) to a default value of 0. The case where the LFNST index value is inferred to be 0 is as follows.

A. In the case of a mode (eg, transform skip, BDPCM, lossless coding, etc.) to which no transform is applied.

B. When the primary transformation is not DCT-2 (DST7 or DCT8), that is, when the transform in the horizontal direction or the transform in the vertical direction is not DCT-2

C. When the horizontal length or vertical length of the luma block of the coding unit exceeds the size of the maximum luma transform that can be transformed, for example, when the size of the maximum luma transform that can be transformed is 64, in the case where the size of the luma block of the coding block is equal to 128×16, the LFNST cannot be applied.

In the case of a dual tree, it is determined whether the size of the maximum luma transform is exceeded for each of the coding unit for the luma component and the coding unit for the chroma component. That is, it is checked whether the size of the maximum luma transform that can be transformed for the luma block is exceeded, and the horizontal/vertical length of the luma block corresponding to the color format for the chroma block and the size of the maximum transformable maximum luma transform are exceeded. For example, when the color format is 4:2:0, the horizontal/vertical length of the corresponding luma block is twice that of the corresponding chroma block, and the transform size of the corresponding luma block is twice that of the corresponding chroma block. As another example, when the color format is 4:4:4, the horizontal/vertical length and transformation size of the corresponding luma block are the same as those of the corresponding chroma block.

A 64-length transformation or a 32-length transformation means a transformation applied horizontally or vertically having a length of 64 or 32, respectively, and "transformation size" may mean a corresponding length of 64 or 32.

In the case of a single tree, after checking whether a horizontal length or a vertical length of a luma block exceeds the maximum transformable luma transform block size, if it exceeds, the LFNST index signaling may be omitted.

D. The LFNST index may be transmitted only when both the horizontal length and the vertical length of the coding unit are 4 or more.

In the case of the dual tree, the LFNST index can be signaled only when both the horizontal and vertical lengths of a corresponding component (ie, a luma or chroma component) are 4 or more.

In the case of a single tree, the LFNST index may be signaled when both the horizontal and vertical lengths of the luma component are 4 or more.

E. When the position of the last non-zero coefficient is not a DC position (top-left position of the block), in the case of a dual tree type luma block, if the position of the last non-zero coefficient is not a DC position, the LFNST index is transmitted. In the case of the dual tree type chroma block, if any one of the position of the last non-zero coefficient for Cb and the position of the last non-zero coefficient for Cr is not a DC position, the corresponding LNFST index is transmitted.

In the case of the single tree type, when the position of the last non-zero coefficient is not a DC position, the LFNST index is transmitted in any one of the luma component, the Cb component, and the Cr component.

Here, when a coded block flag (CBF) value indicating whether a transform coefficient exists for one transform block is 0, the position of the last non-zero coefficient for the corresponding transform block is not checked in order to determine whether the LFNST index is signaled. That is, when the corresponding CBF value is 0, since no transform is applied to the corresponding block, the position of the last non-zero coefficient may not be considered when checking the condition for LFNST index signaling.

For example, 1) In the case of a dual tree type and a luma component, if the CBF value is 0, the LFNST index is not signaled, 2) In the case of a dual tree type and a chroma component, if the CBF value for Cb is 0 and the CBF value for Cr is 1, only the position of the last non-zero coefficient for Cr is checked and the corresponding LFNST index is transmitted, 3) In the case of a single tree type, for all of luma, Cb, and Cr, the position of the last non-zero coefficient is checked only for components with each CBF value of 1.

When it is confirmed that the transform coefficient exists in a position other than a position where the LFNST transform coefficient may exist, LFNST index signaling may be omitted. In the case of a 4×4 transform block and an 8×8 transform block, according to the transform coefficient scanning order in the VVC standard, the LFNST transform coefficients may exist in eight positions from the DC position, and all remaining positions are filled with zeros. In addition, when the 4×4 transform block and the 8×8 transform block are not, the LFNST transform coefficients may exist in 16 positions from the DC position according to the transform coefficient scanning order in the VVC standard, and all remaining positions are filled with zeros.

Accordingly, if non-zero transform coefficients exist in the region to be filled with the zero value after performing residual coding, the LFNST index signaling may be omitted.

Meanwhile, the ISP mode may be applied only to the luma block or may be applied to both the luma block and the chroma block. As described above, when the ISP prediction is applied, the corresponding coding unit is divided into two or four partition blocks and predicted, and a transform may be applied to the corresponding partition blocks, respectively. Therefore, when determining a condition for signaling the LFNST index in units of coding units, it is necessary to consider the fact that LFNST may be applied to respective partition blocks. In addition, when the ISP prediction mode is applied only to a specific component (eg, a luma block), the LFNST index needs to be signaled in consideration of the fact that only the corresponding component is divided into partition blocks. The LFNST index signaling methods available in ISP mode are summarized as follows.

1. The LFNST index may be transmitted once for each coding unit (CU), and in the case of a dual-tree, an individual LFNST index may be signaled for a luma block and a chroma block, respectively.

2. When the LFNST index is not signaled, the LFNST index value is set (inferred) to a default value of 0. The case where the LFNST index value is inferred to be 0 is as follows.

A. In the case of a mode (eg, transform skip, BDPCM, lossless coding, etc.) to which no transform is applied B. When the horizontal length or vertical length of the luma block of the coding unit exceeds the size of the maximum luma transform that can be transformed, for example, when the size of the maximum luma transform that can be transformed is 64, in the case where the size of the luma block of the coding block is equal to 128×16, the LFNST cannot be applied.

It may be determined whether the LFNST index is signaled based on the size of the partition block instead of the coding unit. That is, when the horizontal length or the vertical length of the partition block for the corresponding luma block exceeds the size of the maximum luma transform that can be transformed, the LFNST index signaling may be omitted and the LFNST index value may be inferred to be 0.

In the case of the dual tree, it is determined whether the maximum transform block size is exceeded for each of the coding unit or partition block for the luma component and the coding unit or partition block for the chroma component. That is, if the horizontal and vertical lengths of the coding unit or partition block for luma are compared with the maximum luma transform size, respectively, and if even one is larger than the maximum luma transform size, the LFNST is not applied, and in the case of the coding unit or partition block for chroma, the horizontal/vertical length of the corresponding luma block for the color format and the size of the maximum luma transform capable of maximum transformation are compared. For example, when the color format is 4:2:0, the horizontal/vertical length of the corresponding luma block is twice that of the corresponding chroma block, and the transform size of the corresponding luma block is twice that of the corresponding chroma block. As another example, when the color format is 4:4:4, the horizontal/vertical length and transformation size of the corresponding luma block are the same as those of the corresponding chroma block.

In the case of the single tree, after checking whether a horizontal length or a vertical length of a luma block (coding unit or partition block) exceeds the maximum transformable luma transform block size, if it exceeds, the LFNST index signaling may be omitted.

C. If the LFNST included in the current VVC standard is applied, the LFNST index can be transmitted only when both the horizontal and vertical lengths of the partition block are 4 or more.

If the LFNST for a 2×M (1×M) or M×2 (M×1) block is applied in addition to the LFNST included in the current VVC standard, the LFNST index can be transmitted only when the size of the partition block is equal to or greater than 2×M (1×M) or M×2 (M×1) blocks. Here, the meaning that the P×Q block is equal to or greater than the R×S block means that P≥R and Q≥S.

In summary, the LFNST index can be transmitted only when the partition block is equal to or larger than the minimum size applicable to LFNST. In the case of the dual tree, the LFNST index can be signaled only when the partition block for the luma or chroma component is equal to or larger than the minimum size to which the LFNST is enable. In the case of the single tree, the LFNST index may be signaled only when the partition block for the luma component is equal to or larger than the minimum size applicable to LFNST.

In the present disclosure, when an M×N block is greater than or equal to a K×L block, it means that M is greater than or equal to K and N is greater than or equal to L. The fact that the M×N block is larger than the K×L block means that M is greater than or equal to K and N is greater than or equal to L, and M is greater than K or N is greater than L. The fact that the M×N block is less than or equal to the K×L block means that M is less than or equal to K and N is less than or equal to L, and the fact that the M×N block less than the K×L block means that M is less than or equal to K and N is less than L and M is less than K or N is less than L.

When the position of the last non-zero coefficient is not the DC position (the upper-left position of the block), if it is a luma block of the dual tree type, in the case of the position of the last non-zero coefficient in any of all partition blocks is not a DC position, the LFNST index may be transmitted. If it is the dual tree type and is the chroma block, when any one of the position of the last non-zero coefficient of all partition blocks for Cb (the number of partition blocks is considered to be one when the ISP mode is not applied to the chroma component) and the position of the last non-zero coefficient of all partition blocks for Cr (when the ISP mode is not applied to the chroma component, the number of partition blocks is considered to be one) is not a DC position, the corresponding LNFST index may be transmitted.

In the case of the single tree type, if the position of the last non-zero coefficient is not the DC position of any one of all partition blocks for the luma component, the Cb component, and the Cr component, the corresponding LFNST index may be transmitted.

Here, when a coded block flag (CBF) value indicating whether a transform coefficient exists for each partition block is 0, the position of the last non-zero coefficient for the corresponding partition block is not checked in order to determine whether the LFNST index is signaled. That is, when the corresponding CBF value is 0, the transform is not applied to the corresponding block, so the position of the last non-zero coefficient for the corresponding partition block is not considered when checking the condition for LFNST index signaling.

For example, 1) In case of dual tree type and luma component, if the corresponding CBF value for each partition block is 0, the corresponding partition block is excluded when determining whether to signal the LFNST index, 2) in case of the dual tree type and the chroma component, for each partition block, if the CBF value for Cb is 0 and the CBF value for Cr is 1, only the position of the last non-zero coefficient for Cr is checked to determine whether to signal the corresponding LFNST index, 3) In case of the single tree type, for all partition blocks of the luma component, the Cb component, and the Cr component, whether the LFNST index is signaled may be determined by checking the position of the last non-zero coefficient only for blocks having a CBF value of 1.

In the case of the ISP mode, the image information may be configured so that the position of the last non-zero coefficient is not checked, and an embodiment thereof is as follows.

i. In the case of the ISP mode, the LFNST index signaling may be allowed without checking the position of the last non-zero coefficient for both the luma block and the chroma block. That is, even if the position of the last non-zero coefficient for all partition blocks is the DC position or the corresponding CBF value is 0, the LFNST index signaling may be allowed.

ii. In the case of the ISP mode, the check of the position of the last non-zero coefficient only for the luma block may be omitted, and in the case of the chroma block, the position of the last non-zero coefficient may be checked in the above-described manner. For example, in the case of the dual tree type and luma block, the LFNST index signaling is allowed without checking the position of the last non-zero coefficient, and in the case of the dual tree type and chroma block, in the above-described manner, it is possible to determine whether the corresponding LFNST index is signaled by checking whether the DC position exists for the position of the last non-zero coefficient.

iii. In the case of the ISP mode and the single tree type, the method i or ii above may be applied. That is, in the ISP mode and when the number i is applied to the single tree type, it is possible to omit the check of the position of the last non-zero coefficient for both the luma block and the chroma block and allow LFNST index signaling. Alternatively, the number ii is applied to omit the check on the position of the last non-zero coefficient for partition blocks for the luma component, and with respect to the partition blocks (in the case where ISP is not applied to the chroma component, the number of partition blocks may be considered to be 1) for the chroma component, it is possible to determine whether to signal the corresponding LFNST index by performing a check on the position of the last non-zero coefficient in the manner described above.

E. If it is confirmed that the transform coefficient exists in a position other than a position where the LFNST transform coefficient may exist even for one partition block among all partition blocks, the LFNST index signaling may be omitted.

For example, in the case of a 4×4 partition block and an 8×8 partition block, according to the transform coefficient scanning order in the VVC standard, the LFNST transform coefficients may exist in eight positions from the DC position, and all remaining positions are filled with zeros. In addition, if it is equal to or greater than 4×4 and is not a 4×4 partition block and an 8×8 partition block, the LFNST transform coefficients may exist in 16 positions from the DC position according to the transform coefficient scanning order in the VVC standard, and all remaining positions are filled with zeros.

Accordingly, if non-zero transform coefficients exist in the region to be filled with the zero value after performing residual coding, the LFNST index signaling may be omitted.

On the other hand, in the case of the ISP mode, the current VVC standard sees length conditions independently in the horizontal and vertical directions, and applies DST-7 instead of DCT-2 without signaling the MTS index. It is determined whether the horizontal or vertical length is greater than or equal to 4 and greater than or equal to or less than 16, and a primary transform kernel is determined according to the determination result. Therefore, in the case of the ISP mode and in the case where the LFNST can be applied, the following transform combination configuration is possible.

1. When the LFNST index is 0 (including the case where the LFNST index is inferred to be 0), the primary transform decision condition for the ISP included in the current VVC standard may be followed. That is, it checks whether the length condition (condition equal to or greater than 4 and greater than or less than 16) is satisfied independently for each of the horizontal and vertical directions, and if it is satisfied, for the primary transform, the DST-7 is applied instead of the DCT-2, and if it is not satisfied, the DCT-2 may be applied.

2. For the case where the LFNST index is greater than 0, the following two configurations may be possible as the primary transform.

A. The DCT-2 may be applied to both horizontal and vertical directions.

B. The primary transform decision condition at the time of the ISP included in the current VVC standard may be followed. That is, it checks whether the length condition (condition equal to or greater than 4 and greater than or less than 16) is satisfied independently for each of the horizontal and vertical directions, and if it is satisfied, the DST-7 is applied instead of the DCT-2, and if it is not satisfied, the DCT-2 may be applied.

In the ISP mode, image information may be configured such that the LFNST index is transmitted for each partition block rather than for each coding unit. In this case, in the above-described LFNST index signaling method, it may be considered that only one partition block exists in a unit in which the LFNST index is transmitted, and whether or not to signal the LFNST index may be determined.

Meanwhile, the signaling of the LFNST index and the MTS index will be described below.

The following table shows a coding unit syntax table, a transform unit syntax table, and a residual coding syntax table related to the signaling of the LFNST index and the MTS index according to an example. According to Table 4, the MTS index moves from the transform unit level to the coding unit level syntax, and is signaled after the LFNST index signaling. In addition, the constraint that does not allow the LFNST when the ISP is applied to the coding unit has been removed. When the ISP is applied to a coding unit, the constraint that does not allow the LFNST is removed, so that the LFNST may be applied to all intra prediction blocks. In addition, both the MTS index and the LFNST index are conditionally signaled in the last part of the coding unit level.

TABLE 4

```
coding_unit( x0, y0, cbWidth, cbHeight, cqtDepth, treeType, modeType
) {
    ...
    LfnstDcOnly = 1
    LfnstZeroOutSigCoeffFlag = 1
    MtsZeroOutSigCoeffFlag = 1
    transform_tree( x0, y0, cbWidth, cbHeight, treeType )
    lfnstWidth = ( treeType = = DUAL_TREE_CHROMA ) ? cbWidth /
    SubWidthC
            : ( IntraSubPartitionsSplitType = =
ISP_VER_SPLIT) ? cbWidth / NumIntraSubPartitions : cbWidth
    lfnstHeight = ( treeType = = DUAL_TREE_CHROMA ) ? cbHeight
    / SubHeightC
            : ( IntraSubPartitionsSplitType = =
ISP_HOR_SPLIT) ? cbHeight / NumIntraSubPartitions : cbHeight
    if( Min( lfnstWidth, lfnstHeight ) >= 4 && sps_lfnst_enabled_flag
    = = 1 &&
        CuPredMode[ chType ][ x0 ][ y0 ] = = MODE_INTRA &&
        ( !intra_mip_flag[ x0 ][ y0 ] | | Min( lfnstWidth, lfnstHeight ) >= 16
        ) &&
        Max( cbWidth, cbHeight ) <= MaxTbSizeY) {
        if( ( IntraSubPartitionsSplitType ! = ISP_NO_SPLIT | |
        LfnstDcOnly = = 0 ) &&
LfnstZeroOutSigCoeffFlag = = 1 )
            lfnst_idx[ x0 ][ y0 ]
    }
    if( treeType != DUAL_TREE_CHROMA && lfnst_idx[ x0 ][ y0
    ] = = 0 &&
        transform_skip_flag[ x0 ][ y0 ] = = 0 && Max( cbWidth, cbHeight
        ) <= 32 &&
        IntraSubPartitionsSplit[ x0 ][ y0 ] = = ISP_NO_SPLIT && (
        !cu_sbt_flag ) &&
        MtsZeroOutSigCoeffFlag = = 1 && tu_cbf_luma[ x0 ][ y0 ] ) {
        if( ( ( CuPredMode[ chType ][ x0 ][ y0 ] = = MODE_INTER &&
            sps_explicit_mts_inter_enabled_flag )
            | | ( CuPredMode[ chType ][ x0 ][ y0 ] = = MODE_INTRA &&
            sps_explicit_mts_intra_enabled_flag ) ) )
            mts_idx[ x0 ][ y0 ]
    }
    ...
```

TABLE 5

```
transform_unit( x0, y0, tbWidth, tbHeight, treeType, subTuIndex, chType
) {
    ...
    if( tu_cbf_luma[ x0 ][ y0 ] && treeType !=
    DUAL_TREE_CHROMA
        && ( tbWidth <= 32 ) && ( tbHeight <= 32 )
        && ( IntraSubPartitionsSplit[ x0 ][y0 ] = = ISP_NO_SPLIT )
        && ( !cu_sbt_flag ) ) {
        if( sps_transform_skip_enabled_flag && !BdpcmFlag[ x0 ][ y0 ]
        &&
            tbWidth <= MaxTsSize && tbHeight <= MaxTsSize )
            transform_skip_flag[ x0 ][ y0 ]
    }
    ...
```

TABLE 6

```
residual_coding( x0, y0, log2TbWidth, log2TbHeight, cIdx ) {
    ...
    if( ( sps_mts_enabled_flag &&
cu_sbt_flag && log2TbWidth < 6 && log2TbHeight < 6 ) )
```

TABLE 6-continued

```
        && cIdx = = 0 && log2TbWidth > 4 )
    log2ZoTbWidth = 4
else
    log2ZoTbWidth = Min( log2TbWidth, 5 )
MaxCcbs = 2 * ( 1 << log2TbWidth ) * ( 1<< log2TbHeight )
if( ( sps_mts_enabled_flag &&
cu_sbt_flag && log2TbWidth < 6 && log2TbHeight < 6 ) )
        && cIdx = = 0 && log2TbHeight > 4 )
    log2ZoTbHeight = 4
else
    log2ZoTbHeight = Min( log2TbHeight, 5 )
...
if( ( lastSubBlock > 0 && log2TbWidth >= 2 && log2TbHeight >= 2 )
||
    ( lastScanPos > 7 && ( log2TbWidth = = 2 || log2TbWidth = = 3 )
&&
    log2TbWidth = = log2TbHeight ) )
    LfnstZeroOutSigCoeffFlag = 0
if( ( LastSignificantCoeffX >15 || LastSignificantCoeffY > 15 ) &&
cIdx = = 0 )
    MtsZeroOutSigCoeffFlag = 0
...
```

The meanings of the main variables in the table are as follows.

1. cbWidth, cbHeight: width and height of the current coding block
2. log 2TbWidth, log 2TbHeight: The log value of base-2 for the width and height of the current transform block and zero-out are reflected to be reduced to the upper left area where non-zero coefficients may exist.
3. sps_lfnst_enabled_flag: It is a flag indicating whether the LFNST is enable, if the flag value is 0, it indicates that the LFNST is not enable, and if the flag value is 1, it indicates that the LFNST is enable. It is defined in the Sequence Parameter Set (SPS).
4. CuPredMode[chType][x0][y0]: The prediction mode corresponding to the variable chType and the (x0, y0) position, chType may have values 0 and 1, where 0 represents the luma component and 1 represents the chroma component. (x0, y0) position indicates a position on a picture, and MODE_INTRA (intra prediction) and MODE_INTER (inter prediction) are possible with CuPredMode[chType][x0][y0] values.
5. IntraSubPartitionsSplit[x0][y0]: The contents of the (x0, y0) position are the same as in No. 4. It is indicated which ISP division at the (x0, y0) position is applied, and ISP_NO_SPLIT indicates that the coding unit corresponding to the (x0, y0) position is not divided into partition blocks.
6. intra_mip_flag[x0][y0]: The contents of the (x0, y0) position are the same as in No. 4 above. The intra_mip_ flag is a flag indicating whether a matrix-based intra prediction (MIP) prediction mode is applied. The flag value of 0 indicates that MIP is not enable, and the flag value of 1 indicates that MIP is applied.
7. cIdx: A value of 0 indicates luma, and values of 1 and 2 indicate Cb and Cr, which are chroma components, respectively.
8. treeType: It indicates single-tree and dual-tree, etc. (SINGLE_TREE: single tree, DUAL_TREE_LUMA: dual tree for luma component, DUAL_TREE_CHROMA: dual tree for chroma component)
9. lastSubBlock: It indicates a position in the scan order of a sub-block (Coefficient Group (CG)) in which the last non-zero coefficient is position. 0 indicates a sub-block including a DC component, and if greater than 0, it is not a sub-block including a DC component.

10. lastScanPos: It indicates where the last significant coefficient is in the scan order within one sub-block. If one sub-block consists of 16 positions, values from 0 to 15 are possible.
11. lfnst_idx[x0][y0]: LFNST index syntax element to be parsed. If it is not parsed, it is inferred as a value of 0. That is, the default value is set to 0 and indicates that LFNST is not applied.
12. LastSignificantCoeffX, LastSignificantCoeffY: It indicates the x-coordinate and y-coordinate where the last significant coefficient is located in the transform block. The x-coordinate starts at 0 and increases from left to right, and the y-coordinate starts at 0 and increases from top to bottom. If the values of both variables are 0, it means that the last significant coefficient is located at DC.
13. cu_sbt_flag: It is a flag indicating whether SubBlock Transform (SBT) included in the current VVC standard is enable. If the flag value is 0, it indicates that SBT is not enable and if the flag value is 1, it indicates that SBT is applied.
14. sps_explicit_mts_inter_enabled_flag, sps_explicit_mts_intra_enabled_flag: It is a flag indicating whether or not explicit MTS is applied to an inter CU and an intra CU, respectively. If the corresponding flag value is 0, it indicates that MTS is not applicable to the inter-CU or intra-CU, and if it is 1, it indicates that MTS is applicable.
15. tu_mts_idx[x0][y0]: It is MTS index syntax element to be parsed. If it is not parsed, it is inferred as a value of 0. That is, the default value is set to 0, it is indicated that DCT-2 is applied to both the horizontal and vertical directions.

As shown in Table 4, several conditions are checked when coding mts_idx[x0][y0], and only when the lfnst_idx[x0] [y0] value is 0, tu_mts_idx[x0][y0] is signaled.

In addition, tu_cbf_luma[x0][y0] is a flag indicating whether a significant coefficient exists for the luma component. A value of 0 indicates that the significant coefficient does not exist in the corresponding transform block for the luma component, and 1 indicates that the significant coefficient exists in the corresponding transform block for the luma component.

According to Table 4, when both the width and height of the coding unit for the luma component are 32 or less, mts_idx[x0][y0] is signaled (Max(cbWidth, cbHeight) <=32), that is, whether or not MTS is applied is determined by the width and height of the coding unit for the luma component.

In addition, according to Table 4, even in ISP mode (IntraSubPartitionsSplitType!=ISP_NO_SPLIT) lfnst_idx [x0][y0] may be configured to signal, and the same LFNST index value may be applied to all ISP partition blocks.

On the other hand, mts_idx[x0][y0] may be signaled only when not in the ISP mode (IntraSubPartitionsSplit[x0] [y0]==ISP_NO_SPLIT).

In the process of determining log 2ZoTbWidth and log 2ZoTbHeight as shown in Table 6 (where log 2ZoTbWidth and log 2ZoTbHeight represent the base-2 log value of the width and height of the upper left area remaining after zero-out is performed, respectively) the part that checks the mts_idx[x0][y0] value may be omitted.

Also, according to an example, a condition for checking sps_mts_enable_flag may be added when determining log 2ZoTbWidth and log 2ZoTbHeight in residual coding.

The variable LfnstZeroOutSigCoeffFlag of Table 4 is 0 if there is a significant coefficient at the zero-out position when LFNST is applied, otherwise it is 1. The variable LfnstZeroOutSigCoeffFlag may be set according to several conditions shown in Table 6.

According to an example, the variable LfnstDcOnly in Table 4 becomes 1 when all of the last significant coefficients are located at the DC position (top-left position) for the transform blocks having the corresponding coded block flag (CBF) (1 if there is at least one significant coefficient in the block, 0 otherwise) value of 1, otherwise it becomes 0. More specifically, in the case of dual tree luma, the position of the last significant coefficient is checked with respect to one luma transform block, and in the case of dual tree chroma, the position of the last significant coefficient is checked with respect to both the transform block for Cb and the transform block for Cr. In the case of the single tree, the position of the last significant coefficient may be checked with respect to the transform block for luma, Cb, and Cr.

In Table 4, MtsZeroOutSigCoeffFlag is initially set to 1, and this value may be changed in the residual coding of Table 6. The variable MtsZeroOutSigCoeffFlag changes from 1 to 0 if there is a significant coefficient in the area (LastSignificantCoeffX>15||LastSignificantCoeffY>15) that should be filled with 0 due to zero out. In this case, as shown in Table 4, the MTS index is not signaled.

Meanwhile, as shown in Table 4, when tu_cbf_luma[x0][y0] is 0, mts_idx[x0][y0] coding may be omitted. That is, if the CBF value of the luma component is 0, since no transform is applied, there is no need to signal the MTS index, so the MTS index coding may be omitted.

According to an example, the technical feature may be implemented in another conditional syntax. For example, after the MTS is performed, it is possible to derive a variable indicating whether a significant coefficient exists in a region other than the DC region of the current block, and if the variable indicates that the significant coefficient exists in a region excluding the DC region, MTS index may be signaled. That is, the existence of a significant coefficient in a region other than the DC region of the current block indicates that the tu_cbf_luma[x0][y0] value is 1, and in this case, the MTS index may be signaled.

The variable may be expressed as MtsDcOnly, and after the variable MtsDcOnly is initially set to 1 at the coding unit level, the value may be changed to 0 when the residual coding level indicates that a significant coefficient exists in an area other than the DC area of the current block. When the variable MtsDcOnly is 0, the image information may be configured such that the MTS index is signaled.

If tu_cbf_luma[x0][y0] is 0, the variable MtsDcOnly maintains an initial value of 1 because the residual coding syntax is not called at the transform unit level of Table 5. In this case, since the variable MtsDcOnly is not changed to 0, the image information may be configured so that the MTS index is not signaled. That is, the MTS index is not parsed and signaled.

Meanwhile, the decoding apparatus may determine the color index cIdx of the transform coefficient to derive the variable MtsZeroOutSigCoeffFlag of Table 6. The color index cIdx of 0 means a luma component.

According to an example, since the MTS may be applied only to the luma component of the current block, the decoding apparatus may determine whether the color index is luma when deriving the variable MtsZeroOutSigCoeffFlag that determines whether to parse the MTS index.

The variable MtsZeroOutSigCoeffFlag is a variable indicating whether zero-out is performed when MTS is applied. It indicates whether the transform coefficient exists in the upper-left region where the last significant coefficient may exist due to zero-out after the MTS is performed, that is, in the region other than the upper-left 16×16 region. The variable MtsZeroOutSigCoeffFlag is initially set to 1 at the coding unit level as shown in Table 4 (MtsZeroOutSigCoeffFlag=1), and if the transform coefficient exists in a region other than the 16×16 region, the value changes from 1 to 0 at the residual coding level as shown in Table 6 Can be changed (MtsZeroOutSigCoeffFlag=0). If the value of the variable MtsZeroOutSigCoeffFlag is 0, the MTS index is not signaled.

As shown in Table 6, at the residual coding level, the non-zero-out region in which non-zero transform coefficients may exist may be set depending on whether or not zero-out accompanying MTS is performed, and even in this case, when the color index (cIdx) is 0, the non-zero-out area may be set as the upper left 16×16 region of the current block.

In this way, when deriving a variable for determining whether to parse the MTS index, it is determined whether the color component is luma or chroma. However, since the LFNST may be applied to both the luma component and the chroma component of the current block, the color component is not determined when deriving a variable determining whether to parse the LFNST index.

For example, Table 4 shows a variable LfnstZeroOutSigCoeffFlag that may indicate that the zero-out is performed when the LFNST is applied. The variable LfnstZeroOutSigCoeffFlag indicates whether a significant coefficient exists in the second region except for the first region at the upper left of the current block. This value is initially set to 1, and if there is a significant coefficient in the second area, the value may change to 0. The LFNST index may be parsed only when the value of the initially set variable LfnstZeroOutSigCoeffFlag is maintained at 1. When determining and deriving whether the variable LfnstZeroOutSigCoeffFlag value is 1, since the LFNST may be applied to both the luma component and the chroma component of the current block, the color index of the current block is not determined.

Meanwhile, the syntax table of the coding unit signaling the LFNST index according to an example is as follows.

TABLE 7

| | Descriptor |
| --- | --- |

```
coding_unit( x0, y0, cbWidth, cbHeight, cqtDepth, treeType, modeType ) {
    ......
        LfnstDcOnly = 1
        LfnstZeroOutSigCoeffFlag = 1
        MtsZeroOutSigCoeffFlag = 1
        transform_tree( x0, y0, cbWidth, cbHeight, treeType, chType )
        lfnstWidth = ( treeType = = DUAL_TREE_CHROMA ) ? cbWidth / SubWidthC
                : ( ( IntraSubPartitionsSplitType = = ISP_VER_SPLIT ) ? cbWidth NumIntraSubPartitions : cbWidth )
```

TABLE 7-continued

| | Descriptor |
|---|---|
| lfnstHeight = ( treeType = = DUAL_TREE_CHROMA ) ? cbHeight / SubHeightC<br>    : ( ( IntraSubPartitionsSplitType = =<br>ISP_HOR_SPLIT) ? cbHeight /<br>      NumIntraSubPartitions : cbHeight )<br>  if( Min( lfnstWidth, lfnstHeight ) >= 4 && sps_lfnst_enabled_flag = = 1<br>&&<br>    CuPredMode[ chType ][ x0 ][ y0 ] = = MODE_INTRA &&<br>    transform_skip_flag[ x0 ][ y0 ][ 0 ] = = 0 &&<br>    ( treeType = = DUAL_TREE_CHROMA \| \| !intra_mip_flag[ x0 ][ y0 ] \| \|<br>      Min( lfnstWidth, lfnstHeight ) >= 16 ) &&<br>    Max( cbWidth, cbHeight) <= MaxTbSizeY) {<br>      if( ( IntraSubPartitionsSplitType != ISP_NO_SPLIT \| \| LfnstDcOnly = =<br>0 ) &&<br>      LfnstZeroOutSigCoeffFlag = = 1 )<br>      lfnst_idx | ae(v) |
|   }<br>  if( treeType != DUAL_TREE_CHROMA && lfnst_idx = = 0 &&<br>    transform_skip_flag[ x0 ][ y0 ][ 0 ] = = 0 && Max( cbWidth, cbHeight )<br><= 32 &&<br>    IntraSubPartitionsSplit[ x0 ][ y0 ] = = ISP_NO_SPLIT && cu_sbt_flag<br>= = 0 &&<br>    MtsZeroOutSigCoeffFlag = = 1 && tu_cbf_luma[ x0 ][ y0 ] ) {<br>    if( ( ( CuPredMode[ chType ][ x0 ][ y0 ] = = MODE_INTER &&<br>    sps_explicit_mts_inter_enabled_flag ) \| \|<br>    ( CuPredMode[ chType ][ x0 ][ y0 ] = = MODE_INTRA &&<br>    sps_explicit_mts_intra_enabled_flag ) ) )<br>    mts_idx | ae(v) |
|     }<br>  } | |

In Table 7, lfnst_idx means the LFNST index and may have values 0, 1, and 2 as described above. As shown in Table 7, lfnst_idx is signaled only when the condition (!intra_mip_fag[x0][y0]||Min(lfnstWidth, lfnstHeight)>=16) is satisfied. Here, intra_mip_fag[x][y0] is a flag indicating whether or not Matrix-based Intra Prediction (MIP) mode is applied to the luma block to which the (x0, y0) coordinates belong. If the MIP mode is applied to the luma block, the value is 1, and 0 if not applied.

lfnstWidth and lfnstHeight indicate the width and height to which LFNST is applied with respect to a coding block currently being coded (including both a luma coding block and a chroma coding block). When the ISP is applied to the coding block, it may indicate the width and height of each partition block divided into two or four.

In addition, in the above condition, when Min(lfnstWidth, lfnstHeight)>=16 is equal to or greater than a 16×16 block when the MIP is applied (eg, both the width and height of the MIP-applied luma coding block are equal to or greater than 16), it indicates that the LFNST may be applied. The meanings of the main variables included in Table 7, which do not overlap with the description of Table 4, are briefly introduced as follows.

1. IntraSubPartitionsSplitType: It indicates how the ISP partition is formed for the current coding unit, and ISP_NO_SPLIT means that the corresponding coding unit is not a coding unit split into partition blocks. ISP_VER_SPLIT indicates vertical split, and ISP_HOR_SPLIT indicates horizontal split. For example, when a W×H (width W, height H) block is horizontally split into n partition blocks, it is split into W×(H/n) blocks, and when a W×H (width W, height H) block is vertically split into n partition blocks, it is split into (W/n)×H blocks.
2. SubWidthC, SubHeightC: SubWidthC and SubHeightC are values set according to a color format (or a chroma format, for example 4:2:0, 4:2:2, 4:4:4), and more specifically, it indicates the ratio of the width and the height of the luma component and the chroma component, respectively. (See table below)

TABLE 8

| Chroma format | SubWidthC | SubHeightC |
|---|---|---|
| Monochrome | 1 | 1 |
| 4:2:0 | 2 | 2 |
| 4:2:2 | 2 | 1 |
| 4:4:4 | 1 | 1 |
| 4:4:4 | 1 | 1 |

3. NumIntraSubPartitions: It indicates how many partition blocks are divided when the ISP is applied. That is, it indicates that the partition is divided into NumIntraSubPartitions partition blocks.
4. LfnstDcOnly: For all transform blocks belonging to the current coding unit, each last non-zero coefficient position is a DC position (ie, a top-left position within the corresponding transform block) or when a significant coefficient does not exist (that is, when the corresponding CBF value is 0), the value of the LnfstDCOnly variable becomes 1.

In the case of the luma separate-tree or the luma dual-tree, the LfnstDcOnly variable value is determined by checking the condition only for transform blocks corresponding to the luma component in the corresponding coding unit, and in the case of the chroma separate-tree or the chroma dual-tree, the LfnstDcOnly variable value may be determined by checking the condition only for transform blocks corresponding to the chroma components (Cb, Cr) in the corresponding coding unit In the case of the single tree, the LfnstDcOnly variable value may be determined by checking the above conditions for all transform blocks corresponding to the luma component and the chroma component (Cb, Cr) in the corresponding coding unit.

5. LfnstZeroOutSigCoeffFlag: When the LFNST is applied, it is set to 1 if the significant coefficient exists only in the region where the significant coefficient may exist; otherwise, it is set to 0.

In the case of the 4×4 transform block or the 8×8 transform block, up to 8 significant coefficients may be located from the (0, 0) position (top-left) in the corresponding transform block according to the scanning order, and for the remaining positions in the corresponding transform block, are zeroed out. In the case of a transform block that is not 4×4 and 8×8 and whose width and height are equal to or greater than 4, respectively (that is, a transform block to which the LFNST may be applied), according to the scanning order, 16 significant coefficients can be located from the (0, 0) position (top-left) in the corresponding transform block (that is, the significant coefficient can be located only within the upper left 4×4 block) and is zeroed out for the remaining positions in the corresponding transform block.

In addition, as shown in Table 7, when coded in a split tree or a dual tree, whether the MIP is applied to the chroma component is not checked when signaling the LFNST index. Through this, the LFNST may be properly applied to the chroma component.

As shown in Table 7, when the condition (treeType==DUAL_TREE_CHROMA||!intra_mip_flag[x0][y0]||Min(lfnstWidth, lfnstHeight)>=16)))) is satisfied, the LFNST index is signaled. This means that (Min(lfnstWidth, lfnstHeight)>=16)) LFNST index is signaled when the tree type is a dual tree chroma type (treeType==DUAL_TREE_CHROMA), MIP mode not applied (!intra_mip_flag[x0][y0]), or the smaller of the width and height of the block to which LFNST is applied is 16 or more. That is, when the coding block is the dual tree chroma, the LFNST index is signaled without determining whether the MIP mode is applied or the width and height of the block to which the LFNST is applied.

In addition, the above condition can be interpreted as that if the coding block is not dual tree chroma and MIP is not applied, the LFNST index is signaled without determining the width and height of the block to which the LFNST is applied.

In addition, when the coding block is not the dual tree chroma and the MIP is applied, it may be interpreted that the LFNST index may be signaled when the smaller of the width and the height of the block to which the LFNST is applied is 16 or more.

On the other hand, only when transform skip is not applied to the luma component as shown in Table 7 (that is, when the condition transform_skip_flag[x0][y0][0]==0 is satisfied), the LFNST index is signaled.

Here, x0 and y0 mean (x0, y0) coordinates when the upper-left position is (0, 0) in the picture for the luma component, and the horizontal X coordinate increases from left to right, and the vertical Y coordinate increases from top to bottom.

(x0, y0) is a coordinate based on the luma component, but may also be used for the chroma phase component. In this case, the actual position indicated by the (x0, y0) coordinate may be scaled based on the picture for the chroma component. For example, when the chroma format is 4:2:0, the actual position of the chroma component indicated by (x0, y0) on the picture may be (x0/2, y0/2). For example, when the chroma format is 4:2:0, the actual position of the chroma component indicated by (x0, y0) on the picture may be (x0/2, y0/2).

In transform_skip_flag[x0][y0][0], the last index 0 refers to the luma component. More specifically, in transform_skip_flag[x0][y0][cIdx], cIdx refers to which component it is for, and if the cIdx value is 0, a cIdx value of 0 indicates luma, and cIdx greater than 0 (1 or 2) indicates chroma.

In addition, the variable LfnstDcOnly is initialized to a value of 1 as shown in Table 7, and may be set to a value of 0 according to a condition in the parsing function for residual coding as shown in the table below.

TABLE 9

| | Descriptor |
|---|---|
| residual_coding( x0, y0, log2TbWidth, log2TbHeight, cIdx ) { | |
|   if( sps_mts_enabled_flag && cu_sbt_flag && cIdx = = 0 && | |
|     log2TbWidth < 6 && log2TbHeight < 6 && log2TbWidth > 4 ) | |
|     log2ZoTbWidth = 4 | |
|   else | |
|     log2ZoTbWidth = Min( log2TbWidth, 5 ) | |
|   if( sps_mts_enabled_flag && cu_sbt_flag && cIdx = = 0 && | |
|     log2TbWidth < 6 && log2TbHeight < 6 && log2TbHeight > 4 ) | |
|     log2ZoTbHeight = 4 | |
|   else | |
|     log2ZoTbHeight = Min( log2TbHeight, 5 ) | |
|   if( log2TbWidth > 0 ) | |
|     last_sig_coeff_x_prefix | ae(v) |
|   if( log2TbHeight > 0 ) | |
|     last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2TbWidth = log2ZoTb Width | |
|   log2TbHeight = log2ZoTbHeight | |
|   remBinsPass1 = ( ( 1 << ( log2TbWidth + log2TbHeight ) ) * 7 ) >> 2 | |
|   log2SbW = ( Min( log2TbWidth, log2TbHeight ) < 2 ? 1 : 2 ) | |
|   log2SbH = log2SbW | |
|   if( log2TbWidth + log2TbHeight > 3 ) { | |
|     if( log2TbWidth < 2 ) { | |
|       log2SbW = log2TbWidth | |
|       log2SbH = 4 − log2SbW | |
|     } else if( log2TbHeight < 2 ) { | |
|       log2SbH = log2TbHeight | |
|       log2SbW = 4 − log2SbH | |

TABLE 9-continued

|  | Descriptor |
|---|---|

```
        }
    }
    numSbCoeff = 1 << ( log2SbW + log2SbH )
    lastScanPos = numSbCoeff
    lastSubBlock =
( 1 << ( log2TbWidth + log2TbHeight − ( log2SbW + log2SbH ) ) ) − 1
    do {
        if( lastScanPos = = 0 ) {
            lastScanPos = numSbCoeff
            lastSubBlock− −
        }
        lastScanPos− −
        xS = DiagScanOrder[ log2TbWidth − log2SbW ][ log2TbHeight − log2SbH ]
                [ lastSubBlock ][ 0 ]
        yS = DiagScanOrder[ log2TbWidth − log2SbW ][ log2TbHeight − log2SbH ]
                [ lastSubBlock ][ 1 ]
        xC = ( xS << log2SbW ) +
DiagScanOrder[ log2SbW ][ log2SbH ][ lastScanPos ][ 0 ]
        yC = ( yS << log2SbH ) + DiagScanOrder[ log2SbW ][ log2SbH ][lastScanPos ][ 1 ]
    } while( ( xC != LastSignificantCoeffX ) | | ( yC !=
LastSignificantCoeffY ) )
    if( lastSubBlock = = 0 && log2TbWidth >= 2 && log2TbHeight >=
2 &&
        !transform_skip_flag[ x0 ][ y0 ][ cIdx ] && lastScanPos > 0 )
        LfnstDcOnly = 0
    if( ( lastSubBlock > 0 && log2TbWidth >= 2 && log2TbHeight >= 2 ) | |
        ( lastScanPos > 7 && ( log2TbWidth = = 2 | | log2TbWidth = = 3 ) &&
        log2TbWidth = = log2TbHeight ) )
        LfnstZeroOutSigCoeffFlag = 0
    ......
}
```

As shown in Table 9, the LfnstDcOnly value may be set to 0 only when the transform_skip_flag[x0][y0][cIdx] value is 0 (that is, only when transform skip is not applied to the component indicated by cIdx). If it is not in the ISP mode, as shown in Table 7, the LFNST index is signaled only when the LfnstDcOnly value is 0, and the LFNST index value may be inferred to be 0 when the LFNST index is not signaled.

For reference, the residual coding function presented in Table 9 is called while performing the transform_tree called in Table 7, and for the single tree, the residual coding function for luma (cIdx=0) and chroma (cIdx=1 or 2, corresponding to the Cb component and Cr component) are all called, and for the dual tree, only the residual coding function for luma (cIdx=0) is called in the case of the dual tree for luma (DUAL_TREE_LUMA) and only the residual coding function for chroma (cIdx=1 or 2, corresponding to Cb and Cr components) is called in the case of the dual tree for chroma (DUAL_TREE_CHROMA).

The conditions under which the LFNST index is signaled for the case of not in the ISP mode are summarized as follows (here, it can be assumed that other conditions for the LFNST index to be signaled are satisfied, for example, the condition Max(cbWidth, cbHeight)<=MaxTbSizeY is assumed to be satisfied).

1. When transform_skip_flag[x0][y0][0] is 1
    LFNST index is inferred as 0 without signaling
2. When transform_skip_flag[x0][y0][0] is 0
2-A. When transform_skip_flag[x0][y0][1] is 0 and transform_skip_flag[x0][y0][2] is 0
    LfnstDcOnly value can be set to 0 for all cIdx in Table 9 (for cIdx 0, 1, 2)
    If the LfnstDcOnly value is 0, the LFNST index is signaled; otherwise, the LFNST index is not signaled and the value is inferred as 0.
2-B. When transform_skip_flag[x0][y0][1] is 0 and transform_skip_flag[x0][y0][2] is 1

In Table 9, the LfnstDcOnly value can be set to 0 only when cIdx is 0 and 1
    If the LfnstDcOnly value is 0, the LFNST index is signaled; otherwise, the LFNST index is not signaled and the value is inferred as 0.
2-C. When transform_skip_flag[x0][y0][1] is 1 and transform_skip_flag[x0][y0][2] is 0
    In Table 9, the LfnstDcOnly value can be set to 0 only when cIdx is 0 and 2
    If the LfnstDcOnly value is 0, the LFNST index is signaled; otherwise, the LFNST index is not signaled and the value is inferred to be 0.
2-D. When transform_skip_flag[x0][y0][1] is 1 and transform_skip_flag[x0][y0][2] is 1
    In Table 9, the LfnstDcOnly value can be set to 0 only when cIdx is 0
    If the LfnstDcOnly value is 0, the LFNST index is signaled; otherwise, the LFNST index is not signaled and the value is inferred as 0.

In the case of the single tree, transform_skip_flag[x0][y0][0], transform_skip_flag[x0][y0][1], transform_skip_flag[x0][y0][2] values are checked for the above cases, in the case of the dual tree for luma, only transform_skip_flag[x0][y0][0] is checked, and in the case of a dual tree for chroma, the values of transform_skip_flag[x0][y0][1] and transform_skip_flag[x0][y0][2] are checked.

In the case of the ISP mode (IntraSubPartitionsSplitType!=ISP_NO_SPLIT condition in Table 7, that is, horizontal division or vertical division), as shown in Table 7, the LfnstDcOnly variable is not checked and the LFNST index is signaled.

Therefore, in the case of the ISP mode in the single tree and dual tree for luma, regardless of the value of LfnstDcOnly variable, when transform_skip_flag[x0][y0][0] value is 0 (transform skip is not applied for luma component), the LFNST index is signaled (when the LFNST index is not signaled, the LFNST index value may be inferred to be 0).

In the case of the dual tree for chroma, based on the fact that ISP prediction is applied only to luma in the current VVC standard, it is considered that ISP is not applied to the chroma, and the LFNST index may be signaled by checking the LfnstDcOnly variable as in the above method, and as shown in Table 9, the LfnstDcOnly variable may be set to 0 only when the transform_skip_flag[x0][y0][cIdx] value is 0.

Of course, application of ISP mode to luma affects even a dual tree for chroma, so even in the case of the dual tree for chroma, the LFNST index may be signaled when the transform_skip_flag[x0][y0][0] value is 0 regardless of the LfnstDcOnly variable.

cIdx value in transform_skip_flag[x0][y0][cIdx] is 1, LfnstDcOnly variable value may be set to 0 only when transform_skip_flag[x0][y0][1] value is 0 and when the cIdx value is 2, the LfnstDcOnly variable value can be set to 0 only when the transform_skip_flag[x0][y0][2] value is 0.

If the LfnstDcOnly value is 0, the LFNST index is signaled; otherwise, the LFNST index is not signaled and the value is inferred to be 0.

In the above cases, the case of the dual tree for chroma is the same as the case where the ISP is not applied.

Meanwhile, according to an example, while the transform skip for a chroma component is permitted in the current VVC standard, a transform skip flag corresponding to each chroma component is added as shown in the table below.

TABLE 10

| | Descriptor |
|---|---|
| transform_unit( x0, y0, tbWidth, tbHeight, treeType, subTuIndex, chType ) { | |
| ...... | |
|   if( tu_cbf_luma[ x0 ][ y0 ] && treeType != DUAL_TREE_CHROMA ) { | |
|     if( sps_transform_skip_enabled_flag && !BdpcmFlag[ x0 ][ y0 ][ 0 ] &&.. | |
|       tbWidth <= MaxTsSize && tbHeight <= MaxTsSize && | |
|       ( IntraSubPartitionsSplit[ x0 ][ y0 ] = = ISP_NO_SPLIT ) && !cu_sbt_flag ) | |
|       transform_skip_flag[ x0 ][ y0 ][ 0 ] | ae(v) |
|     if( !transform_skip_flag[ x0 ][ y0 ][ 0 ] ) | |
|       residual_coding( x0, y0, Log2( tbWidth ), Log2( tbHeight ), 0 ) | |
|     else | |
|       residual_ts_coding( x0, y0, Log2( tbWidth), Log2( tbHeight), 0 ) | |
|   } | |
|   if( tu_cbf_cb[ xC ][ yC ] && treeType != DUAL_TREE_LUMA ) { | |
|     if( sps_transform_skip_enabled_flag && !BdpcmFlag[ x0 ][ y0 ][ 1 ] && | |
|       wC <= MaxTsSize && hC <= MaxTsSize && !cu_sbt_flag ) | |
|       transform_skip_flag[ xC ][ yC ][ 1 ] | ae(v) |
|     if( !transform_skip_flag[ xC ][ yC ][ 1 ] ) | |
|       residual_coding( xC, yC, Log2( wC ), Log2( hC ), 1 ) | |
|     else | |
|       residual_ts_coding( xC, yC, Log2( wC ), Log2( hC), 1 ) | |
|   } | |
|   if( tu_cbf_cr[ xC ][ yC ] && treeType != DUAL_TREE_LUMA && | |
|     !( tu_cbf_cb[ xC ][ yC ] && tu_joint_cbcr_residual_flag[ xC ][ yC ] ) ) { | |
|     if( sps_transform_skip_enabled_flag && !BdpcmFlag[ x0 ][ y0 ][ 2 ] && | |
|       wC <= MaxTsSize && hC <= MaxTsSize && !cu_sbt_flag ) | |
|       transform_skip_flag[ xC ][ yC ][ 2 ] | ae(v) |
|     if( !transform_skip_flag[ xC ][ yC ][ 2 ] ) | |
|       residual_coding( xC, yC, Log2( wC ), Log2( hC ), 2 ) | |
|     else | |
|       residual_ts_coding( xC, yC, Log2( wC), Log2( hC), 2 ) | |
|   } | |
| } | |

The conditions under which the LFNST index is signaled when the ISP mode is applied and the transform_skip_flag[x0][y0][0] value is 0 are summarized as follows. If the transform_skip_flag[x0][y0][0] value is 1, the LFNST index is not signaled and is inferred to be 0. Of course, it can be assumed that other conditions necessary for signaling the LFNST index in Table 7 are satisfied, for example, it can be assumed that a condition such as Max(cbWidth, cbHeight)<=MaxTbSizeY is satisfied.

1. In the case of the single tree
LFNST index signaling regardless of the LfnstDcOnly variable value 2. In the case of the dual tree 2-A. In the case of the duel tree for luma
LFNST index signaling regardless of the LfnstDcOnly variable value 2-B. In the case of the dual tree for chroma
According to the values of transform_skip_flag[x0][y0][1] and transform_skip_flag[x0][y0][2], when the LfnstDcOnly variable value is set to 0, that is, the In Table 10, except for the case of the dual tree for luma, it can be confirmed that transform_skip_flag[xC][yC][1] corresponding to whether the transform skip is applied to Cb and transform_skip_flag[xC][yC][2] corresponding to whether transform skip is applied to Cr may be signaled. If transform_skip_flag[xC][yC][1] value is 1, the transform skip is applied to Cb, and if it is 0, the transform skip is not applied to Cb, and if transform_skip_flag[xC][yC][2] value is 1, the transform skip is applied to Cr, and if it is 0, the transform skip is not applied to Cr.

Therefore, even when the LFNST index value is greater than 0 (that is, when LFNST is applied), each transform_skip_flag[x0][y0][cIdx] value for the luma component (Y component) and the chroma component (Cb component and Cr component) may be different. According to Table 7, since the LFNST index value may be greater than 0 only when the transform_skip_flag[x0][y0][0] value is 0, when the LFNST index value is greater than 0, transform_skip_flag[x0][y0][0] is always zero.

Accordingly, the cases in which the LFNST may be applied according to the transform_skip_flag[x0][y0][cIdx]

value are summarized as follows. Here, the LFNST index is greater than 0 and the transform_skip_flag[x0][y0][0] value is 0. It may be assumed that other conditions for applying the LFNST are satisfied, for example, both the width and height of the corresponding block may be greater than or equal to 4.

1. Single tree

Apply LFNST to luma component

If a transform_skip_flag[x0][y0][1] value is 0, the LFNST is applied to the Cb component, and if it is 1, the LFNST is not applied to the Cb component.

If a transform_skip_flag[x0][y0][2] value is 0, the LFNST is applied to the Cr component, and if it is 1, the LFNST is not applied to the Cr component.

2. Duel tree for luma

Apply LFNST to luma component

3. Duel tree for chroma

If the transform_skip_flag[x0][y0][1] value is 0, the LFNST is applied to the Cb component, and if it is 1, the LFNST is not applied to the Cb component.

If the transform_skip_flag[x0][y0][2] value is 0, the LFNST is applied to the Cr component, and if it is 1, the LFNST is not applied to the Cr component.

As described above, to selectively apply the LFNST according to the transform_skip_flag[x0][y0][cIdx] value, the following conditions should be added to the specification text for the LFNST.

TABLE 11

| 8.7.4 Transformation process for scaled transform coefficients<br>8.7.4.1 General |
| --- |

Inputs to this process are:
- a luma location ( xTbY, yTbY ) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)x(nTbH) array d[ x ][ y ] of scaled transform coefficients with x = 0..nTbW − 1, y = 0..nTbH − 1.

Output of this process is the (nTbW)x(nTbH) array res[ x ][ y ] of residual samples with x = 0..nTbW − 1, y = 0..nTbH − 1.

When lfnst_idx is not equal to 0 and transform_skip_flag[ xTbY ][ yTbY ][ cIdx ] is equal to 0 and both nTbW and nTbH are greater than or equal to 4, the following applies:
- The variables predModeIntra, nLfnstOutSize, log2LfnstSize, nLfnstSize, and nonZeroSize are derived as follows:

predModeIntra =
   ( cIdx = = 0 ) ? IntraPredModeY[ xTbY ][ yTbY ] : IntraPredModeC[ xTbY ][ yTbY ] ( 8-954)
   nLfnstOutSize = ( nTbW >= 8 && nTbH >= 8 ) ? 48 : 16    (8-955)
   log2LfnstSize = ( nTbW >= 8 && nTbH >= 8 ) ? 3 : 2    (8-956)
   nLfnstSize =
   1 << log2LfnstSize    (8-957)
   nonZeroSize = ( ( nTbW = = 4 && nTbH = = 4 ) | |
   ( nTbW = = 8 && nTbH = = 8 ) ) ? 8 : 16    (8-958)

- When intra_mip_flag[ xTbY ][ yTbY ] is equal to 1 and cIdx is equal to 0, predModeIntra is set equal to INTRA_PLANAR.
- When predModeIntra is equal to either INTRA_LT_CCLM, INTRA_L_CCLM, or INTRA_T_CCLM, predModeIntra is derived as follows:
   - If intra_mip_flag[ xTbY + nTbW * SubWidthC / 2 ][ yTbY + nTbH * SubHeightC / 2 ] is equal to 1, predModeIntra is set equal to INTRA_PLANAR.
   - Otherwise,
      CuPredMode[ 0 ][ xTbY + nTbW * SubWidthC / 2 ][ yTbY + nTbH * SubHeightC / 2 ] is equal to MODE_IBC or MODE_PLT, predModeIntra is set equal to INTRA_DC.
   - Otherwise, predModeIntra is set equal to
      IntraPredModeY[ xTbY + nTbW * SubWidthC / 2 ][ yTbY + nTbH * SubHeightC / 2 ].
- The wide angle intra prediction mode mapping process as specified in clause 8.4.5.2.6 is invoked with predModeIntra, nTbW, nTbH and cIdx as inputs, and the modified predModeIntra as output.
- The values of the list u[ x ] with x = 0..nonZeroSize − 1 are derived as follows:
   xC =
   DiagScanOrder[ 2 ][ 2 ][ x ][ 0 ]    (8-959)
   yC =
   DiagScanOrder[ 2 ][ 2 ][ x ][ 1 ]    (8-960)
   u[ x ] = d[ xC ][ yC ]    (8-961)
- The one-dimensional low frequency non-separable transformation process as specified in clause 8.7.4.2 is invoked with the input length of the scaled transform coefficients nonZeroSize, the transform output length nTrS set equal to nLfnstOutSize, the list of scaled non-zero transform coefficients u[ x ] with x = 0..nonZeroSize − 1, and the intra prediction mode for LFNST set selection predModeIntra as inputs, and the list v[ x ] with x = 0..nLfnstOutSize − 1 as output.
- The array d[ x ][ y ] with x = 0..nLfnstSize − 1, y = 0..nLfnstSize − 1 is derived as follows:
   - If predModeIntra is less than or equal to 34, the following applies:
      d[ x ][ y ] = ( y < 4 ) ? v[ x + ( y << log2LfnstSize ) ] :    (8-962)
      ( ( x < 4 ) ? v[ 32 + x + ( ( y − 4 ) << 2 ) ] : d[ x ][ y ] )
   - Otherwise, the following applies:
      d[ x ][ y ] = ( x < 4 ) ? v[ y + ( x << log2LfnstSize ) ] :    (8-963)
      ( ( y < 4 ) ? v[ 32 + y + ( ( x − 4 ) << 2 ) ] : d[ x ][ y ] )

......

As shown in Table 11, when the LFNST index (lfnst_idx) value is not 0 (that is, when LFNST is applied), by checking the transform_skip_flag[xTbY][yTbY][cIdx] value for the component specified by cIdx (When lfnst_idx is not equal to 0 and transform_skip_flag[xTbY][yTbY][cIdx] is equal to 0 and both nTbW and nTbH are greater than or equal to 4, the following applies), it may be configured such that the subsequent coding process is performed only when the transform_skip_flag[xTbY][yTbY][cIdx] value is 0, that is, LFNST is applied.

Meanwhile, the LFNST index may be signaled according to whether the transform is skipped for each color component.

As an example, when compared with Table 7, in Table 12, the condition for transmitting the LFNST index can be removed only when the transform_skip_flag[x0][y0][0] value is 0

TABLE 12

| | Descriptor |
|---|---|
| coding_unit( x0, y0, cbWidth, cbHeight, cqtDepth, treeType, modeType ) { | |
| ...... | |
|    LfnstDcOnly = 1 | |
|    LfnstZeroOutSigCoeffFlag = 1 | |
|    MtsZeroOutSigCoeffFlag = 1 | |
|    transform_tree( x0, y0, cbWidth, cbHeight, treeType, chType ) | |
|    lfnstWidth = ( treeType = = DUAL_TREE_CHROMA ) ? cbWidth / SubWidthC | |
|        : ( ( IntraSubPartitionsSplitType = = ISP_VER_SPLIT ) ? cbWidth / | |
|          NumIntraSubPartitions : cbWidth ) | |
|    lfnstHeight = ( treeType = = DUAL_TREE_CHROMA ) ? cbHeight / SubHeightC | |
|        : ( ( IntraSubPartitionsSplitType = = ISP_HOR_SPLIT) ? cbHeight / | |
|          NumIntraSubPartitions : cbHeight ) | |
|    if( Min( lfnstWidth, lfnstHeight ) >= 4 && sps_lfnst_enabled_flag = = 1 && | |
|       CuPredMode[ chType ][ x0 ][ y0 ] = = MODE_INTRA && | |
|       ( treeType = = DUAL_TREE_CHROMA \| \| !intra_mip_flag[ x0 ][ y0 ] \| \| | |
|         Min( lfnstWidth, lfnstHeight ) >= 16 ) && | |
|       Max( cbWidth, cbHeight ) <= MaxTbSizeY) { | |
|       if( ( IntraSubPartitionsSplitType != ISP_NO_SPLIT \| \| LfnstDcOnly = = 0 ) && | |
|         LfnstZeroOutSigCoeffFlag = = 1 ) | |
|         lfnst_idx | ae(v) |
|    } | |
|    if( treeType != DUAL_TREE_CHROMA && lfnst_idx = = 0 && | |
|       transform_skip_flag[ x0 ][ y0 ][ 0 ] = = 0 && Max( cbWidth, cbHeight ) <= 32 && | |
|       IntraSubPartitionsSplit[ x0 ][y0 ] = = ISP_NO_SPLIT && cu_sbt_flag = = 0 && | |
|       MtsZeroOutSigCoeffFlag = = 1 && tu_cbf_luma[ x0 ][ y0 ] ) { | |
|       if( ( ( CuPredMode[ chType ][ x0 ][ y0 ] = = MODE_INTER && | |
|       sps_explicit_mts_inter_enabled_flag ) \| \| | |
|       ( CuPredMode[ chType ][ x0 ][ y0 ] = = MODE_INTRA && | |
|       sps_explicit_mts_intra_enabled_flag ) ) ) | |
|       mts_idx | ae(v) |
|    } | |
|  } | |

However, since the method of setting the LfnstDcOnly variable value described in Table 12 is the same as in Table 9, the setting of the LfnstDcOnly variable value changes according to the transform_skip_flag[x0][y0][cIdx] value, and finally whether the LFNST index is signaled will also change.

When the ISP mode is not applied, how the LFNST index is signaled by the transform_skip_flag[x0][y0][cIdx] value is summarized as follows. It may be assumed that other conditions for signaling the LFNST index are already satisfied, for example, a condition such as Max(cbWidth, cbHeight)<=MaxTbSizeY is satisfied.

1. In case of single tree

When the transform_skip_flag[x0][y0][0] value is 0, the LfnstDcOnly variable value may be set to 0 according to the method shown in Table 9.

When the transform_skip_flag[x0][y0][1] value is 0, the LfnstDcOnly variable value may be set to 0 according to the method shown in Table 9.

When the transform_skip_flag[x0][y0][2] value is 0, the LfnstDcOnly variable value may be set to 0 according to the method shown in Table 9.

When the LfnstDcOnly value is 0, the LFNST index may be signaled. If the LFNST index is not signaled, it may be inferred to be 0.

2. In case of dual tree for luma component

When the transform_skip_flag[x0][y0][0] value is 0, the LfnstDcOnly variable value may be set to 0 according to the method shown in Table 9.

When the LfnstDcOnly value is 0, the LFNST index may be signaled. If the LFNST index is not signaled, it may be inferred to be 0.

3. In case of dual tree for chroma component

When the transform_skip_flag[x0][y0][ ] value is 0, the LfnstDcOnly variable value may be set to 0 according to the method shown in Table 9.

When the transform_skip_flag[x0][y0][2] value is 0, the LfnstDcOnly variable value may be set to 0 according to the method shown in Table 9.

When the LfnstDcOnly value is 0, the LFNST index may be signaled. If the LFNST index is not signaled, it may be inferred to be 0.

As shown in Table 12, the LfnstDcOnly value is initialized to 1, and in the case of the dual tree, the LFNST index corresponding to the dual tree for luma and the LFNST index corresponding to the dual tree for chroma may be separately signaled. This means that different LFNST kernels may be applied to luma and chroma.

In addition, the dual tree shown in Tables 7 to 12 may include DUAL_TREE_LUMA (corresponding to a luma component) and DUAL_TREE_CHROMA (corresponding to a chroma component) appearing on the current VVC specification document, which may include a case in which a syntax parsing tree for luma and a syntax parsing tree for chroma are differentiated due to a size condition of a coding unit or the like. For example, the case of a separate tree may be included.

When the ISP mode is applied, transform_skip_flag[x0][y0][0] is not signaled and is inferred to be 0 as shown in Table 10. That is, as shown in Table 10, transform_skip_flag[x0][y0][0] is signaled only when the condition IntraSubPartitionsSplit[x0][y0] ISP_NO_SPLIT, which is the case where the ISP mode is not applied, is satisfied.

In addition, as shown in Table 10, transform_skip_flag[x0][y0][1] and transform_skip_flag[x0][y0][2] may be signaled regardless of whether the ISP mode is applied.

Therefore, the LFNST signaling for the case where the ISP mode is applied may be summarized as follows. It may be assumed that other conditions for signaling the LFNST index are already satisfied, for example, a condition such as Max(cbWidth, cbHeight)<=MaxTbSizeY may be satisfied.

1. In case of single tree
   LFNST index may be signaled. If the LFNST index is not signaled, it may be inferred to be 0.
2. In case of dual tree for luma component
   LFNST index may be signaled. If the LFNST index is not signaled, it may be inferred to be 0.
3. In case of dual tree for chroma component When the transform_skip_flag[x0][y0][1] value is 0, the LfnstDcOnly variable value may be set to 0 according to the method shown in Table 9.

When the transform_skip_flag[x0][y0][2] value is 0, the LfnstDcOnly variable value may be set to 0 according to the method shown in Table 9.

When the LfnstDcOnly value is 0, the LFNST index may be signaled. If the LFNST index is not signaled, it may be inferred to be 0.

When the ISP mode is applied, the LfnstDcOnly condition is not checked as shown in Table 12. Therefore, in the case of the first single tree and the dual tree for the second luma component, the LFNST index may be signaled without checking the LfnstDcOnly condition. In the case of the dual tree for chroma, the LFNST index may be signaled according to the same conditions as in the case where the ISP mode is not applied as in case 3 above. That is, the LFNST index is signaled according to the LfnstDcOnly condition.

According to an example, since transform_skip_flag[x0][y0][cIdx] values may be assigned to the luma component and the two chroma components, respectively, when the LFNST index value is greater than 0, that is, even when the LFNST is applied, only when the transform_skip_flag[x0][y0][cIdx] value is 0, the LFNST may be applied to the component indicated by cIdx. The contents of the specification text changed correspondingly are the same as in Table 11.

According to an example, if the condition for checking whether the transform_skip_flag[x0][y0][0] value is 0 only for the dual tree case compared to Table 7 is removed, the LFNST index signaling may be configured as shown in Table 13. The LfnstDcOnly variable shown in Table 13 may be set to 0 according to conditions as shown in Table 9.

TABLE 13

| | Descriptor |
|---|---|
| coding_unit( x0, y0, cbWidth, cbHeight, cqtDepth, treeType, modeType ) { | |
| ...... | |
| LfnstDcOnly = 1 | |
| LfnstZeroOutSigCoeffFlag = 1 | |
| MtsZeroOutSigCoeffFlag = 1 | |
| transform_tree( x0, y0, cbWidth, cbHeight, treeType, chType ) | |
| lfnstWidth = ( treeType = = DUAL_TREE_CHROMA ) ? cbWidth / SubWidthC | |
|     : ( ( IntraSubPartitionsSplitType = = ISP_VER_SPLIT ) ? cbWidth / | |
|       NumIntraSubPartitions : cbWidth ) | |
| lfnstHeight = ( treeType = = DUAL_TREE_CHROMA ) ? cbHeight / SubHeightC | |
|     : ( ( IntraSubPartitionsSplitType = = ISP_HOR_SPLIT) ? cbHeight / | |
|       NumIntraSubPartitions : cbHeight ) | |
| if( Min( lfnstWidth, lfnstHeight ) >= 4 && sps_lfnst_enabled_flag = = 1 && | |
|   CuPredMode[ chType ][ x0 ][ y0 ] = = MODE_INTRA && | |
|   ( treeType != SINGLE_TREE | | transform_skip_flag[ x0 ][ y0 ][ 0 ] = = 0 ) | |
| && | |
|   ( treeType = = DUAL_TREE_CHROMA | | !intra_mip_flag[ x0 ][ y0 ] | | | |
|     Min( lfnstWidth, lfnstHeight ) >= 16 ) && | |
|   Max( cbWidth, cbHeight ) <= MaxTbSizeY ) { | |
|   if( ( IntraSubPartitionsSplitType != ISP_NO_SPLIT | | LfnstDcOnly = = 0 ) | |
| && | |
|     LfnstZeroOutSigCoeffFlag = = 1 ) | |
|     lfnst_idx | ae(v) |
|   } | |
|   if( treeType != DUAL_TREE_CHROMA && lfnst_idx = = 0 && | |
|     transform_skip_flag[ x0 ][ y0 ][ 0 ] = = 0 && Max( cbWidth, cbHeight ) <= | |
| 32 && | |
|     IntraSubPartitionsSplit[ x0 ][ y0 ] = = ISP_NO_SPLIT && cu_sbt_flag = = 0 | |
| && | |
|     MtsZeroOutSigCoeffFlag = = 1 && tu_cbf_luma[ x0 ][ y0 ] ) { | |
|     if( ( ( CuPredMode[ chType ][ x0 ][ y0 ] = = MODE_INTER && | |
|     sps_explicit_mts_inter_enabled_flag ) | | | |
|     ( CuPredMode[ chType ][ x0 ][ y0 ] = = MODE_INTRA && | |
|     sps_explicit_mts_intra_enabled_flag ) ) ) | |

TABLE 13-continued

| | Descriptor |
|---|---|
| mts_idx | ae(v) |
| } | |
| } | |

When configured as shown in Table 13, in the case of the single tree, the LFNST index signaling method shown in Tables 7 to 9 may be applied, and in the case of the dual tree, the method shown in Table 12 may be applied. In addition, since the transform_skip_fag[x0][y0][cIdx] values are assigned to the luma component and the two chroma components, respectively, as shown in Tables 7 to 9, even if the LFNST index value is greater than 0 (i.e. when LFNST is applied), it may be configured to apply LFNST to the component indicated by cIdx only when the transform_skip_flag[x0][y0][cIdx] value is 0. The contents of the specification text changed correspondingly are the same as in Table 11.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 15 is a flowchart illustrating an operation of a video decoding apparatus according to an embodiment of the present disclosure.

Each step disclosed in FIG. 15 is based on some of the contents described above in FIGS. 5 to 4. Accordingly, detailed descriptions overlapping with those described above in FIGS. 3 and 5 to 14 will be omitted or simplified.

The decoding apparatus 300 according to an embodiment may receive information on an intra prediction mode, residual information, and an LFNST index from a bitstream (S1510).

More specifically, the decoding apparatus 300 may decode information on the quantized transform coefficients for the current block from the bitstream, and derive quantized transform coefficients for the target block based on information on the quantized transform coefficients for the current block. The information on the quantized transform coefficients for the target block may be included in a sequence parameter set (SPS) or a slice header, and may include at least one of information on the simplification factor, information on the minimum transform size to apply a simplified transform, information on the maximum transform size to apply a simplified transform, and information on a transform index indicating any one of a simplified inverse transform size and a transform kernel matrix included in a transform set In addition, the decoding apparatus may further receive information on an intra prediction mode for the current block and information on whether the ISP is applied to the current block. The decoding apparatus may derive whether the current block is divided into a predetermined number of sub-partition transform blocks by receiving and parsing flag information indicating whether to apply ISP coding or ISP mode. Here, the current block may be a coding block. Also, the decoding apparatus may derive the size and number of divided sub-partition blocks through flag information indicating in which direction the current block is to be divided.

The decoding apparatus 300 may derive transform coefficients by performing inverse quantization on residual information on the current block, that is, quantized transform coefficients (S1520).

The derived transform coefficients may be arranged according to the reverse diagonal scan order in units of 4×4 blocks, and transform coefficients within the 4×4 block may also be arranged according to the reverse diagonal scan order. That is, the transform coefficients on which the inverse quantization has been performed may be arranged according to a reverse scan order applied in the video codec such as in VVC or HEVC.

The decoding apparatus may derive modified transform coefficients by applying the LFNST to the transform coefficients The LFNST is a non-separated transform that applies the transform without separating the coefficients in a specific direction, unlike the first transform that separates and transforms the transform target coefficients in a vertical or horizontal direction. This non-separated transform may be a low-frequency non-separated transform that applies the forward transform only to a low-frequency region rather than the entire block region.

The LFNST index information may be received as syntax information, and the syntax information may be received as a binarized bin string including 0's and 1's.

The syntax element of the LFNST index according to the present embodiment may indicate whether an inverse LFNST or an inverse non-separated transform is applied and any one of a transform kernel matrix included in the transform set, and when the transform set includes two transform kernel matrices, there may be three values of the syntax element of the transform index.

That is, according to an embodiment, the syntax element value for the LFNST index may include 0 indicating a case in which the inverse LFNST is not applied to the target block, 1 indicating the first transformation kernel matrix among the transformation kernel matrices, and 2 indicating the second transform kernel matrix among the transform kernel matrices.

The intra prediction mode information and LFNST index information may be signaled at a coding unit level.

The decoding apparatus may derive a variable indicating whether a significant coefficient exists in the DC component of the current block to determine whether to parse the LFNST index for the current block, and variables may be derived based on individual transform skip flag values for color components of the current block (S1530).

A variable indicating whether a significant coefficient exists in the DC component of the current block may be expressed as a variable LfnstDcOnly, and for at least one transform block in one coding unit, becomes 0 when the non-zero coefficients exist at a non-DC component and becomes 1 when the non-zero coefficients do not exist in positions other than DC components for all transform blocks in one coding unit. In the present disclosure, the DC component refers to (0, 0) or the upper left position as the position reference for the 2D component.

Several transform blocks may exist within one coding unit. For example, in the case of the chroma component, transform blocks for Cb and Cr may exist, and in the case of the single tree type, the transform blocks for luma, Cb, and Cr may exist. According to an example, when a non-zero coefficient other than the DC component position is found even in one transform block among transform blocks constituting the current coding block, the value of variable LnfstDcOnly may be set to 0.

Meanwhile, since the residual coding is not performed on the corresponding transform block if non-zero coefficients do not exist in the transform block, the variable LfnstD-cOnly value is not changed by the corresponding transform block. Therefore, if the non-zero coefficient does not exist in the non-DC component of the transform block, the variable LfnstDcOnly value is not changed and the previous value is maintained. For example, when the coding unit is coded as the single tree type and the variable LfnstDcOnly value is changed to 0 due to the luma transform block, when the non-zero coefficients exist only in the DC component in the Cb transform block or the non-zero coefficients do not exist in the Cb transform block, the variable LfnstDcOnly value is maintained as 0. The variable LfnstDcOnly value is initially initialized to 1, and if no component in the current coding unit updates the variable LfnstDcOnly value to 0, it maintains the value 1 as it is, and when one of the transform blocks constituting the coding unit sets the variable LfnstD-cOnly value to 0, it is finally maintained as 0.

Meanwhile, this variable LfnstDcOnly may be derived based on individual transform skip flag values for color components of the current block. The transform skip flag for the current block may be signaled for each color component, and if the tree type of the current block is a single tree, the transform skip flag value for the luma component, the variable LfnstDcOnly may be derived based on the transform skip flag value for the luma component, the transform skip flag value for the chroma Cb component, and transform skip flag value for the chroma Cr component. Alternatively, if the tree type of the current block is the dual tree luma, the variable LfnstDcOnly is derived based on the transform skip flag value for the luma component, and if the tree type of the current block is the dual tree chroma, the variable LfnstDcOnly may be derived based on the transform skip flag value for the chroma Cb component and the transform skip flag value for the chroma Cr component.

According to an example, based on the transform skip flag value for the color component being 0, the variable LfnstD-cOnly may indicate that a significant coefficient exists at a position other than the DC component. That is, if the tree type of the current block is a single tree, the transform skip flag value for the luma component, the variable LfnstD-cOnly may be derived as 0 based on the fact that at least one value of the transform skip flag for the luma component, the transform skip flag value for the chroma Cb component, and the transform skip flag value for the chroma Cr component are 0. Alternatively, if the tree type of the current block is the dual tree luma, the variable LfnstDcOnly is derived based on the transform skip flag value for the luma component, and if the tree type of the current block is the dual tree chroma, the variable LfnstDcOnly may be derived based on the transform skip flag value for the chroma Cb component and the transform skip flag value for the chroma Cr component.

As described above, the variable LfnstDcOnly may be initially set to 1 at the coding unit level of the current block, and if the transform skip flag value is 0, the variable LfnstDcOnly may be changed to 0 at the residual coding level.

The decoding apparatus may parse the LFNST index based on the variable LfnstDcOnly indicating that a significant coefficient exists at a position that is not a DC component, that is, based on the variable LfnstDcOnly being 0 (S1540).

Meanwhile, in the case of the luma block to which the intra sub-partition (ISP) mode may be applied, the LFNST index may be parsed without deriving the variable LfnstD-cOnly.

Specifically, when the ISP mode is applied and the transform skip flag for the luma component, that is, the transform_skip_flag[x0][y0][0] value is 0, the tree type of the current block is a single tree or a dual tree for luma, the LFNST index may be signaled regardless of the variable LfnstDcOnly value.

On the other hand, in the case of the chroma component to which the ISP mode is not applied, the variable LfnstD-cOnly value may be set to 0 according to the transform_skip_ flag[x0][y0][1] which is the transform skip flag for the chroma Cb component and transform_skip_flag[x0][y0][2] which is the transform skip flag for the chroma Cr component. That is, in the transform_skip_flag[x0][y0][cIdx], when the cIdx value is 1, only when transform_skip_flag[x0][y0][ ] value is 0, the variable LfnstDcOnly value may be set to 0, and when the cIdx value is 2, the transform_skip_ flag[x0][y0][2] value may be set to 0 only when the transform_skip_flag[x0][y0][2] value is 0. If the variable LfnstDcOnly value is 0, the decoding apparatus may parse the LFNST index, otherwise the LFNST index may not be signaled and may be inferred as a value of 0.

Thereafter, the decoding apparatus may derive the modified transform coefficients from the transform coefficients based on the LFNST index and the LFNST matrix for LFNST (S1550).

The decoding apparatus may set a plurality of variables for the LFNST based on whether the LFNST index is not 0, that is, the LFNST index is greater than 0, and the respective transform skip flag values for the color component are 0.

For example, in the step of applying the LFNST after parsing the LFNST index, the decoding apparatus may determine once again whether the individual transform skip flag value for the color component is 0, and may set various variables for applying the LFNST. For example, the intra prediction mode for selecting the LFNST set, the number of transform coefficients output after applying the LFNST, the size of a block to which the LFNST is applied, and the like may be set.

In the case of a block coded with BDPCM, the transform skip flag may be automatically set to 1, and in this case, even if the LFNST index is not 0, the transform skip flag may be 1, so when the LFNST is actually applied, the transform skip flag values for each color component may be checked again.

Alternatively, according to an example, when the flag value indicating whether the coded significant coefficient exists in the transform block is 0, there may be the situation in which the transform skip flag value is not checked. In this case as well, since it is not guaranteed that the transform skip flag value is 0 just because the LFNST index is not 0, when the LFNST is actually applied, the transform skip flag values for each color component may be checked again.

That is, the decoding apparatus may check the transform skip flag values for each color component in the LFNST index parsing step, and may check the transform skip flag values for each color component again when the LFNST is actually applied.

The decoding apparatus may determine the LFNST set including the LFNST matrix based on the intra prediction mode derived from the intra prediction mode information, and select any one of a plurality of LFNST matrices based on the LFNST set and the LFNST index.

In this case, the same LFNST set and the same LFNST index may be applied to the sub-partition transformation block divided in the current block. That is, since the same intra prediction mode is applied to the sub-partition transform blocks, the LFNST set determined based on the intra prediction mode may also be equally applied to all sub-partition transform blocks. In addition, since the LFNST index is signaled at the coding unit level, the same LFNST matrix may be applied to the sub-partition transform block divided in the current block.

Meanwhile, as described above, the transform set may be determined according to the intra prediction mode of the transform block to be transformed, and the inverse LFNST may be performed based on the transform kernel matrix included in the transform set indicated by the LFNST index, that is, any of the LFNST matrices. A matrix applied to the inverse LFNST may be named as an inverse LFNST matrix or an LFNST matrix, and the name of this matrix is irrelevant as long as it has a transforce relationship with the matrix used for the forward LFNST.

In one example, the inverse LFNST matrix may be a non-square matrix in which the number of columns is less than the number of rows.

The decoding apparatus may derive the residual samples for the current block based on the primary inverse transform of the modified transform coefficient (S1560).

In this case, as the inverse primary transform, the conventional separation transform may be used, and the above-described MTS may be used Subsequently, the decoding apparatus 300 may generate reconstructed samples based on residual samples for the current block and prediction samples for the current block.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 16 is a flowchart illustrating an operation of a video encoding apparatus according to an embodiment of the present disclosure.

Each step disclosed in FIG. 16 is based on some of the contents described above in FIGS. 5 to 14. Accordingly, detailed descriptions overlapping with those described above in FIGS. 2 and 5 to 14 will be omitted or simplified.

The encoding apparatus 200 according to an embodiment may derive the prediction sample for the current block based on the intra prediction mode applied to the current block.

The encoding apparatus may perform prediction for each sub-partition transformation block when ISP is applied to the current block.

The encoding apparatus can determine whether to apply the ISP coding or the ISP mode to the current block, that is, the coding block, and determine in which direction the current block is to be divided according to the determination result, and derive the size and number of divided sub-blocks.

The same intra prediction mode is applied to the sub-partition transform block divided from the current block, and the encoding apparatus may derive a prediction sample for each sub-partition transform block. That is, the encoding apparatus sequentially performs intra prediction, for example, horizontally or vertically, from left to right, or from top to bottom according to the division form of the sub-partition transform blocks. For the leftmost or uppermost sub-block, the reconstructed pixel of the coding block already coded is referred to as in a conventional intra prediction method. In addition, for each side of the subsequent internal sub-partition transformation block, when it is not adjacent to the previous sub-partition transformation block, in order to derive reference pixels adjacent to the corresponding side, an adjacent coding block already coded like the conventional intra prediction method refers to the reconstructed pixel.

The encoding apparatus 200 may derive residual samples for the current block based on the prediction samples (S1610).

The encoding apparatus 200 may derive a transform coefficient for the current block by applying at least one of LFNST and MTS to the residual samples, and may arrange the transform coefficients according to a predetermined scanning order.

The encoding apparatus may derive the transform coefficient for the current block based on the primary transform for the residual sample (S1620).

The primary transform may be performed through a plurality of transform kernels like MTS, and in this case, the transform kernel may be selected based on the intra prediction mode.

The encoding apparatus 200 may determine whether to perform a quadratic transform or a non-separate transform, specifically LFNST, on the transform coefficients for the current block, and apply the LFNST to the transform coefficients to derive the modified transform coefficients.

The LFNST is a non-separated transform that applies the transform without separating the coefficients in a specific direction, unlike the first transform that separates and transforms the transform target coefficients in a vertical or horizontal direction. The non-separated transform may be a low-frequency non-separated transform that applies the transform only to a low-frequency region rather than the entire target block to be transformed.

The encoding apparatus may apply a plurality of LFNST matrices to the transform coefficients to derive a variable indicating whether a significant coefficient exists in the DC component of the current block, and the variables may be derived based on individual transform skip flag values for the color component of the current block (S1630).

The encoding apparatus may derive variables after applying LFNST to each LFNST matrix candidate, or in a state in which LFNST is not applied when the LFNST is not applied.

Specifically, the encoding apparatus may apply a plurality of LFNST candidates, that is, the LFNST matrix to exclude the corresponding LFNST matrix in which the significant coefficients of all transform blocks exist only in the DC position (of course, when the CBF is 0, the corresponding variable is excluded from the process), and compare RD values only between the LFNST matrices in which the variable LfnstDcOnly value is 0. For example, when the LFNST is not applied, it is included in the comparison process because it is irrelevant to the variable LfnstDcOnly value (in this case, since LFNST is not applied, the variable LfnstDcOnly value may be determined based on the transform coefficient obtained as a result of the primary transform) and the LFNST matrices with the corresponding LfnstDcOnly value of 0 are also included in the comparison process of the RD values.

A variable indicating whether a significant coefficient exists in the DC component of the current block may be expressed as a variable LfnstDcOnly, and for at least one transform block in one coding unit, becomes 0 when the non-zero coefficients exist at a non-DC component and becomes 1 when the non-zero coefficients do not exist in positions other than DC components for all transform blocks in one coding unit.

Several transform blocks may exist within one coding unit. For example, in the case of the chroma component, transform blocks for Cb and Cr may exist, and in the case of the single tree type, the transform blocks for luma, Cb, and Cr may exist. According to an example, when a non-zero coefficient other than the DC component position is found even in one transform block among transform blocks constituting the current coding block, the variable LnfstDcOnly value may be set to 0.

Meanwhile, since the residual coding is not performed on the corresponding transform block if non-zero coefficients do not exist in the transform block, the variable LfnstDcOnly value is not changed by the corresponding transform block. Therefore, if the non-zero coefficient does not exist in the non-DC component of the transform block, the variable LfnstDcOnly value is not changed and the previous value is maintained. For example, when the coding unit is coded as the single tree type and the variable LfnstDcOnly value is changed to 0 due to the luma transform block, when the non-zero coefficients exist only in the DC component in the Cb transform block or the non-zero coefficients do not exist in the Cb transform block, the variable LfnstDcOnly value is maintained as 0. The variable LfnstDcOnly value is initially initialized to 1, and if no component in the current coding unit updates the variable LfnstDcOnly value to 0, it maintains the value 1 as it is, and when one of the transform blocks constituting the coding unit sets the variable LfnstDcOnly value to 0, it is finally maintained as 0.

Meanwhile, this variable LfnstDcOnly may be derived based on individual transform skip flag values for color components of the current block. The transform skip flag for the current block may be signaled for each color component, and if the tree type of the current block is a single tree, the transform skip flag value for the luma component, the variable LfnstDcOnly may be derived based on the transform skip flag value for the luma component, the transform skip flag value for the chroma Cb component, and the transform skip flag value for the chroma Cr component. Alternatively, if the tree type of the current block is the dual tree luma, the variable LfnstDcOnly is derived based on the transform skip flag value for the luma component, and if the tree type of the current block is the dual tree chroma, the variable LfnstDcOnly may be derived based on the transform skip flag value for the chroma Cb component and the transform skip flag value for the chroma Cr component.

According to an example, based on the transform skip flag value for the color component being 0, the variable LfnstDcOnly may indicate that a significant coefficient exists at a position other than the DC component. That is, if the tree type of the current block is a single tree, the transform skip flag value for the luma component, the variable LfnstDcOnly may be derived as 0 based on the fact that at least one of the transform skip flag value for the luma component, the transform skip flag value for the chroma Cb component, and the transform skip flag value for the chroma Cr component are 0. Alternatively, if the tree type of the current block is the dual tree luma, the variable LfnstDcOnly is derived based on the transform skip flag value for the luma component, and if the tree type of the current block is the dual tree chroma, the variable LfnstDcOnly may be derived based on the transform skip flag value for the chroma Cb component and the transform skip flag value for the chroma Cr component.

As described above, the variable LfnstDcOnly may be initially set to 1 at the coding unit level of the current block, and if the transform skip flag value is 0, the variable LfnstDcOnly may be changed to 0 at the residual coding level.

The encoding apparatus may select the most optimal LFNST matrix based on a variable indicating that a significant coefficient exists at a position other than a DC component, and may derive a modified transform coefficient based on the selected LFNST matrix (S1640).

The encoding apparatus may set a plurality of variables for the LFNST based on whether the respective transform skip flag values for the color components is 0 in the step of deriving the modified transform coefficients.

For example, after determining whether to apply the LFNST, the encoding apparatus may determine once again whether the respective transform skip flag values for the color components are 0 in the step of applying the LFNST, and may set various variables for applying the LFNST. For example, the intra prediction mode for selecting the LFNST set, the number of transform coefficients output after applying the LFNST, the size of a block to which the LFNST is applied, and the like may be set.

In the case of the block coded by the BDPCM, since the transform skip flag may be automatically set to 1, when the LFNST is actually applied, the transform skip flag values for each color component may be checked again.

Alternatively, according to an example, when the flag value indicating whether the coded significant coefficient exists in the transform block is 0, there may be the situation in which the transform skip flag value is not checked. In this case as well, since it is not guaranteed that the transform skip flag value is 0 just because the LFNST index is not 0, when the LFNST is actually applied, the transform skip flag values for each color component may be checked again.

That is, the encoding apparatus may check the transform skip flag values for each color component in the step of determining whether to apply the LFNST, and may check the transform skip flag values for each color component again when the LFNST is actually applied.

Meanwhile, in the case of the luma block to which the intra sub-partition (ISP) mode may be applied, the LFNST may be applied without deriving the variable LfnstDcOnly.

Specifically, when the ISP mode is applied and the transform skip flag for the luma component, that is, the transform_skip_flag[x0][y0][0] value is 0, the tree type of the current block is a single tree or a dual tree for luma, the LFNST may be applied regardless of the variable LfnstDcOnly value.

On the other hand, in the case of the chroma component to which the ISP mode is not applied, the variable LfnstDcOnly value may be set to 0 according to the transform_skip_ flag[x0][y0][1] which is the transform skip flag for the chroma Cb component and transform_skip_flag[x0][y0][2] which is the transform skip flag for the chroma Cr component. That is, in the transform_skip_flag[x0][y0][cIdx], when the cIdx value is 1, only when transform_skip_flag[x0][y0][1] value is 0, the variable LfnstDcOnly value may be set to 0, and when the cIdx value is 2, the transform_skip_ flag[x0][y0][2] value may be set to 0 only when the transform_skip_flag[x0][y0][2] value is 0. If the variable LfnstDcOnly value is 0, the encoding apparatus may apply the LFNST, otherwise the LFNST is not applied.

The encoding apparatus 200 may determine the LFNST set based on a mapping relationship according to the intra prediction mode applied to the current block, and perform the LFNST, that is, the non-separated transform based on one of two LFNST matrices included in the LFNST set.

In this case, the same LFNST set and the same LFNST index may be applied to the sub-partition transformation block divided in the current block. That is, since the same intra prediction mode is applied to the sub-partition transform blocks, the LFNST set determined based on the intra prediction mode may also be equally applied to all sub-partition transform blocks. In addition, since the LFNST index is encoded in units of the coding unit, the same LFNST matrix may be applied to the sub-partition transform block divided in the current block.

As described above, the transform set may be determined according to an intra prediction mode of a transform block to be transformed. The matrix applied to the LFNST has a transforce relationship with a matrix used for reverse LFNST.

In one example, the LFNST matrix may be a non-square matrix in which the number of rows is less than the number of columns.

The encoding apparatus may construct the image information so that the LFNST index instructing the LFNST matrix applied to the LFNST is parsed based on the fact that the variable LfnstDcOnly is initially set to 1 in the coding unit level of the current block, and when the transform skip flag value is 0, the variable LfnstDcOnly is changed to 0 in the residual coding level, and the variable LfnstDcOnly is 0 (S1650).

The encoding apparatus may perform quantization based on the modified transform coefficients for the current block to derive quantized transform coefficients, and encode an LFNST index.

That is, the encoding apparatus may generate residual information including information on quantized transform coefficients. The residual information may include the above-described transform related information/syntax element. The encoding apparatus may encode image/video information including residual information and output the encoded image/video information in the form of a bitstream.

More specifically, the encoding apparatus 200 may generate information about the quantized transform coefficients and encode the information about the generated quantized transform coefficients.

The syntax element of the LFNST index according to the present embodiment may indicate whether (inverse) LFNST is applied and any one of the LFNST matrices included in the LFNST set, and when the LFNST set includes two transform kernel matrices, there may be three values of the syntax element of the LFNST index.

According to an embodiment, when a division tree structure for the current block is a dual tree type, an LFNST index may be encoded for each of a luma block and a chroma block.

According to an embodiment, the syntax element value for the transform index may be derived as 0 indicating a case in which (inverse) LFNST is not applied to the current block, 1 indicating a first LFNST matrix among LFNST matrices, and 2 indicating a second LFNST matrix among LFNST matrices.

In the present disclosure, at least one of quantization/dequantization and/or transform/inverse transform may be omitted. When quantization/dequantization is omitted, a quantized transform coefficient may be referred to as a transform coefficient. When transform/inverse transform is omitted, the transform coefficient may be referred to as a coefficient or a residual coefficient, or may still be referred to as a transform coefficient for consistency of expression.

In addition, in the present disclosure, a quantized transform coefficient and a transform coefficient may be referred to as a transform coefficient and a scaled transform coefficient, respectively. In this case, residual information may include information on a transform coefficient(s), and the information on the transform coefficient(s) may be signaled through a residual coding syntax. Transform coefficients may be derived based on the residual information (or information on the transform coefficient(s)), and scaled transform coefficients may be derived through inverse transform (scaling) of the transform coefficients. Residual samples may be derived based on the inverse transform (transform) of the scaled transform coefficients. These details may also be applied/expressed in other parts of the present disclosure.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip.

Further, the decoding apparatus and the encoding apparatus to which the present disclosure is applied, may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied, may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network. Additionally, the embodiments of the present disclosure may be embodied as a computer program product by program codes, and the program codes may be executed on a computer by the embodiments of the present disclosure. The program codes may be stored on a computer-readable carrier.

Claims disclosed herein can be combined in a various way. For example, technical features of method claims of the present disclosure can be combined to be implemented or performed in an apparatus, and technical features of apparatus claims can be combined to be implemented or performed in a method. Further, technical features of method claims and apparatus claims can be combined to be implemented or performed in an apparatus, and technical features of method claims and apparatus claims can be combined to be implemented or performed in a method.

What is claimed is:

1. An image decoding method performed by a decoding apparatus, comprising:

receiving residual information through a bitstream;

deriving transform coefficients for a current block based on the residual information;

deriving modified transform coefficients by applying a low frequency non-separable transform (LFNST) to the transform coefficients;

deriving residual samples for the current block based on an inverse primary transform for the modified transform coefficients; and generating a reconstructed picture based on the residual samples, wherein deriving the modified transform coefficients comprises:

deriving a variable based on a first transform skip flag for a chroma Cb component in the current block and a second transform skip flag for a chroma Cr component in the current block, the variable indicating whether a significant coefficient exists only in a top-left sample position within the current block, the first transform skip flag for the chroma Cb component and the second transform skip flag for the chroma Cr component being signaled from the bitstream, respectively, based on a tree type of the current block being a dual tree chroma; and parsing an LFNST index based on the variable indicating that the significant coefficient exists at a position other than the top-left sample position, wherein based on the LFNST index being equal to 0, the LFNST is not applied to transform coefficients for the chroma Cb component and transform coefficients for the chroma Cr component, wherein based on the LFNST index being not equal to 0 and the first transform skip flag for the chroma Cb component being equal to 0, the LFNST is applied to the transform coefficients for the chroma Cb component, wherein based on the LFNST index being not equal to 0 and the first transform skip flag for the chroma Cb component being equal to 1, the LFNST is not applied to the transform coefficients for the chroma Cb component, wherein based on the LFNST index being not equal to 0 and the second transform skip flag for the chroma Cr component being equal to 0, the LFNST is applied to the transform coefficients for the chroma Cr component, and wherein based on the LFNST index being not equal to 0 and the second transform skip flag for the chroma Cr component being equal to 1, the LFNST is not applied to the transform coefficients for the chroma Cr component.

2. The image decoding method of claim 1, wherein the variable is derived as 0 based on at least one of the first transform skip flag for the chroma Cb component or the second transform skip flag for the chroma Cr component being equal to 0, and wherein the variable equal to 0 indicates that the significant coefficient exists at the position other than the top-left sample position with the current block.

3. The image decoding method of claim 2, wherein the variable is initially set to 1 in a coding unit syntax of the current block, and wherein based on the at least one of the first transform skip flag for the chroma Cb component or the second transform skip flag for the chroma Cr component being equal to 0, the variable is changed to 0 in a residual coding syntax of the current block.

4. The image decoding method of claim 1, wherein deriving the modified transform coefficients further comprises:

setting a plurality of variables for the LFNST based on whether the first and second transform skip flags for the chroma Cb and Cr components are equal to 0.

5. An image encoding method performed by an image encoding apparatus, comprising:

deriving prediction samples for a current block;

deriving residual samples for the current block based on the prediction samples;

deriving transform coefficients for the current block based on a primary transform for the residual samples;

applying a low frequency non-separable transform (LFNST) to derive modified transform coefficients from the transform coefficients;

generating residual information based on the modified transform coefficients; and encoding image information including the residual information, wherein applying the LFNST to derive the modified transform coefficients comprises:

deriving a variable based on a first transform skip flag for a chroma Cb component in the current block and a second transform skip flag for a chroma Cr component in the current block, the variable indicating whether a significant coefficient exists only in a top-left sample position within the current block, the first transform skip flag for the chroma Cb component and the second transform skip flag for the chroma Cr component being encoded into a bitstream, respectively, based on a tree type of the current block being a dual tree chroma; and encoding an LFNST index based on the variable indicating that the significant coefficient exists at a position other than the top-left sample position, wherein based on the LFNST index being equal to 0, the LFNST is not applied to transform coefficients for the chroma Cb component and transform coefficients for the chroma Cr component, wherein based on the LFNST index being not equal to 0 and the first transform skip flag for the chroma Cb component being equal to 0, the LFNST is applied to the transform coefficients for the chroma Cb component, wherein based on the LFNST index being not equal to 0 and the first transform skip flag for the chroma Cb component being equal to 1, the LFNST is not applied to the transform coefficients for the chroma Cb component, wherein based on the LFNST index being not equal to 0 and the second transform skip flag for the chroma Cr component being equal to 0, the LFNST is applied to the transform coefficients for the chroma Cr component, and wherein based on the LFNST index being not equal to 0 and the second transform skip flag for the chroma Cr component being equal to 1, the LFNST is not applied to the transform coefficients for the chroma Cr component.

6. The image encoding method of claim 5, wherein the variable is derived as 0 based on at least one of the first transform skip flag for the chroma Cb component or the second transform skip flag for the chroma Cr component being equal to 0, and wherein the variable equal to 0 indicates that the significant coefficient exists at the position other than the top-left sample position within the current block.

7. The image encoding method of claim 6, wherein the variable is initially set to 1 in a coding unit syntax of the current block, and wherein based on the at least one of the first transform skip flag for the chroma Cb component or the second transform skip flag for the chroma Cr component being equal to 0, the variable is changed to 0 in a residual coding syntax of the current block.

8. The image encoding method of claim 5, wherein applying the LFNST further comprises setting a plurality of variables for the LFNST based on whether the first and second transform skip flags for the chroma Cb and Cr component are equal to 0.

9. A non-transitory computer-readable digital storage medium storing a bitstream generated by an image encoding method, the image encoding method comprising:

deriving prediction samples for a current block;

deriving residual samples for the current block based on the prediction samples;

deriving transform coefficients for the current block based on a primary transform for the residual samples;

applying a low frequency non-separable transform (LFNST) to derive modified transform coefficients from the transform coefficients;

generating residual information based on the modified transform coefficients; and encoding image information including the residual information to generate the bitstream, wherein applying the LFNST to derive the modified transform coefficients comprises:

deriving a variable based on a first transform skip flag for a chroma Cb component in the current block and a second transform skip flag for a chroma Cr component in the current block, the variable indicating whether a significant coefficient exists only in a top-left sample position within the current block, the first transform skip flag for the chroma Cb component and the second transform skip flag for the chroma Cr component being encoded into the bitstream, respectively, based on a tree type of the current block being a dual tree chroma; and encoding an LFNST index based on the variable indicating that the significant coefficient exists at a position other than the top-left sample position, wherein based on the LFNST index being equal to 0, the LFNST is not applied to transform coefficients for the chroma Cb component and transform coefficients for the chroma Cr component, wherein based on the LFNST index being not equal to 0 and the first transform skip flag for the chroma Cb component being equal to 0, the LFNST is applied to the transform coefficients for the chroma Cb component, wherein based on the LFNST index being not equal to 0 and the first transform skip flag for the chroma Cb component being equal to 1, the LFNST is not applied to the transform coefficients for the chroma Cb component, wherein based on the LFNST index being not equal to 0 and the second transform skip flag for the chroma Cr component being equal to 0, the LFNST is applied to the transform coefficients for the chroma Cr component, and wherein based on the LFNST index being not equal to 0 and the second transform skip flag for the chroma Cr component being equal to 1, the LFNST is not applied to the transform coefficients for the chroma Cr component.

* * * * *